(12) United States Patent
Steven

(10) Patent No.: US 8,136,414 B2
(45) Date of Patent: Mar. 20, 2012

(54) FLOW METERING

(76) Inventor: Richard Steven, Fort Collins, CO (US)

(*) Notice: Subject to any disclaimer, the term of this patent is extended or adjusted under 35 U.S.C. 154(b) by 516 days.

(21) Appl. No.: 12/310,581

(22) PCT Filed: Aug. 29, 2006

(86) PCT No.: PCT/GB2006/050262
§ 371 (c)(1),
(2), (4) Date: Feb. 27, 2009

(87) PCT Pub. No.: WO2008/025935
PCT Pub. Date: Mar. 6, 2008

(65) Prior Publication Data
US 2010/0191481 A1 Jul. 29, 2010

(51) Int. Cl.
G01F 1/44 (2006.01)

(52) U.S. Cl. .................................... 73/861.63

(58) Field of Classification Search ......... 73/47, 861.42, 73/861.63, 861.51, 861.52, 861.64, 861.65, 73/861.66
See application file for complete search history.

(56) References Cited

U.S. PATENT DOCUMENTS

| | | | |
|---|---|---|---|
| 4,372,304 A * | 2/1983 | Avakian et al. | 604/30 |
| 6,058,787 A | 5/2000 | Hughes | |
| 6,332,111 B1 | 12/2001 | Fincke | |
| 6,463,810 B1 * | 10/2002 | Liu | 73/861.63 |
| 2005/0241413 A1 * | 11/2005 | Brandt, Jr. | 73/861.63 |

* cited by examiner

Primary Examiner — Jewel V Thompson
(74) Attorney, Agent, or Firm — Drinker Biddle & Reath LLP

(57) ABSTRACT

An improved flow meter, which has diagnostic capabilities due to the reading of total pressure head loss, calculation of corresponding flow rate and comparison with flow rates calculated from other differential pressures.

70 Claims, 14 Drawing Sheets

FLOW METERING

FIELD OF THE INVENTION

The present invention relates to improvements in or relating to flow metering, in particular to a new type of differential pressure (DP) flow meter and associated method of flow metering, and to a diagnostic method for verifying the accuracy of readings used in the flow metering calculations.

BACKGROUND

The metering of fluid flows is a vital part of many engineering processes control and is therefore directly related to safety and efficiency. Clearly, it is vital for industry to have as accurate and reliable flow meter as possible for many applications. The reality is of course that no meter is ideal for any application and industry is always searching for combinations of cheaper, more reliable, accurate meters that have diagnostic abilities.

In its most basic sense, a DP flow meter combines Bernoulli's theorem (i.e. the conservation of energy of a fluid flow) and the conservation of mass of a fluid flow between two points in a flow, and the difference in pressure between these two points is measured so that a mass or volume flow rate can be expressed as a function of this differential pressure and the fluid density. A DP meter comprises an obstruction to fluid flow and means for measuring the pressure change caused by the obstruction, giving associated flow rate equations for either volume flow rate or mass flow rate wherein these respective flow rate equations are both functions of the fluid density. The obstruction is defined by a "primary element" which can be either a constriction formed in the conduit or a structure inserted into the conduit. The primary element can be for example a Venturi constriction, an orifice plate, a cone shaped element or other form. DP meters are generally held not to refer to laminar flow elements.

Pressure tappings are inserted upstream from the primary element and at or in the vicinity of the primary element and the pressure difference between the two points is monitored. The primary element causes a drop in pressure, and the pressure is measured at the point of the conduit that corresponds to the lowest pressure. For a Venturi meter, this measurement point will correspond to the "throat" of the primary element, that is, the point of the element that has the minimum cross sectional area. (If the precise position of the lowest pressure is not known for a particular geometry of primary element (as for example in the case of Orifice Plate Meters) it is customary to select a stated position where it is known the pressure will be significantly lower than the pressure tapping upstream of the primary element.)

The standard DP meter flow equation is well known, and is described below in Appendix 1. A further type of DP meter flow equation was described in the published PhD thesis, "Wet Gas Metering" by Richard Steven, University of Strathclyde, Glasgow, United Kingdom, April 2001, which is incorporated herein by reference. In this thesis, the concept of a recovery differential pressure was introduced and discussed. The derivation of the associated recovery DP meter flow equation is summarised in the attached Appendix 2.

A "single phase" flow normally means that the fluid in the conduit comprises only one of gas or liquid. However, for some two phase or multi phase flows, if you have a very high pressure and high gas flow rate and the liquid is a light hydrocarbon (or other liquid with suitable low interfacial tension and viscosity) the liquid can be a forced into very fine droplets. That means the wet gas is a mist flow where the liquid has been effectively atomised and the flow is homogenous. Other types of liquids under certain conditions can be forced into very fine droplets. These types of homogenous two-phase or multi-phase flows are also considered to be "single phase" for the purposes of this invention, as the calculations referred to will hold true for such flows in addition to flows which are purely liquid or gas, as will be apparent forthwith.

While the above meters give the basis for many industrial applications, there is always a desire for meters to be more accurate, cheaper, smaller, or a combination of all of these.

There is also a major problem with the diagnosis of a defective meter, in terms of identifying that there is an error in the readings in the first place, and then in determining where the fault is, correcting the readings to take account of the fault, and then in fixing the fault.

Currently, the diagnostics used with flow meters depend on the individual type of meters in question. Some are better than others but industry generally wishes improvements in all meter type diagnostics and practical improvements at reasonable costs is keenly received.

Ultrasonic meters are relatively expensive devices but one of the selling points is that they have more diagnostic abilities than the rival meters. The ultrasonic meter diagnostic procedures wholly consist of analysing and comparing the different information from different ultrasonic wave paths and checking the health of each signal (e.g. attenuation of the signal, the gain required, the speed of sound estimation etc.). From analysis of each paths output ultrasonic meters can give information on the validity of each ultrasonic path readings and decide whether to accept a particular path information or not. If a path is rejected there is mathematical methods used to account for this in the flow computer. The path information also gives through the speed of sound information regarding the chemical make up of the flowing fluid.

However, most other common flow meters in use have significantly less or no practical diagnostic abilities. They are in effect "dumb" devices that offer a flow rate and it is up to the user to judge the validity of the output. This is usually done by comparing the meter readings to other information in the whole system in which they are one component. Many flow meter designs in many different industrial applications operate in error for various reasons for significant periods of time before it is discovered. This can lead to processes being conducted at less than optimum efficiency, safety issues, sales arguments amongst buyers and sellers etc.

One of the most popular meter types is the differential pressure flow meter hilt despite this meter types popularity and wide spread use across all industries there is very little in the way of diagnostics for this meter type. The standard usage is to install the meter with a flow computer with sufficient care that the system should work correctly. Periodic re-calibrations of the secondary devices are carried out to remove any drift on the differential pressure transducers. Periodically a boroscope (i.e. a small camera) may be inserted to check there is no damage to the primary element nor any solid partical build up around the primary element or pressure ports or any objects obstructing the primary element (such as rocks, welders gloves, welding rods, broken valve parts etc.) Periodically the meter will be removed and inspected for damage or wear and recalibrated as there is currently no way to check if it is working correctly other wise. A saturated DP, transmitter is when the actual DP through the meter is larger than the maximum the transmitter can measure so as it reads the maximum it can show and not the real larger DP (unless the flow computer is programmed to check this which is rare) the flow output is in error. Periodically the meter will have the pressure ports "rodded" (i.e. rods forced through the pressure ports to assure that there is no build up of foreign matter clogging the impulse lines (i.e. the tubing between the meter and the DP transmitters). In the case of high temperature applications (especially steam flows) the flowing fluid can not come into direct contact with the DP transmitter diaphragms as the excess temperature would damage the instrumentation so a buffer of liquid columns are used in the impulse lines. However, where as it is recommended practice to use a device called a "condensate pot" (which is a relatively large vessel semi filled of liquid) between each impulse line and the meter to assure no significant condensation and evaporation height change in the impulse line liquid column, in a remarkable percentage of such applications the condensate is dispensed with and through either cost cutting or ignorance of the possible consequences the impulse lines are filled with liquid with no condensate pot. The result is often variations in liquid column height on each impulse line due to evaporation or condensation and a random wondering differential pressure read by the transmitter as the relative liquid column heights move around. There are no accepted reliable and cheap diagnostics for these situations.

In summary, faults in DP meter readings can arise from a variety of causes including damage, wear or partial blockage of the primary element or when a pressure tapping becomes defective for any reason, for example if it is leaking or is blocked. These could be due to waxing, hydrates, a maintenance engineer accidentally leaving the valve on the transmitter manifold closed, lack of a condensate pot where on is required and so on.

SUMMARY OF THE INVENTION

According to a first aspect of the present invention, there is provided a method of metering turbulent flow through a fluid conduit, comprising the steps of obtaining a total pressure head loss across the conduit and calculating a fluid flow rate on the basis of the total pressure head loss.

Preferably, the step of obtaining the total pressure head loss across the conduit comprises the step of measuring an upstream pressure at an upstream position of the conduit, measuring a downstream pressure at a downstream pressure of the conduit, and calculating the difference between the upstream and downstream pressures.

Preferably, the step of obtaining the total pressure head loss across the conduit comprises the steps of:
measuring an upstream pressure at an upstream position of the conduit;
measuring a downstream pressure at a downstream pressure of the conduit;
measuring an intermediate pressure at a position between the upstream position and the downstream position;
calculating the difference between the upstream and intermediate pressures;
calculating the difference between the intermediate and downstream pressures; and
adding the calculated differences to obtain the total pressure head loss.

Preferably, the fluid flow rate is a volume flow rate.
Preferably, the fluid flow rate is a mass flow rate.
Preferably, the flow rate is calculated as a parabolic relationship with the total pressure head loss, wherein the flow rate is the ordinate, total pressure head loss is the abscissa.

Preferably, the focus of the parabola is a function of a permanent pressure-loss coefficient, a representative cross-sectional area of the fluid conduit, and the fluid density.

Preferably, the permanent pressure loss coefficient is a function of the diameter and a length of the conduit, and the conduit's friction factor, said friction factor itself being a function of the conduit's relative roughness per unit diameter and the Reynolds number of the flow.

Preferably, the fluid flow is single phase or homogenous two-phase.

Preferably, the fluid conduit comprises a straight portion of a fluid conducting pipe.

Preferably, said pipe has a circular cross-section.

Preferably, the fluid conduit comprises a pipework component comprising means for directing or changing the form of flow.

Preferably, the fluid conduit comprises fluid obstruction means.

Preferably, the fluid obstruction means comprises a flow meter.

Preferably, the fluid obstruction means comprises a volume flow meter or a component part thereof.

Preferably, the flow meter is a differential pressure flow meter or the primary element thereof.

Preferably, the method comprises performing a calibration step to calculate a permanent pressure loss coefficient by using a test flow of known mass flow rate.

Preferably, in the case where the permanent pressure loss coefficient is dependent on the Reynolds number, a fit to the curve of the variation with Reynolds number is performed as part of the calibration and of the subsequent flow rate calculations.

Preferably, the step of obtaining the total pressure head loss comprises measuring at least two differential pressures taken between at least three different conduit positions.

Preferably, wherein the at least two differential pressures are selected from:
a total head loss differential pressure taken between a position upstream of the fluid obstruction means and a position downstream of the fluid obstruction means;
a traditional differential pressure taken between the position upstream of the fluid obstruction means and an intermediate position between the upstream and downstream positions; and
a recovery differential pressure taken between the intermediate position and the downstream position.

Preferably, wherein the total head loss differential pressure is calculated from the measured traditional and recovery differential pressures.

Preferably, all three of the total head loss differential pressure, traditional differential pressure and recovery differential pressure are measured.

Preferably, the method comprises the steps of:
calculating respective fluid flow rates based on each of the obtained total head loss differential pressure, traditional differential pressure and recovery differential pressure;
comparing the fluid flow rates; and
determining that the metered flow rate is erroneous if any two or more of the fluid flow rates are not equal to within a predetermined uncertainty.

Preferably, the method comprises generating an alarm signal if the metered flow rate is determined to be erroneous.

Preferably, the method further comprises the step of analysing the flow rates to assess the validity of at least the pressure readings taken at the position upstream of the fluid obstruction means, the position downstream of the fluid obstruction means and the intermediate position between the upstream and downstream positions.

Preferably, wherein said assessment comprises determining that:
if the flow rate calculated from the total head loss differential pressure is less than the flow rate calculated from the traditional differential pressure which is less than the flow rate calculated from the recovery differential pressure;
then the possible cause of error is identified as being either that the pressure reading taken at the upstream position is artificially low, the pressure reading taken at the intermediate position is artificially low, or the pressure reading taken at the downstream position is artificially high; and
if the flow rate calculated from the recovery differential pressure is less than the flow rate calculated from the traditional differential pressure which is less than the flow rate calculated from the total head loss differential pressure;
then the possible cause of error is identified as being either that the pressure reading taken at the upstream position is artificially high, the pressure reading taken at the intermediate position is artificially high, or the pressure reading taken at the downstream position is artificially low.

Preferably, the method comprises the steps of:
measuring a volume flow rate across the fluid conduit;
combining the measured volume flow rate with each of the differential pressures to calculate a respective density for each differential pressure reading;
comparing the respective density readings with a known density value; and
determining that the metered flow rate is erroneous if any two or more of the densities are not equal to within a predetermined uncertainty.

Preferably, the method comprises generating an alarm signal if the metered flow rate is determined to be erroneous.

Preferably, wherein the known density is obtained from a PVT calculation.

Preferably, wherein, if each calculated density reading is not equal to all of the other densities to within a predetermined uncertainty, it is determined that the density reading and flow rate calculated from the recovery differential pressure are correct.

Preferably, a pressure tapping at the position upstream of the fluid obstruction is identified as being defective.

Preferably, if the density reading calculated from the total head loss differential pressure matches the known density, it is determined that the density reading and flow rate calculated from the total head loss differential pressure are correct.

Preferably, a pressure tapping at the intermediate position is identified as being defective.

Preferably, if the density reading calculated from the traditional differential pressure matches the known density, it is determined that the density reading and flow rate calculated from the traditional differential pressure are correct.

Preferably, a pressure tapping at the downstream position is identified as being defective.

According to a second aspect there is provided a flow metering apparatus for metering turbulent flow comprising: a fluid conduit, a first pressure tapping at an upstream end of the fluid conduit, a second pressure tapping at a downstream end of the fluid conduit, and calculation means for obtaining a total pressure head loss across the conduit and calculating a fluid flow rate on the basis of the total pressure head loss.

Preferably, the means for obtaining the total pressure head loss comprises a differential pressure (DP) transmitter connected between the first and second pressure tappings.

Preferably, the apparatus further comprises an intermediate pressure tapping between the first and second pressure tappings and wherein the means for obtaining the total pressure head loss comprises a first DP transmitter connected between the first and intermediate pressure tappings and a second DP transmitter connected between the intermediate and the second pressure tappings.

Preferably, the fluid flow rate is a volume flow rate.

Preferably, the fluid flow rate is a mass flow rate.

Preferably, the fluid flow is single phase or homogenous two-phase.

Preferably, wherein the fluid conduit comprises a straight portion of a fluid conducting pipe.

Preferably, said pipe has a circular cross-section.

Preferably, the fluid conduit comprises a pipework component comprising means for directing or changing the form of flow.

Preferably, the fluid conduit comprises fluid obstruction means.

Preferably, the fluid obstruction means comprises a flow meter or a component part thereof.

Preferably, the fluid obstruction means comprises a volume flow meter or a component part thereof.

Preferably, the fluid obstruction means comprises a differential pressure flow meter or the primary element thereof.

Preferably, the apparatus comprises at least two DP transmitters arranged for reading the differential pressures between at least three different conduit positions.

Preferably, the at least two DP transmitters are selected from DP transmitters arranged to measure:
a total head loss differential pressure taken between a position upstream of the fluid obstruction means and a position downstream of the fluid obstruction means;
a traditional differential pressure taken between the position upstream of the fluid obstruction means and an intermediate position between the upstream and downstream positions; and
a recovery differential pressure taken between the intermediate position and the downstream position.

Preferably, the apparatus comprises calculation means arranged to calculate the total head loss differential pressure from the measured traditional and recovery differential pressures.

Preferably, the apparatus comprises three DP transmitters for measuring all three of the total head loss differential pressure, traditional differential pressure and recovery differential pressure.

Preferably, the apparatus comprises calculation means for:
calculating respective fluid flow rates based on each of the obtained total head loss differential pressure, traditional differential pressure and recovery differential pressure;
comparing the fluid flow rates; and
determining that the metered flow rate is erroneous if any two or more of the fluid flow rates are not equal to within a predetermined uncertainty.

Preferably, the apparatus comprises means for generating an alarm signal if the metered flow rate is determined to be erroneous.

Preferably, the calculation means is further arranged for analysing the flow rates to assess the validity of at least the pressure readings taken at the position upstream of the fluid obstruction means, the position downstream of the fluid obstruction means and the intermediate position between the upstream and downstream positions.

Preferably, said assessment comprises determining that:
if the flow rate calculated from the total head loss differential pressure is less than the flow rate calculated from the traditional differential pressure which is less than the flow rate calculated from the recovery differential pressure;

then the possible cause of error is identified as being either that the pressure reading taken at the upstream position is artificially low, the pressure reading taken at the intermediate position is artificially low, or the pressure reading taken at the downstream position is artificially high; and if the flow rate calculated from the recovery differential pressure is less than the flow rate calculated from the traditional differential pressure which is less than the flow rate calculated from the total head loss differential pressure;

then the possible cause of error is identified as being either that the pressure reading taken at the upstream position is artificially high, the pressure reading taken at the intermediate position is artificially high, or the pressure reading taken at the downstream position is artificially low.

Preferably, the apparatus, comprises means for:

measuring a volume flow rate across the fluid conduit;

combining the measured volume flow rate with each of the differential pressures to calculate a respective density for each differential pressure reading;

comparing the respective density readings with a known density value; and determining that the metered flow rate is erroneous if any two or more of the densities are not equal to within a predetermined uncertainty.

Preferably, the apparatus comprises means for generating an alarm signal if the metered flow rate is determined to be erroneous.

Preferably, the apparatus comprises a thermocouple probe and PVT calculation means for obtaining the known density.

Preferably, the means for measuring the volume flow rate is integrated with the fluid obstruction.

Preferably, a support member for a primary element of the second flow metering means is formed as a vortex shedding bluff body.

Preferably, the thermocouple probe is formed as a vortex shedding bluff body.

Preferably, the fluid obstruction comprises a venturi constriction meter and the velocity flow metering means comprises an ultrasonic meter provided at a throat portion of the venturi restriction.

Preferably, the calculation means comprises decision logic to perform an assessment in accordance with the method of the first aspect.

According to further aspects, a corresponding computer program product and computer readable medium are provided.

BRIEF DESCRIPTION OF DRAWINGS

The present invention will now be described, by way of example only, with reference to the drawings, in which.

DESCRIPTION OF THE PREFERRED EMBODIMENTS

The present invention will now be described, by way of example only, with reference to the above drawings, in which the accompanying figures show matter as explained in the following description.

1. Flow Metering with the Measurement of Head Loss/Permanent Pressure Loss Across any Pipe Component (Including a Straight Unit Length of Pipe)

There is a third way of metering a single phase flow with a DP meter. This will be derived here by considering the DP meter but it must be understood that the general physical principles in which this method of mass or volume flow prediction are made are directly applicable to any component intruding into a pipe flow. In fact they could be applied to a section of straight pipe with no obstruction of any kind.

1.1) A Single Phase DP Meter Method Using the Head Loss (Permanent Pressure Loss) Along a Straight Length of Pipe No technology that utilizes flow rate calculation through its relationship with the total pressure drop across a fluid conduit has ever been developed other than for the special case of single phase fully developed laminar flow.

The total pressure drop across a fluid conduit can also be termed the head loss or the permanent pressure loss. The pressure loss is permanent in the sense that, it is not recovered within the conduit. The permanent pressure loss is the pressure difference measured between two end positions of a fluid conduit.

In most Fluid Mechanics text books Equation 1 is derived as an introduction to fully developed laminar flow in pipes.

$$Q = \frac{\pi D^4}{128 \, \mu L} \Delta P \quad (1)$$

Where Q is the volume flow rate, D is the pipe diameter, µ is the fluid viscosity, L is the length of pipe between the two pressure tappings that are used to find the differential pressure ΔP. So by substituting Equation 1 into Equation 2 (i.e. the mass conservation equation) we get the laminar flow in pipes mass flow Equation 3:

$$m = \rho A U = \rho Q \quad (2)$$

$$m = \frac{\pi \rho D^4}{128 \mu L} \Delta P \quad (3)$$

Where A is the cross-sectional area and U is the average flow velocity at the cross-sectional area.

Equation 1 is utilized in the single phase technology laminar flow elements. This technology assures a single phase flow is a fully developed laminar flow by passing the flow through small tubes in a tube bundle inserted in the pipe. The design means that each tube has laminar flow as each tube diameter is small enough to allow the viscous forces to dominate. Therefore, Equations 1 & 3 are commonly developed for any tube bundle design to give an expression for volume or mass flow rate where these flow rates are directly proportional to the total head loss.

Fully developed laminar flows are rare in industry as this flow condition only exists with very low Reynolds numbers. No head loss metering device exists for the more general and far more common case of fully developed turbulent flow. However, such a device will now be described.

Figure 1:
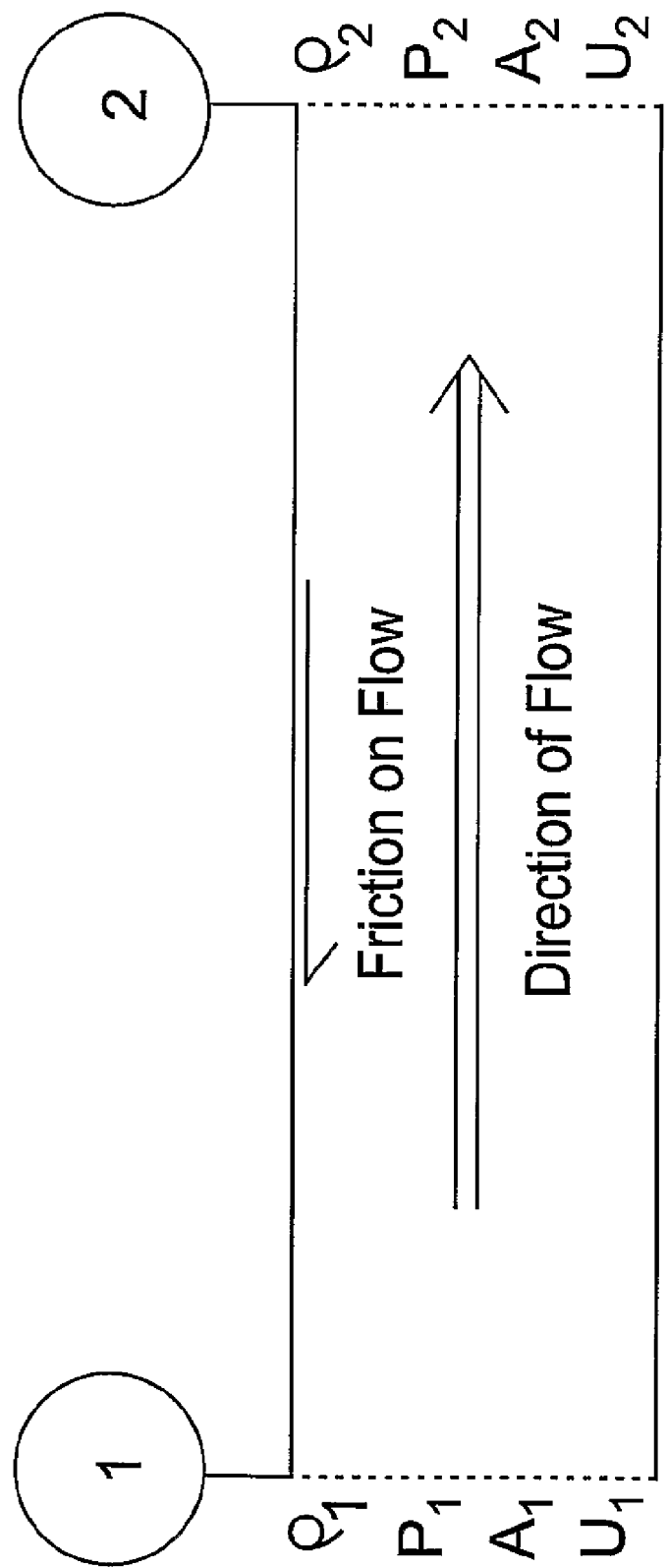
FIG. 1 shows a standard horizontal pipe with single phase flow.

To describe the principle of the general permanent pressure loss meter used in turbulent flow profiles we will start by considering a straight pipe. A straight pipe causes a flow's pressure to drop as it moves downstream due to the energy losses associated with friction (i.e. viscous forces) between the pipe wall and the fluid. The amount of head loss (pressure loss) in a straight pipe is traditionally described in the text books as the "major loss" in pipe line hydraulic calculations. It is usually denoted as "$h_l$". For a straight piece of horizontal pipe between cross sections one and two (see FIG. 1) the Bernoulli equation (i.e. the energy balance equation) can be written as follows:

$$\frac{P_1}{\rho_1} + \frac{U_1^2}{2} = \frac{P_2}{\rho_2} + \frac{U_2^2}{2} + h_l \quad (4)$$

Where $h_l$ is the major loss (i.e. energy losses per unit mass of fluid flowing). As the pipe area between the two sections has not changed if it is assumed the fluid density has not changed (appropriate for liquid flows and for small head loss gas flows) then from mass continuity we see that the average fluid velocity is the same at both cross sectional areas. That is:

$$m = \rho A U_1 = \rho A U_2 \quad (2a)$$

So: $U_1 = U_2$

Therefore Equation 4 becomes:

$$\frac{P_1 - P_2}{\rho} = h_l \quad (4a)$$

Figure 2:
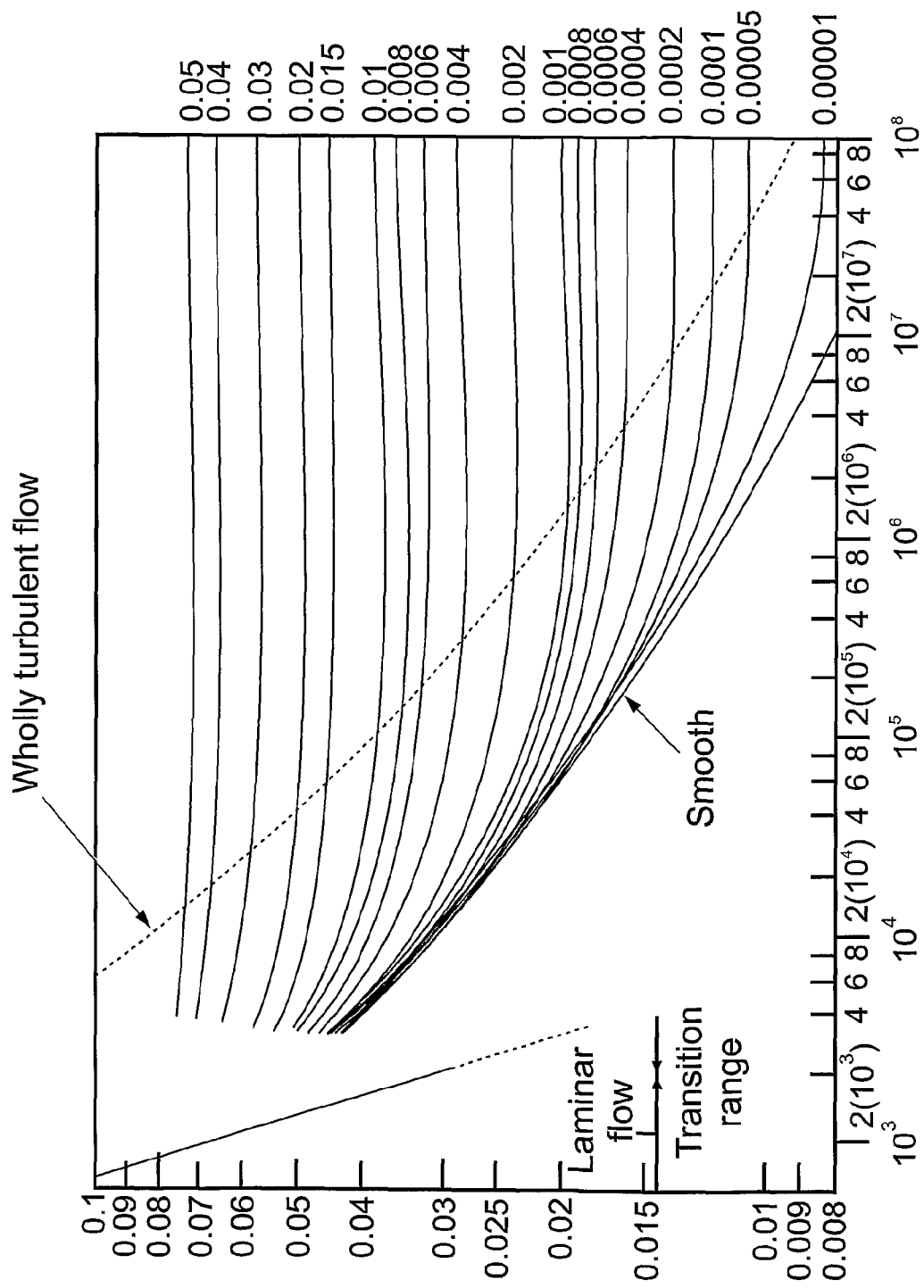
FIG. 2 shows the Moody diagram.
Figure 3:
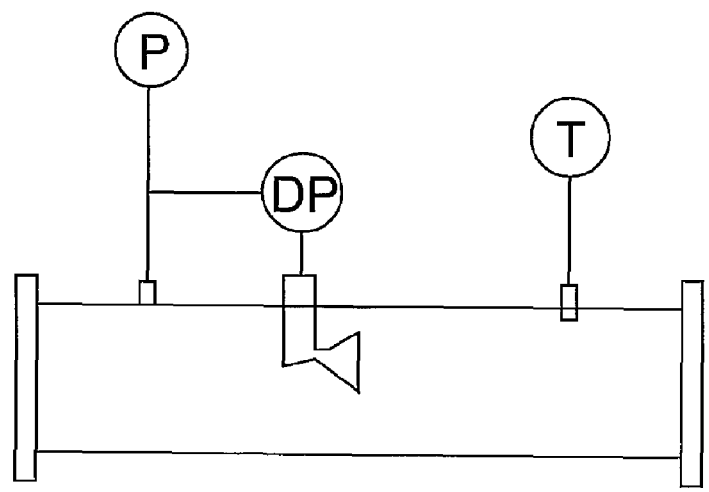
FIG. 3 shows a sketch of a meter arrangement.

From well known theory (expressed in most Fluid Mechanics text books) for head loss in pipes:

$$h_l = f \frac{L}{D} \frac{U^2}{2} \quad (5)$$

Where L and D are the length and diameter of the pipe section respectively, f is the pipe friction factor which is a function of the relative roughness of the pipe (i.e. the pipe roughness to diameter ratio, e/D) and the flows Reynolds number. This for different roughness levels of pipe and Reynolds number must, for turbulent flows, be looked up from the experimental table known as the Moody Diagram. See FIG. 2. Note e/D stands for relative roughness (i.e. the average height of the roughness of the inside bore of the pipe to the inside bore diameter).

Note by substituting Equation 5 into 4a gives:

$$\frac{P_1 - P_2}{\rho} = \frac{\Delta P_f}{\rho} = h_l = f \frac{L}{D} \frac{U^2}{2} \quad (6)$$

Where $\Delta P_f$ is the total head loss. The text books now typically go on to use Equation 6 for hydraulic calculations. That is Equation 6 is nearly always after derivation re-arranged to these three forms:

$$L = \frac{\Delta P_f}{\rho} \frac{2D}{fU^2} \quad (6a)$$

In order to calculate lengths before a given value acceptable head loss is reached, or:

$$\Delta P_f = \rho h_l = \rho f \frac{L}{D} \frac{U^2}{2} \quad (6b)$$

In order to calculate the head loss for a given flow rate or most interestingly for this discussion:

$$U = \sqrt{\frac{2D \Delta P_f}{\rho f L}} \quad (6c)$$

Now as volume flow rate can be vexpressed as:

$$Q = AU \quad (2a)$$

which leads directly by substitution into the Equation 2a to an expression for the volume flow rate:

$$Q = A \sqrt{\frac{2D \Delta P_f}{\rho f L}} \quad (7)$$

Or by substitution into equation 2 an expression for mass flow rate:

$$m = A \sqrt{\frac{2 \rho D \Delta P_f}{fL}} = A \left( \sqrt{\frac{D}{fL}} \right) \sqrt{2\rho \Delta P_f} = A K_{PPL} \sqrt{2\rho \Delta P_f} \quad (7a)$$

if we let $K_{PPL}$ be a "permanent pressure loss coefficient" and here:

$$K_{PPL} = \sqrt{\frac{D}{fL}} \qquad (8)$$

Equation 7 is currently used for hydraulic calculations regarding the design of liquid pipe systems. It offers the engineer a guide to the likely flow rate obtainable for that pipe design during the system design process. However, it has never been used as a meter in actual flows. That is, the head loss ($\Delta P_f$) is not known to be ever read from a straight pipe in operation and Equation 7 used to calculate fluid flow rate.

The derivation of Equation 7a gives a mass flow equation that resembles the traditional DP meter flow equation forms (both the traditional (Equation A1.18) and the expansion DP meters (Equation A2.12a)) in as much as the mass flow rate is a parabolic equation if a DP meter flow coefficient, DP meter expansion flow coefficient and pipe friction factors are all assumed to be constant (which is a reasonable assumption for approximate mass flow rate predictions).

However, Equation 7a has not been used as a mass flow metering method in real flows. The opportunity for metering using this equation has simply never been thought of by industry. It is suggested here that a single phase meter could be produced from this technology if a large enough $\Delta P_f$ could be created to be measured with repeatability and acceptably low uncertainty. This would require a long straight pipe (with the rougher the pipe the shorter the required run).

Often in real industrial flows there are not long runs of pipe and there would not be a long enough run available before bends, reducers, expanders, valves, meters, T-junctions etc. are installed. However, this point brings us into the next discussion. Head loss through pipe line components is usually relatively high compared to the adjacent short or even medium length straight pipes and this head loss when measured can be used to calculate the mass flow rate. A pipe line component is understood in a general sense to be any means for directing or changing the form of a flow. The flow rate calculation is now discussed.

1.2) A Single Phase DP Meter Method Using the Head Loss (Permanent Pressure Loss) Across an Arbitrary Flow Obstruction Head losses through straight pipes are called major losses due to the summation of the pipe lengths in many systems traditionally meaning that the losses due to pipe friction is the dominant reason for the head loss. The head losses due to intrusive components such as bends, reducers, expanders, meters, valves etc. are traditionally called minor losses. This can in fact be misleading. Some components can cause very significant head loss and are not in reality considered minor losses at all. That is the pressure lost across pipe flow components can be substantial in comparison to unit lengths of straight pipe.

Fluid Mechanics text books discuss the head loss across pipe line components in some depth. It is always stressed that it has not been possible to theoretically predict the minor losses caused by individual components. The calculation of a minor head loss is heavily dependent on the use of experimentally based head loss tables. Usually in pipe flow calculations a minor loss is denoted by the symbol $h_{l_m}$. If there is more than one component the effects are simply summed. Therefore if we take an arbitrary example, say, consider the flow across say a valve the energy equation can be written as Equation 9.

$$\frac{P_1}{\rho_1} + \frac{U_1^2}{2} = \frac{P_2}{\rho_2} + \frac{U_2^2}{2} + h_{l_{m_{valve}}} \qquad (9)$$

In this example, for simplicity assume the valve is installed in a constant area pipe. Also assume fluid is incompressible (i.e. density ($\rho$) remains constant through the system). From mass continuity we known the inlet to the contraction and exit to the expansion velocities are the same. That is:

$$m = \rho A U_1 = \rho A U_2 = \rho A U \qquad (10)$$

So: $U_1 = U_2$

Therefore:

$$\frac{P_1 - P_2}{\rho} = \frac{\Delta P_f}{\rho} = h_{l_{m_{valve}}} \qquad (9a)$$

Now, it is convention in Fluid Mechanics to express minor head losses as multiples of the kinetic energy per unit mass of flowing fluid. That is:

$$h_{l_m} = K_l \frac{U^2}{2} \qquad (11)$$

Where $K_l$ is called the "Minor Loss Coefficient".

Note that a flow in a pipe has a total amount of energy that is made up of the different forms of energy contained by the unit mass of flow. These are for horizontal flow the pressure energy component and the kinetic energy. The minor loss is presented as a multiple of the kinetic energy component of the flow.

There is no physical restriction for the lost energy to be less than the kinetic energy of the flow so many of the higher loss components have minor loss coefficients considerably greater than unity as lost energy can come from the upstream pressure energy as well. Sometimes the tables of minor loss coefficients given in the literature show the values in terms of equivalent straight pipe lengths. That is:

$$h_{l_m} = K_l \frac{U^2}{2} = f \frac{L_e}{D} \frac{U^2}{2} \qquad (11a)$$

Where $L_e$ is the length of the equivalent straight pipe of stated e/D. Therefore by substituting Equation 11a into Equation 9a we get:

$$\frac{\Delta P_f}{\rho} = h_{l_{m_{valve}}} = K_l \frac{U^2}{2} \qquad (9b)$$

Rearranging:

$$U = \sqrt{\frac{2 \Delta P_f}{K_l \rho}} \qquad (9c)$$

Substituting equation 9b into the mass continuity equation 2 gives:

$$m = A\sqrt{\frac{1}{(K_l)}}\sqrt{2\rho\Delta P_f} = AK_{PPL}\sqrt{2\rho\Delta P_f} \qquad (12)$$

if we let $K_{PPL}$ be a "permanent pressure loss coefficient" and here $$K_{PPL} = \sqrt{\frac{1}{K_l}}. \qquad (13)$$

Note that Equation 12 is an equation that for a measured total head loss (i.e. permanent pressure loss), a known fluid density and a known geometry will predict the mass flow rate. The method is optimum when a downstream tapping location is far enough downstream of the pipe obstruction to have the pressure recovered as fully as it is going to recover. This allows the maximum DP to be read between the upstream and downstream pressure ports. However, a downstream tapping which is not far enough downstream to measure the pressure after full recovery but only measures the pressure at a location where it is partially recovered, while not ideal, will often still allow equation 12 to work satisfactorily.

Equation 12 it will be noted is a very similar form to the traditional DP meter, expansion meter and straight pipe permanent pressure loss meter equations all discussed in this document (i.e. equations 7a, A.1.18 & A.2.13). For any pipe component with test data stating the permanent pressure loss coefficient ($K_{PPL}$) this same equation can be derived.

Note that it is customary in Fluid Mechanics text books to use a constant value for $K_{ppl}$ and if this is done here in equation 12 no iteration process is required. However, alternatively it may be possible to calibrate a pipe line component such that $K_{ppl}=f(Re)$ (where Re is the flows Reynolds number) to improve accuracy at the expense of an iteration process being required. The three possible practical problems of such a metering method appear to be:

1) For some geometries where head loss is low and also when flow rate is low there will be a small differential pressure, smaller than the classic DP meter traditional DP. Uncertainty of the flow prediction is related to the uncertainty in the head loss measurement.

2) For all possible geometries there is not known points for where the pressure has recovered. To be over cautious and take the downstream pressure tapping well downstream can cause the assumption that major (i.e. pipe) losses are negligible to be called into question.

3) The minor loss coefficients quoted in the public literature is not considered to be extremely accurate. Many different texts give different values for the same geometry as they are based on different test data sets. Most text books suggest the values are good for approximating head loss to within 10% when engineers are designing hydraulic systems but this is not going to be accurate enough in many industrial engineering applications if you are trying to get a low uncertainty mass flow rate measurement. It is also noticeable that few text books list where the pressure ports were upstream and downstream of the component (i.e. how many equivalent diameters of pipe is the positioning of the pressure taps are included either side of the component).

The answer to these problems is suggested as follows. For point one the method should only be operated for significant head loss creating, devices and when the head loss ($\Delta P_f$) read is greater than a minimum acceptable value allowed by the DP transmitter (i.e. the uncertainty quoted by the manufacturer is good enough to allow the associated uncertainty of the flow rate prediction to be acceptable). The answer to point two and three are the same. Both potential problems disappear if the system is calibrated to give a specific and precise minor loss coefficient for the geometry in question ($K_l$). If the downstream tapping is well downstream of the obstruction but it is calibrated that way the minor loss coefficient will account for this. Having a known minor loss coefficient ($K_l$) found for that precise set up removes much of the uncertainty associated with the generalised published minor head loss data.

Note that the value $K_{PPL}$ is found solely from the minor loss coefficient $K_l$ and is therefore a constant if $K_l$ is a constant for the meter geometry regardless of the flows Reynolds number. The loss coefficient $K_l$ (and therefore $K_{PPL}$) could be found by calibration. That is by applying Equation 12 with the calibration data the minor loss coefficient is obtained.

$$K_l = \left(\frac{A}{m_{reference}}\right)^2(2\rho\Delta P) \qquad (12a)$$

Now note IF it were found that the minor loss coefficient ($K_l$) and hence the permanent pressure loss coefficient ($K_{PPL}$) was not independent of Reynolds number all that would be required is a curve fit $K_{PPL}=f(Re)$ as is currently done with calibration of the traditional DP meters.

Use of the Generic Permanent Pressure Loss Flow Meter Equation

The above method has the potential to be very useful. There are many industries that have many applications where the process could benefit from a meter being installed but yet the system operator can not install a meter. Reasons like the meter can not be afforded or no more head loss is acceptable beyond the components that are already installed (hence an intrusive meter can not be installed) there is not the appropriate required installation set up due to flow disturbances (i.e. the meter is too close to upstream bends, reducers, expanders, valves etc.) to work correctly. Many times precise measurement is not needed (e.g. it is not a fluid sales meter application but a process check or control meter application). In this situation a reasonable mass flow rate prediction could be achieved by actually using the disturbance (i.e. bends, reducers, expanders, valves etc.) as a head loss or "permanent pressure loss" flow meter. All that would be needed would be a DP transmitter and a reasonable knowledge of the minor loss coefficient and where they had no mass flow estimation before they would then have one by applying Equation 12. However, the method becomes even more interesting when we consider its applicability to measuring the head loss across a DP meter (with any form of primary element), as follows.

Figure 5:
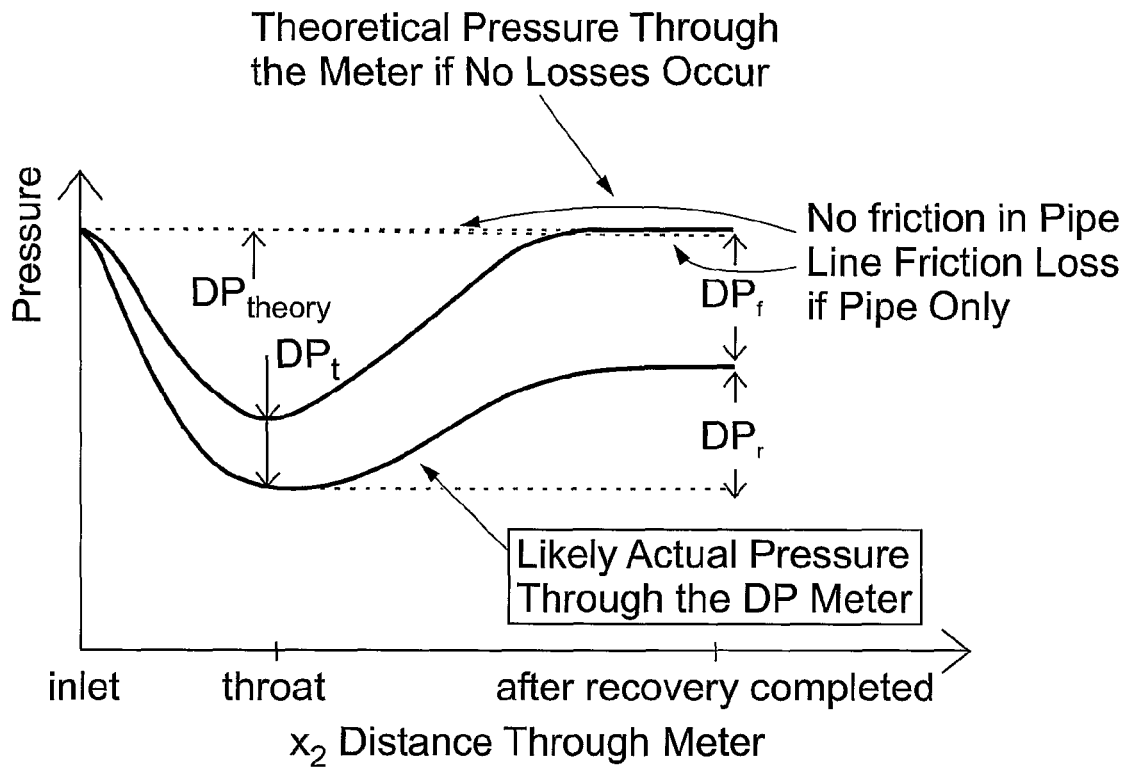
FIG. 5 the theoretical no loss and a typical realistic pressure path a flow would take through a generic DP meter (such as a venturi meter)

1.3) A Single Phase DP Meter Method Using the Head Loss (Total Pressure Loss) Across a Traditional DP Meter All pipe line obstructions create head loss. It is an unavoidable fact. Therefore, even all generic DP meters have a head loss associated with them. (This is shown in FIG. 5 sketch of the pressure vs. axial location through a DP meter graph.) Clearly then a head loss exists across the meter. If this was measured then the generic DP meter could be used as a permanent pressure loss meter. Furthermore, as many DP meters are calibrated to give the optimum discharge coefficient vs. Reynolds number fit adding a second DP transmitter to get permanent pressure loss and calculate the minor loss coefficient ($K_l$) across the entire meter (and hence calculate the permanent pressure loss coefficient ($K_{PPL}$)) would be an easy addition. In fact it should be noted that all three type meters imbedded in one DP meter (i.e. the traditional, expansion and permanent pressure loss) could be ideally calibrated with little more effort than a traditional DP meter calibration. All that would be required would be the connection of two further DP transmitters and the three meter coefficients (i.e. the traditional, expansion and permanent pressure loss) could be calibrated with little more effort than a traditional DP meter calibration. All that would be required would be the connection of two further DP transmitters and the logging of the extra data. Or to save on the third DP transmitter at a small increase of uncertainty Equation 14 could be used to derive the third DP value.

$$\Delta P_t = \Delta P_r + \Delta P_f \quad (14)$$

(Note that Equation 14 holds for all flows through all obstructions.)

Figure 6:
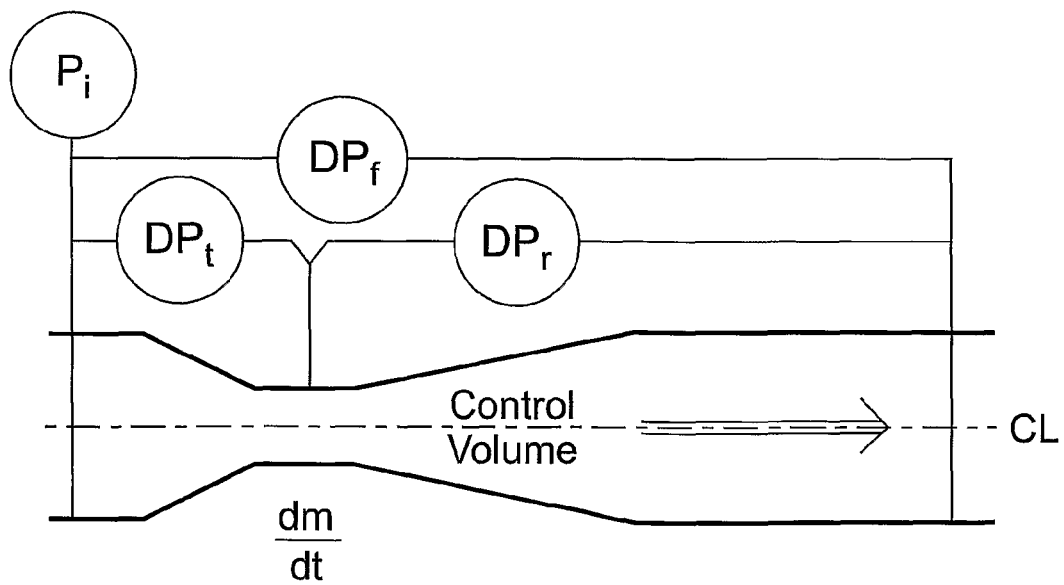
FIG. 6 shows permanent pressure loss meter control volume on a venturi meter example.

For our example of a Venturi meter we can see the permanent pressure loss meter by putting a Control Volume across the whole meter from the upstream pressure tapping to the downstream pressure tapping (far enough downstream to allow full pressure recovery). This is shown in FIG. 6.

Hence we can apply Equation 12 if we know the minor head loss value of the meter (which via Equation 13 gives the permanent pressure loss coefficient $K_{PPL}$).

$$m_{actual} = AK_{PPL}\sqrt{2\rho \Delta P_f} \quad (12)$$

So three metering methods are imbedded in any one DP meter geometry.

1.4) Combining the Three Metering Equations for any Generic DP Meter

One generic DP meter therefore has three different equations. That is the traditional, the expansion and the permanent pressure loss meter equations. All are metering the same actual mass flow rate therefore we can equate into Equation A1.18, Equation A2.13 and Equation 12 to get:

$$m = EA_t K\sqrt{2\rho \Delta P_t} \quad (A1.18)$$

$$m = EA_t K^*\sqrt{2\rho \Delta P_r} \quad (A2.13)$$

$$m = AK_{PPL}\sqrt{2\rho \Delta P_f} \quad (12)$$

$$m = EA_t K\sqrt{2\rho \Delta P_t} = EA_t K^*\sqrt{2\rho \Delta P_r} = AK_{PPL}\sqrt{2\rho \Delta P_f} \quad (15)$$

Note that all three equations are parabolic equations if the flow coefficient and the expansion flow coefficient are assumed constant (which is a reasonable assumption as they have very small changes over wide flow rate ranges).

The Parabola has the basic equation:

$$y^2 = 4ax \quad (16)$$

Or in another form:

$$y = \sqrt{4ax} \quad (16a)$$

Figure 7:
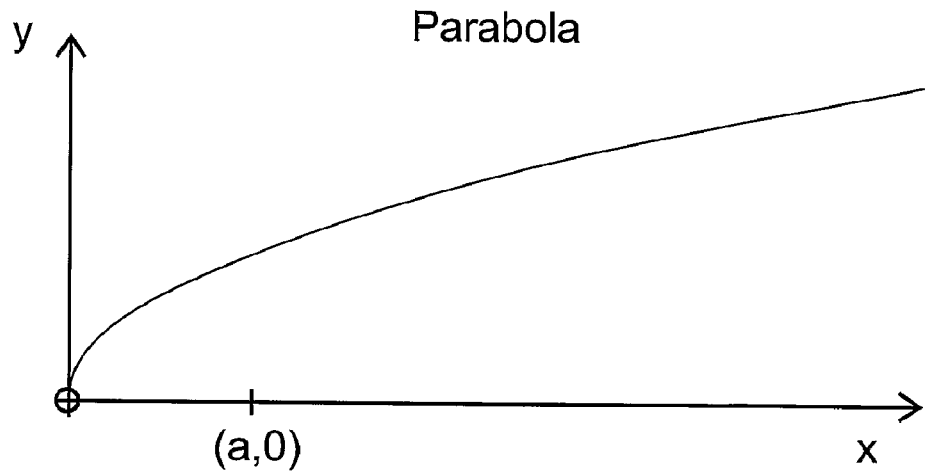
FIG. 7 shows the parabolic equation.

The parameter "a" is the parabolic focus. That is for equation 16/16a the focus is at the Cartesian point (a,0). FIG. 7 shows a parabolic equation plot.

Figure 8:
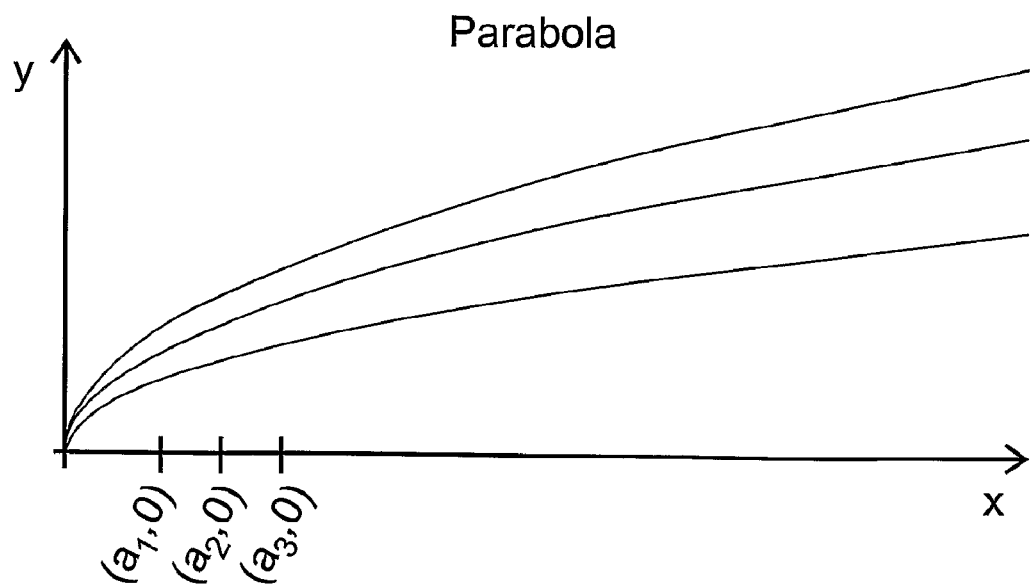
FIG. 8 shows the effect of different foci on the parabolic equation.

FIG. 8 shows the affect of different foci on the relationship between the ordinate and abscissa. Here $a_1 < a_2 < a_3$.

It is shown in FIG. 8 that the larger the foci of a parabola the larger the ordinate (y) value for a set abscissa value.

Now note that all three equations (see equation 15) are (for the approximations of constant flow coefficient and expansion flow coefficient) parabolas. That is another way of expressing Equations A1.18, A2.12a and 12 is as follows:

$$m^2 = (EA_t K\sqrt{2\rho})^2 \Delta P_t \quad (17)$$
$$= 4\left\{\frac{(EA_t K\sqrt{2\rho})^2}{4}\right\}\Delta P_t$$
$$= 4a_t \Delta P_t$$

$$m^2 = (EA_t K^*\sqrt{2\rho})^2 \Delta P_r \quad (18)$$
$$= 4\left\{\frac{(EA_t K^*\sqrt{2\rho})^2}{4}\right\}\Delta P_r$$
$$= 4a_r \Delta P_r$$

$$m^2 = (AK_{PPL}\sqrt{2\rho})^2 \Delta P_f \quad (19)$$
$$= 4\left\{\frac{(AK_{PPL}\sqrt{2\rho})^2}{4}\right\}\Delta P_f$$
$$= 4a_f \Delta P_f$$

Therefore we have now effectively stated that the foci for each of the three metering systems are:

$$a_t = \frac{(EA_t K\sqrt{2\rho})^2}{4} \quad (20)$$

$$a_r = \frac{(EA_t K^*\sqrt{2\rho})^2}{4} \quad (21)$$

$$a_f = \frac{(AK_{PPL}\sqrt{2\rho})^2}{4} \quad (22)$$

As the density of the fluid is the same flow (as it is the same fluid entering the metering system and ignoring secondary expansibilty/compressibility effects for gas) the difference in these focal point values is the difference in the values $EA_t K$, $EA_t K$ and $AK_{PPL}$. We know that $K^* > K$ as $K^* > 1$ and $K < 1$ (derived in the appendices). Therefore by the laws of physics $a_r > a_t$. We do not directly know if $AK_{PPL}$ is greater or less than values $EA_t K$ or $EA_t K^*$. However, we do know the physical fact stated by Equation 14:

$$\Delta P_t = \Delta P_r + \Delta P_f \quad (14)$$

And we know that:

$$m = EA_t K\sqrt{2\rho \Delta P_t} = EA_t K^*\sqrt{2\rho \Delta P_r} = AK_{PPL}\sqrt{2\rho \Delta P_f} \quad (15)$$

Therefore, we can deduce that as Equation 14 tells us that $\Delta P_t > \Delta P_f$ then for Equation 15 to hold true then $EA_t K < AK_{PPL}$ and then from Equations 19 and 21 we see that $a_t < a_f$. Therefore, we can deduce that for flow across any pipe line flow obstruction equation 14 holds we must have $a_r > a_t$ and $a_f > a_t$. What we have not deduced is the relationship between $a_r$ and $a_f$. This is not possible to make definite statements about as it depends on the individual pipe line obstruction. For the case of DP meters it is traditionally considered desirable that the meter has as low a head loss as possible in practical applications. Hence, it is typical that a DP meter recovers the majority of the traditional differential pressure ($\Delta P_t$). In this case we will have the situation where $\Delta P_r > \Delta P_f$. If this is the case then we have $a_r < a_f$. (If it was not the case and the majority of the differential pressure was lost then it would be the opposite, i.e. $\Delta P_r < \Delta P_f$ and then we have $a_f < a_r$. This is not common for DP meter designs but it could happen across certain high loss pipe components.)

As we are primarily discussing generic DP meters we will assume $\Delta P_r > \Delta P_f$ and therefore we now know $\Delta P_t > \Delta P_r > \Delta P_f$ and $a_t < a_r < a_f$. Graphically the relationship between the three metering methods are sketched in FIG. 9.

Figure 9:
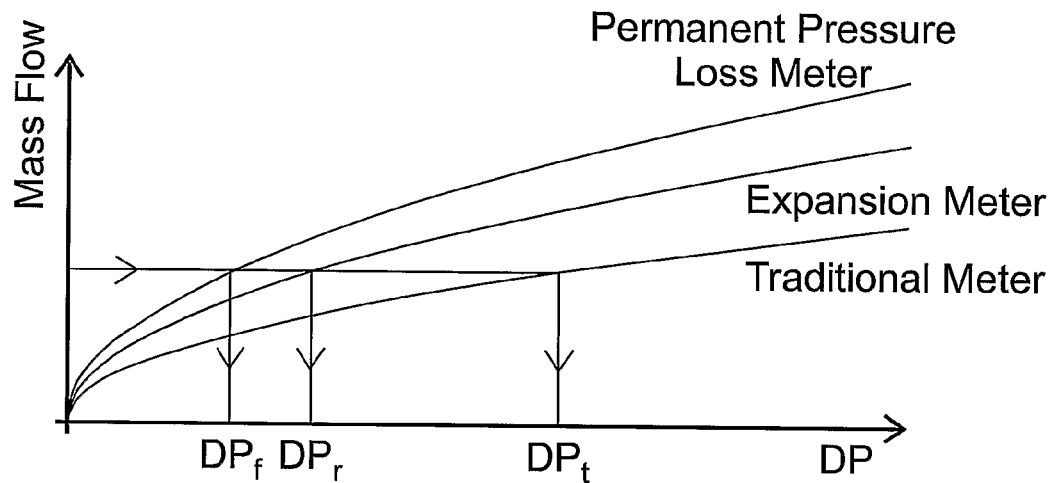
FIG. 9 shows sketch of the relationship between different metering systems.

(Note that FIG. 9 is a sketch and therefore not precisely scaled. The sum of the head loss ($\Delta P_f$) and recovery pressure ($\Delta P_r$) will equal the traditional differential pressure ($\Delta P_t$) in all real flows (i.e. equation 14)).

The expansion meter and permanent pressure loss meter concepts are not currently used in industry. If they were applied to a single phase DP meter (i.e. one extra DP transmitter was applied to measure the recovered DP or head loss DP—and hence allow derivation of the other by equation 14) they offer the advantage of some meter diagnostic ability.

If the system reads:

$$m = EA_tK\sqrt{2\rho\Delta P_t} = EA_tK^*\sqrt{2\rho\Delta P_r} = AK_{PPL}\sqrt{2\rho\Delta P_f} \qquad (15)$$

with in each equations uncertainty range then all is well. (Note here that as $\Delta P_r > \Delta P_f$ for most DP meters and it is typically easier to measure a higher differential pressure than a lower pressure it is more accurate to meter the recovery pressure directly than taking the difference of the traditional and permanent pressure loss differential pressures. To do this note that unlike all conventional DP reading of traditional or permanent pressure loss this time as the flow moves downstream from the "throat" (or point of minimum pressure) the pressure rises. Therefore the DP transmitter will be connected with its low pressure port upstream of the high pressure port. That is the transmitter is connected in a way that would look like it was the wrong way around to those that are used to taking traditional differential pressure measurements.)

If the system reads (allowing for the uncertainty ranges of each equation):

$$EA_tK\sqrt{2\rho\Delta P_t} \neq EA_tK^*\sqrt{2\rho\Delta P_r} \neq AK_{PPL}\sqrt{2\rho\Delta P_f} \qquad (15a)$$

then there is a fault and the meter software should flag a warning to the system monitor that the meter needs to be examined and the reading can not be relied upon. Currently standard DP meters can be considered "dumb", i.e. there is no diagnostic stating if anything is wrong.

Figure 10:
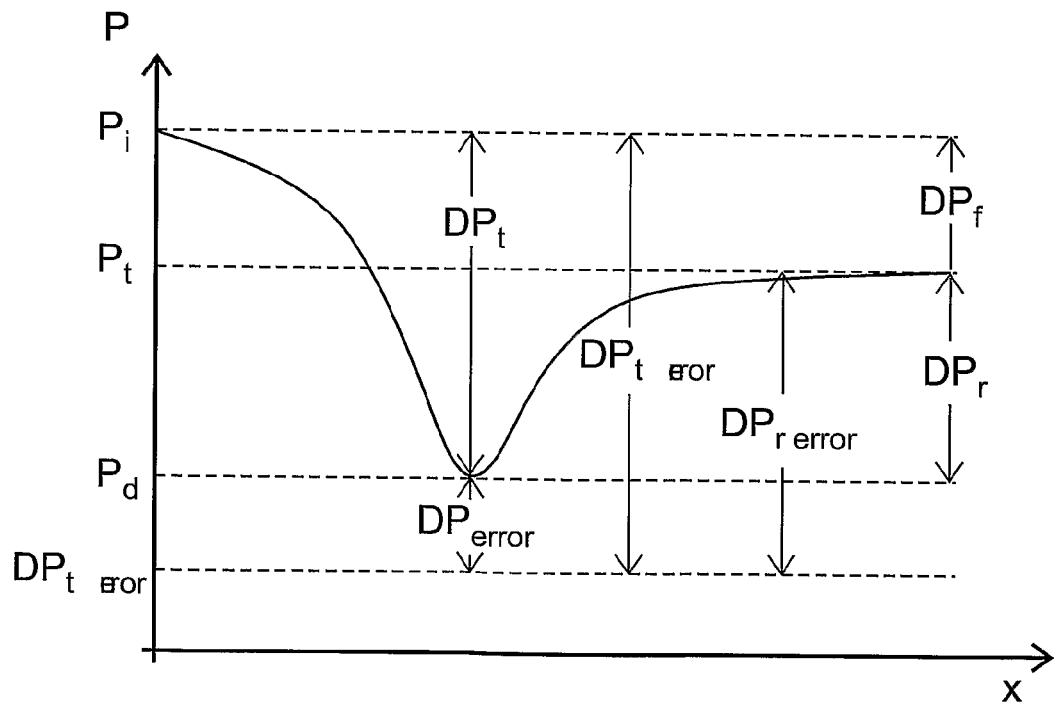
FIG. 10 shows an example of pressure through a DP meter with an artificially low throat pressure causing an error in the traditional flow rate prediction.

Furthermore, more detail can be found on what may be wrong. FIG. 10 below shows a worked example of this. The x-axis is the distance (x) from inlet to pressure recovery completion. The y-axis shows the local pressure through the DP meter. (This is a simplified sketch of the pressure variation but it shows the principle being discussed.) In this example the traditional DP is too high (i.e. not the true DP being created) as the port at the meter throat is either leaking (causing the throat pressure to drop) or is blocked at the lower pressure it was at when the blockage occurred. This could be due to waxing, hydrates, a maintenance engineer accidentally leaving the valve on the transmitter manifold closed etc.

In FIG. 10 $P_i$ is the actual inlet pressure, $P_t$ is the actual throat pressure, $P_{t\,error}$ is the read pressure at the throat which in this example is artificially low and $P_d$ is the pressure downstream after recovery. $DP_t$ is the actual DP across inlet to throat, $DP_r$ is the actual DP across downstream to throat, $DP_{error}$ is the additional DP erroneously measured due to the problem at the throat tapping, $DP_{t\,error}$ is the measured but incorrect inlet to throat DP and $DP_{r\,error}$ is the measured but incorrect downstream to throat DP.

Note here that equation 14 still holds for the read values. That is:

$$\Delta P_t = \Delta P_r + \Delta P_f \qquad (14)$$

Also note that equation 14 can be re-written as equation 14a:

$$1 = \frac{\Delta P_r}{\Delta P_t} + \frac{\Delta P_f}{\Delta P_t} \qquad (14a)$$

In standard meter theory the head loss ($\Delta P_f$) which is only used to predict the pressure loss in the pipe as part of a systems hydraulic pressure drop calculations is a set percentage of the traditional read differential pressure between upstream and throat ($\Delta P_t$). For example for a 0.7 beta ratio Venturi the head loss is said to be approximately 20% by ISO 5167—Part 4 (i.e. the International Standards Organisation DP Meter standard). So in other words:

$$\frac{\Delta P_f}{\Delta P_t} = 0.2$$

and therefore from equation 14a $$\frac{\Delta P_r}{\Delta P_t} = 0.8.$$

When there is a problem with one pressure port giving the wrong pressure this constant value will change. That is in this example we could find $$\frac{\Delta P_f}{\Delta P_t} \neq 0.2$$

and therefore from equation 14a $$\frac{\Delta P_r}{\Delta P_t} \neq 0.8.$$

This then should flag a problem with the meter. Equation 15a will occur:

$$EA_tK\sqrt{2\rho\Delta P_t} \neq EA_tK^*\sqrt{2\rho\Delta P_r} \neq AK_{PPL}\sqrt{2\rho\Delta P_f} \qquad (15a)$$

Let us denote here $m_t$ as the mass flow rate prediction when applying equation A1.18, $m_r$ as the mass flow rate prediction when applying equation A2.13 and $m_h$ as the mass flow rate prediction when applying equation 12. In this example if there was a low throat pressure reading (say) we will find that we get:

$$AK_{PPL}\sqrt{2\rho\Delta P_f} < EA_tK\sqrt{2\rho\Delta P_t} < EA_tK^*\sqrt{2\rho\Delta P_r} \qquad (15b)$$

i.e. $m_h < m_t < m_r$.

where $m_h$ is the permanent pressure loss meter prediction, $m_t$ is the traditional meter prediction and $m_r$ is the recovery meter prediction. This is graphically illustrated in the sketch of FIG. 11

We also see that the error of the traditional and recovery DP is the same error. That is the numerical difference between the correct and erroneous traditional DP's and the numerical difference between the correct and erroneous recovery DP's caused by the lower than actual pressure reading are one and the same. In this case this numerical difference are both positive. However, it is the modulus that must by the law of physics be the same not the sign. In fact depending on what pressure tap has what problem the DP error caused on the two DP's in question can be both plus, both minus or opposites. For the six cases of high or low pressure at the three different pressure ports you will find if you work through them in turn that:

Low $P_i$ $$m_h < m_t < m_r$$

$\Delta P_t$ and $\Delta P_f$ are in error.

$$|\Delta P_{t\,error}| = |\Delta P_{f\,error}| = |\Delta P_{error}|$$

$\Delta P_{t_{error}}$ is negative (i.e. reduces the value read from the correct answer).
$\Delta P_{f_{error}}$ is negative (i.e. reduces the value read from the correct answer).

$$\frac{\Delta P_f}{\Delta P_t} < \text{expected answer}, \quad \frac{\Delta P_r}{\Delta P_t} > \text{expected answer}$$

Low $P_t$ $$m_h < m_t < m_r$$

$\Delta P_t$ and $\Delta P_r$ are in error.

$$|\Delta P_{t\,error}| = |\Delta P_{r\,error}| = |\Delta P_{error}|$$

$\Delta P_{t_{error}}$ is positive (i.e. increases the value read from the correct answer).
$\Delta P_{r_{error}}$ is positive (i.e. increases the value read from the correct answer).

$$\frac{\Delta P_f}{\Delta P_t} < \text{expected answer}, \quad \frac{\Delta P_r}{\Delta P_t} > \text{expected answer}$$

High $P_d$ $$m_h < m_t < m_r$$

$\Delta P_f$ and $\Delta P_r$ are in error.

$$|\Delta P_{f\,error}| = |\Delta P_{r\,error}| = |\Delta P_{error}|$$

$\Delta P_{f_{error}}$ is negative (i.e. decreases the value read from the correct answer).
$\Delta P_{r_{error}}$ is positive (i.e. increases the value read from the correct answer).

$$\frac{\Delta P_f}{\Delta P_t} < \text{expected answer}, \quad \frac{\Delta P_r}{\Delta P_t} > \text{expected answer}$$

High $P_i$ $$m_r < m_t < m_h$$

$\Delta P_r$ and $\Delta P_f$ are in error.

$$|\Delta P_{t\,error}| = |\Delta P_{f\,error}| = |\Delta P_{error}|$$

$\Delta P_{t_{error}}$ is positive (i.e. increases the value read from the correct answer).
$\Delta P_{f_{error}}$ is positive (i.e. increases the value read from the correct answer).

$$\frac{\Delta P_f}{\Delta P_t} > \text{expected answer}, \quad \frac{\Delta P_r}{\Delta P_t} < \text{expected answer}$$

High $P_t$ $$m_r < m_t < m_h$$

$\Delta P_t$ and $\Delta P_r$ are in error.

$$|\Delta P_{t\,error}| = |\Delta P_{r\,error}| = |\Delta P_{error}|$$

$\Delta P_{t_{error}}$ is negative (i.e. decreases the value read from the correct answer).
$\Delta P_{r_{error}}$ is negative (i.e. decreases the value read from the correct answer).

$$\frac{\Delta P_f}{\Delta P_t} > \text{expected answer}, \quad \frac{\Delta P_r}{\Delta P_t} < \text{expected answer}$$

Low $P_d$ $$m_r < m_t < m_h$$

$\Delta P_f$ and $\Delta P_r$ are in error.

$$|\Delta P_{f\,error}| = |\Delta P_{r\,error}| = |\Delta P_{error}|$$

$\Delta P_{f_{error}}$ is positive (i.e. increases the value read from the correct answer).
$\Delta P_{r_{error}}$ is negative (i.e. reduces the value read from the correct answer).

$$\frac{\Delta P_f}{\Delta P_t} > \text{expected answer}, \quad \frac{\Delta P_r}{\Delta P_t} < \text{expected answer}$$

So not only does equation 15 indicate if something is wrong with one of the pressure readings but from whether we have $m_h < m_t < m_r$ or $m_r < m_t < m_h$ we can narrow the six possible problems (i.e. high or low pressure at one of the three ports to one of three problems) as each of the $m_h < m_t < m_r$ or $m_r < m_t < m_h$ results are only possible under three of the six situations. Furthermore, if we find that there is not agreement between the three equations but yet the traditional meter equation (A1.18) does not have the mid value then a problem has been found (and a warning to the user will be given by the flow computer) but the problem is unspecified as it is not showing the symptoms of being caused by a single pressure port problem. Examples that could cause such unspecified readings are two ports blocked, damage to the primary element, one port blocked when one DP transmitter is drifting away from calibration etc. So here for the first time is a simple, cheap, effective way of checking the validity of a DP meter out put using no external information while it in use. As well as indicating the health of the flow rate reading there is some limited diagnostic ability now. We know if the meter has a problem and we can group that problem into one Of two sets.

An example showing a practical use for such a diagnostic device is now given. An orifice plate was chosen as the meter to be discussed in this example for two reasons. First, the other DP meter examples given later in this text are for Venturi meters and the methods being discussed are applicable to ALL primary element type DP meters so use of an orifice plate meter helps shows this. Secondly, it will be seen that unlike the later examples discussing Venturi meters, the orifice plate meter has a large permanent pressure loss which is greater than the recovered pressure. This is different to the Venturi meter and this leads to $\Delta P_t > \Delta P_f > \Delta P_r$ and $a_t < a_f < a_r$. However, the argument described in this text works just as well if this case is worked through instead of the other possibility that was used in the general development of the concept (i.e. $\Delta P_t > \Delta P_r > \Delta P_f$ and $a_t < a_r < a_f$). Use of the orifice plate example shows both these facts.

Imagine a 4" schedule 80 pipe line (i.e. a diameter of 3.826" or 0.09718 m) transporting a natural gas (17.4 mW) at 20 Bara, 300K at a flow rate of 1.205 kg/s. The density of the gas is 14.46 kg/m³. A 0.6 beta ratio flange taps orifice plate is the installed meter with a pressure reading on the upstream tapping, a differential pressure transmitter reading across the orifice plate flange pressure tappings, a thermocouple downstream of the orifice plate and these transducers supply a flow computer with their output. The flow computer has gas composition from a gas chromatograph installed somewhere within the vicinity of the meter so a PVT calculation can be carried out and the traditional DP meter equation applied to calculate the gas mass flow rate. From this example the discharge coefficient of the orifice plate can be set at 0.606 and the expansibility factor at 0.9935 (from approximations from ISO 5167 Part 2 tables). If all is operating correctly the differential pressure across the flange tappings is 16909 Pa. The left side of the spreadsheet below shows normal operation values. Kappa is the isentropic exponent.

Now, with this scenario imagine the DP (i.e. $DP_t$) is incorrect. Say it is 2.5% too high. This is shown on the right hand column. Perhaps the DP transducer was incorrectly calibrated, or has drifted due to lack of maintenance, or there is a small leak in the low pressure tapping etc. This means the flow computer receives not the actual DP of 16909 Pa as an input but 16486 Pa. The resulting gas flow rate prediction of 1.19 kg/s is in error by 0.015 kg/s. This is an under estimation of the mass flow by 1.3 tonnes/day. It is unlikely that this would be noticed as the error is small, the reading is only −1.26% away from the actual mass flow rate. Gas currently sells at approximately $0.40 (US) per standard meter cubed (Sm³). At 20 Bara and 300K 1.3 tonnes/day is approximately 1776 Sm³/day or in monetary terms approximately $710.4/day or if we assume a set gas value an annual error of greater than $250,000.

However, imagine we had supplied the system with another DP transmitter. It is connected from downstream of the orifice plate flanges to the downstream flange tap. It is therefore measuring the recovery pressure $DP_r$. Equation 14 allows the permanent

|  | Standard |  |  | With DPt error of 2.5% |  |
| --- | --- | --- | --- | --- | --- |
| D | 0.09718 | m | D | 0.09718 | m |
| Beta | 0.6 |  | Beta | 0.6 |  |
| d | 0.058308 | m | d | 0.058308 | m |
| E | 1.071866 |  | E | 1.071866 |  |
| A | 0.007417 | m^2 | A | 0.007417 | m^2 |
| At | 0.00267 | m^2 | At | 0.00267 | m^2 |
| Qg | 300 | m^3/hr | Qg | 300 | m^3/hr |
| Usg | 11.23 | m/s | Usg | 11.23 | m/s |
| mg trad | 1.205 | kg/s | mg trad | 1.19 | kg/s |
| Gas Den | 14.46 | kg/m3 | Gas Den | 14.46 | kg/m3 |
| viscosity | 1.13E−05 | Pa-s | viscosity | 1.13E−05 | Pa-s |
| kappa | 1.3 |  | kappa | 1.3 |  |
| P | 2000000 | Bara | P | 2000000 | Bara |
| T | 300 | K | T | 300 | K |
| Reg | 1403350 |  | Reg | 1385697 |  |
| Cd | 0.606 | approx | Cd | 0.606 | approx |
| Y | 0.9935 | approx | Y | 0.9935 | approx |
| DP | 16909 | Pa | DP | 16486 | Pa (i.e. 2.5% low) |
| Pthroat | 1983091 | Pa | Pthroat | 1983514 | Pa |
| P2/P1 | 0.991546 |  | P2/P1 | 0.991757 |  |
| DPhl | 11169 | estimated for example | DPhl | 10746 | error from DP diff |
| DPr | 5740 | derived equ 14 | DPr | 5740 | Read by 2nd transmitter |
| DPhl/DP | 0.6605 |  | DPhl/DP | 0.6518 |  |
| DPr/DP | 0.3395 |  | DPr/DP | 0.3482 |  |
| K* | 1.033 |  | K* | 1.033 |  |
| Kppl | 0.286 |  | mg K* | 1.205 | kg/s |
|  |  |  | Kppl | 0.286 |  |
|  |  |  | mg Kppl | 1.1820 | kg/s |
|  |  |  | Max mg error % | 1.95% |  |
|  | mg Diff Between Trad and Actual Flow |  |  | −0.01516 | kg/s |
|  | mg Diff Between Trad and Actual Flow |  |  | −1309.64 | kg/d |
|  | mg Diff Between Trad and Actual Flow |  |  | −1.3 | tonnes/day |
|  | Mg Actual |  |  | 104.1 | tonnes/day actually flowing |
|  | Traditional DPt Meter Reads |  |  | 102.8 | tonnes/day |

Equation A.1.18 is the standard (i.e. traditional) way of calculating the gas mass flow rate (denoted in the spread sheet as "mg trad"). At the base of the left column note that the permanent pressure loss and recovery pressure are listed. These are estimates by this author based on experience and are close to what would be seen if the orifice plate was calibrated to find K* and $K_{PPL}$. Using these differential pressures we see that for this orifice plate K*=1.033 and $K_{PPL}$=0.286. In our original imagined scenario there is no second DP transmitter. It is a standard traditional system with one DP transmitter across the pressure tappings.

pressure loss $DP_{PPL}$ to be found. If the second DP transmitter was also giving an erroneous reading the equation set 15 would not equate and a problem would be found. So let us assume the second DP transmitter is giving the correct $DP_r$ value. The other DP transmitter is giving the wrong $DP_t$ value so the prediction of $DP_{PPL}$ (found by taking the difference of the two read DP's) is also incorrect. We would know from calibration of the meter that K*=1.033 and $K_{PPL}$=0.286. It is expected that equation A.1.18 would be ±0.5% and equation A.2.13 and equation 12 could be <±1%. That is, here if the biggest difference in the flow rate when comparing the three predicted flow rates was greater than the Maximum that can be caused by the combination of the flow rate uncertainties a warning should be set on the flow computer. Note here that the application of the principle in this example has shown a difference between equation A2.13 and equation 12 of 1.95%. This is due to the incorrect traditional DP reading between the orifice flanges and its associated error in the permanent pressure loss prediction. As the combined uncertainties of equation set 15 can not account for such a result the flow computer would immediately set off an alarm telling the operator to check the operation of the meter. That is if one DP transmitter was used only as is traditional the error would likely never have been discovered but the addition of a second DP transmitter highlights the problem immediately.

End of example.

Further analysis of this diagnostics principle requires the use of a velocity meter in series or as a DP/Velocity hybrid meter. Such a structure is the subject of the inventor's co-pending patent application, incorporated herein by reference. A summary of this structure is also given in Appendix 3, and the use of it will now be discussed.

2) A Combined DP Meter and Velocity Flow Meter with the Traditional, Recovery and Permanent Pressure Loss Readings and PVT Density Calculation Ability Traditionally a DP meter has one pressure reading upstream of the primary element, a temperature reading downstream of the primary element and a single DP transmitter with a flow computer that does the PVT calculation (i.e. a "Pressure, Volume and Temperature" calculation to derive the fluid density from the gases equation of state) after it receives fluid information inputted from the sampling analysis. The flow computer then calculates the mass or volume flow as required. If a second DP transmitter is added from either downstream to throat or upstream to downstream of the meter then the diagnostic ability discussed in section 2 is achieved. If the PVT is giving the density then the addition of a volume flow meter (or "velocity" meter as volume flow meters are often called) giving volume flow rate in series with a DP meter giving volume flow rate as a function of gas density gives a diagnostic check on the density prediction of the PVT calculation.

One type of velocity meter is a vortex meter. This will be used as an example here although any meter capable of metering the volume flow rate could be used. It is generally stated that a Vortex meter is a 0.5% to 1% uncertainty meter and a well calibrated DP meter is a 0.5% meter. Hence in normal operation when in series with a DP meter the Vortex meter and the three DP meter equations (using the PVT density value) should give the same volume flow rate within the equation given uncertainties. If not then there is a diagnostic ability of the meter to tell the operator something is wrong with one (or more) of the meter systems and not to blindly trust the meter as is currently done with standard DP meters and velocity meters. It should be pointed out that the addition of one extra DP transmitter is typically not a large percentage increase in cost to a DP meter and the less expensive of the velocity meters (i.e. Vortex meters) are less expensive again if the meter design is a DP meter/velocity meter hybrid as most of the material cost for two meters is combined in one. Therefore for the relatively modest increase in price due to a vortex bluff body shedding bar and sensor and an extra DP transmitter added to a standard DP meter with no diagnostics and one flow equation can be turned into a diagnostic meter with four flow equations, flow rate diagnostics and a real time density check.

Returning to equation 15 and considering equation 2 allows us to derive equation 15b.

$$m = EA_t K \sqrt{2\rho\Delta P_t} = EA_t K^* \sqrt{2\rho\Delta P_r} = AK_{PPL}\sqrt{2\rho\Delta P_f} \quad (15)$$

$$m = \rho A U = \rho Q \quad (2)$$

$$Q = EA_t K \sqrt{\frac{2\Delta P_t}{\rho}} = EA_t K^* \sqrt{\frac{2\Delta P_r}{\rho}} = AK_{PPL}\sqrt{\frac{2\Delta P_f}{\rho}} \quad (15b)$$

Re-arranging equation 15b gives the expressions for the density, equation 15c:

$$\rho = 2\Delta P_t \left(\frac{EA_t K}{Q}\right)^2 = 2\Delta P_r \left(\frac{EA_t K^*}{Q}\right)^2 = 2\Delta P_f \left(\frac{AK_{PPL}}{Q}\right)^2 \quad (15c)$$

Note for a given volume flow rate (i.e. the velocity flow meter reading) the equations of 15c are linear equations (assuming K (i.e. $C_d\epsilon$), $K^*$ & $K_{PPL}$ are constants for simplicity of explanation). That is this is a straight forward equation of a line y=mx. We know from an earlier argument that (for this example of most of the pressure being recovered behind the DP meter) $EA_t K < EA_t K^* < AK_{PPL}$. (Note a similar argument could be made for when this is not the case, i.e. $EA_t K < AK_{PPL} < EA_t K^*$, but this diagnostic concept operates with the same process and is therefore not shown here.) Therefore as we can say:

$$\rho = M_t \Delta P_t = M_r \Delta P_r = M_f \Delta P_f \quad (15d)$$

where:

$$M_t = 2\left(\frac{EA_t K}{Q}\right)^2, \quad (15e)$$

$$M_r = 2\left(\frac{EA_t K^*}{Q}\right)^2, \quad (15f)$$

$$M_f = 2\left(\frac{AK_{PPL}}{Q}\right)^2 \quad (15g)$$

Figure 12:
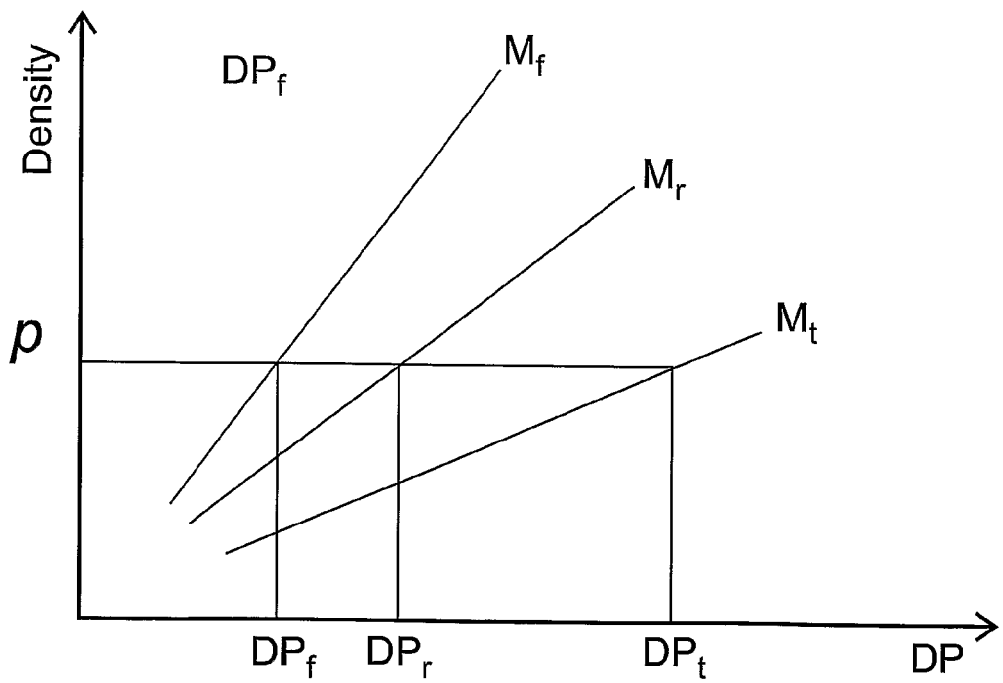
FIG. 12 shows a density vs. differential pressure plot.

As we know $M_t < M_r < M_f$ we can draw FIG. 12. Note again that FIG. 12 is a sketch to illustrate the above principle and is not precisely scaled. (An equivalent sketch can be made for the $EA_t K < AK_{PPL} < EA_t K^*$ case.)

Therefore if the meter system is operating properly and there is no problem with the velocity meter and the pressure tappings of the DP meter than there will be three density calculations from the three equations shown as equation 15c that give the correct result within their uncertainty limits. That is, these will when everything is working correctly be equal to not only each other but also the independent density calculation the meter uses as standard. That is the normal DP meter procedure of measuring the upstream pressure and the downstream temperature and for a known fluid component calculating the density via a PVT calculation. (Note liquids are seen as effectively incompressible so this is the easiest situation.) Gases have their density predicted by either the gas equation or by PVT calculations set up in the flow computer software. Here then the three density predictions have a fourth value, a reference to be compared to (i.e. the PVT density prediction).

Figure 13:
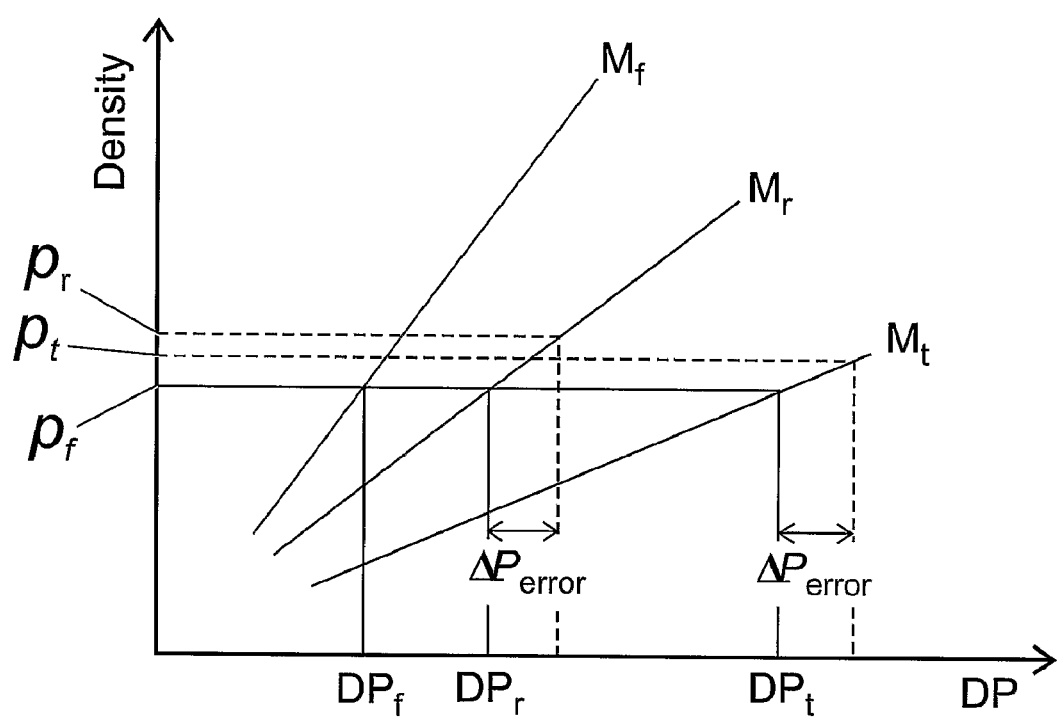
FIG. 13 shows a density discrepancy induced by incorrect throat pressure.
Figure 14:
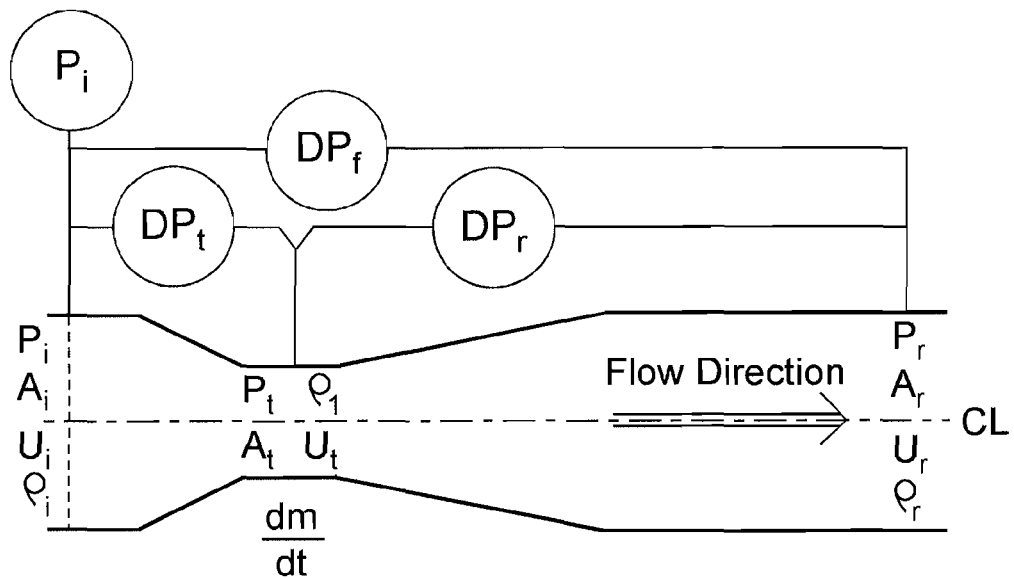
FIG. 14 shows a sketch of a venturi meter with upstream/inlet pressure reading, the traditional differential pressure reading as well as the unconventional recovery differential pressure and total head loss reading.
Figure 15:
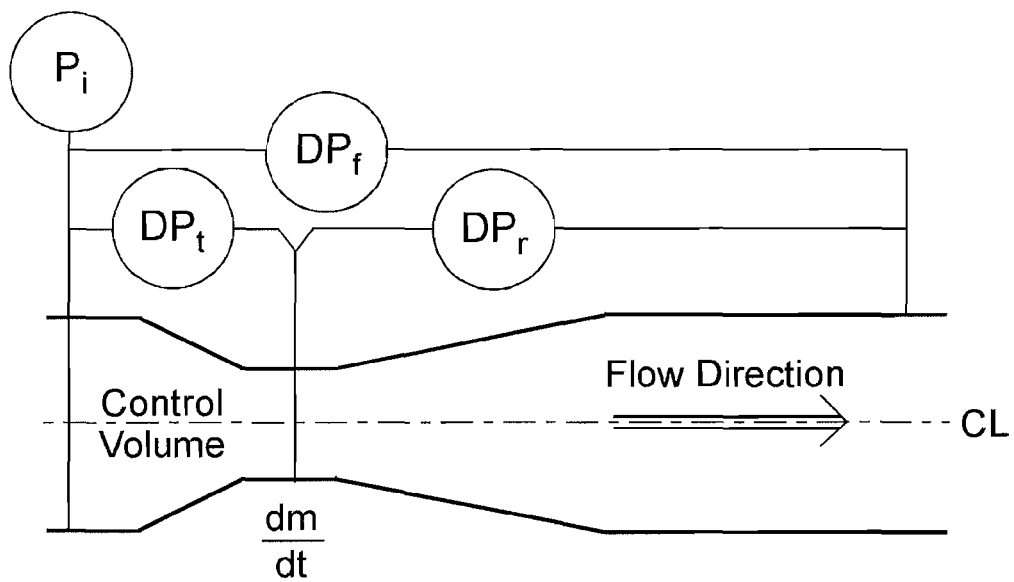
FIG. 15 shows a sketch of venturi meter with control volume located in converging section.
Figure 16:
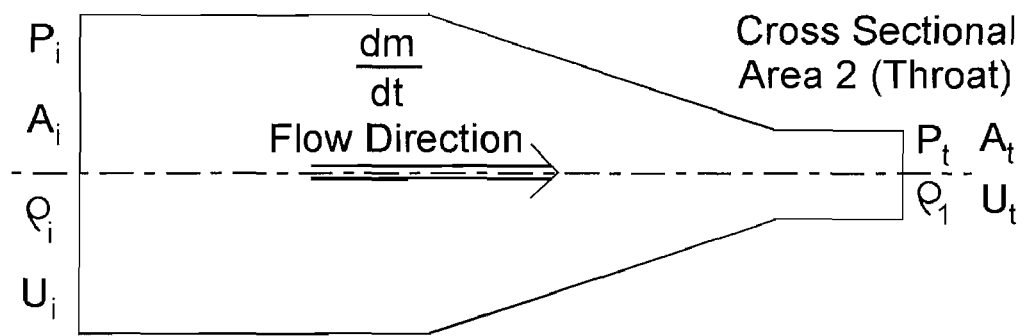
FIG. 16 shows a magnified control volume located in converging section.
Figure 17:
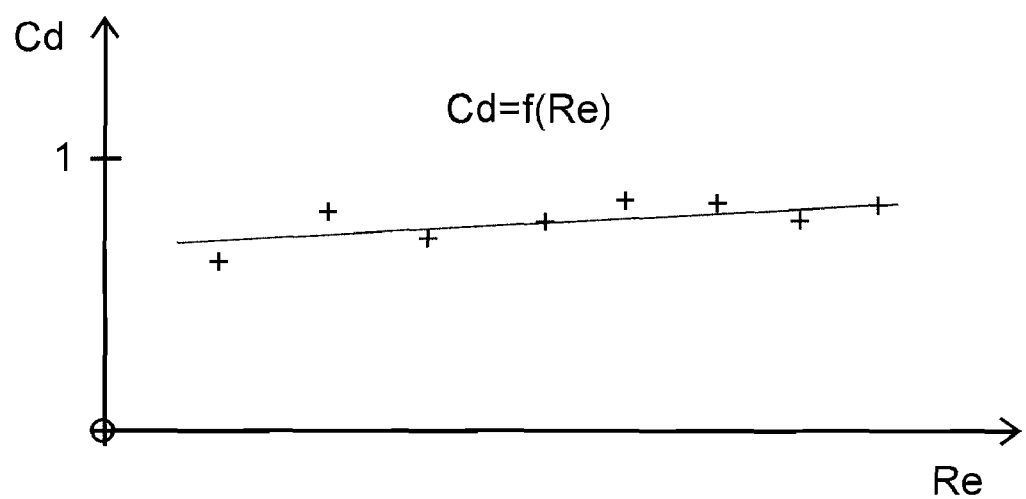
FIG. 17 shows a sketch of a typical DP meter calibration.
Figure 18:
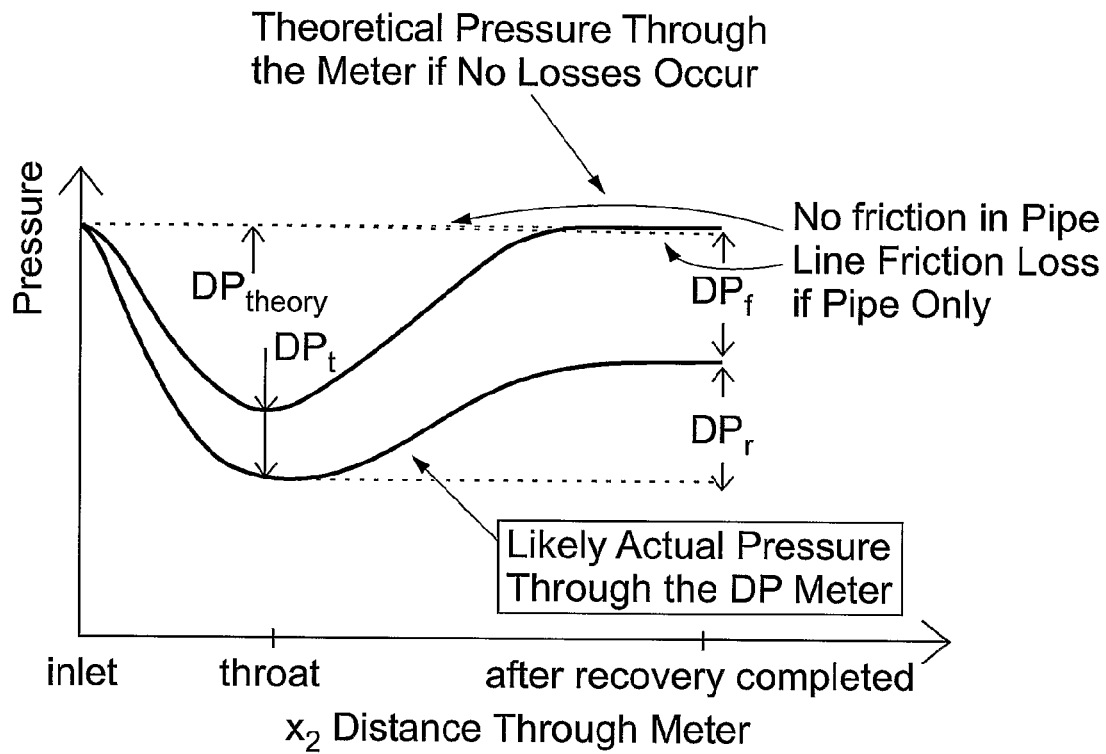
FIG. 18 shows the theoretical no loss and a typical realistic pressure path a flow would take through a generic DP meter (such as a venturi meter)

It is now interesting to see what happens to the predicted density values when there is a problem with one of the pressure ports. It should be immediately apparent to the reader that a problem with the upstream port means a problem with the "reference" gas density calculation as it uses the upstream gas and downstream temperature readings to predict the fluid density. We will come back to this initially troublesome point later and use it to our advantage. Let us start by being consistent and taking the same example as discussed earlier, that is a problem with the throat pressure port when the throat pressure is artificially low due to some problem (e.g. port was previously blocked by wax, scale or a ice or hydrate plug when the pressure at the throat was lower than the current real value or perhaps a steam flows water leg in the throat pressure impulse line has had some evaporation meaning that leg has a smaller liquid water column than at the time of the DP transmitter calibration). The traditional and recovery differential pressure readings are therefore artificially high and the permanent pressure loss differential pressure has not been affected. FIG. 13 shows the effect on the density predictions of equation 15c if there is an artificially low pressure measured at the throat tapping.

Figure 11:
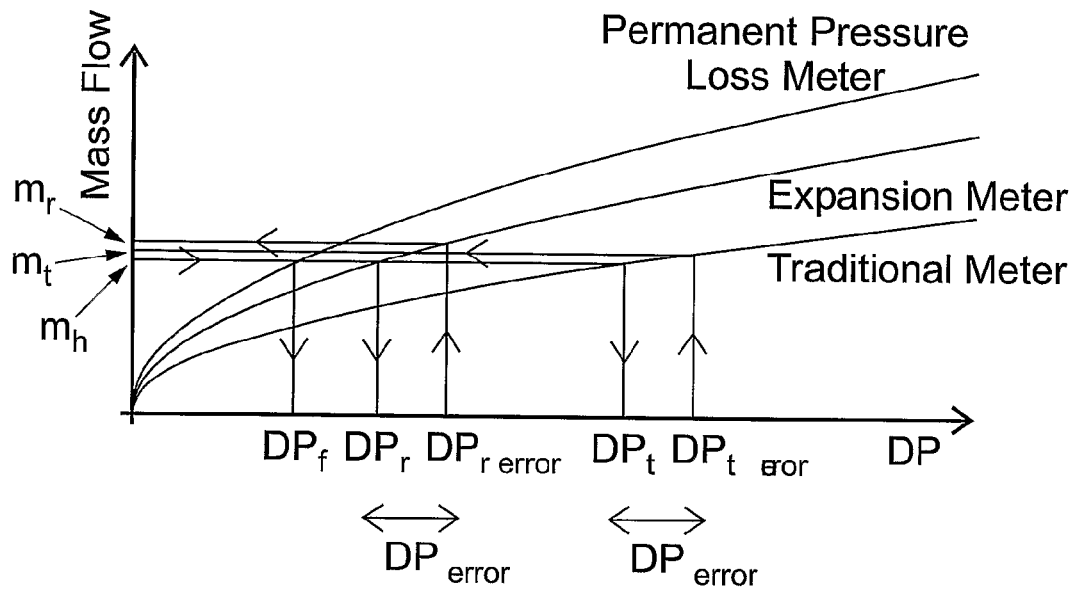
FIG. 11 shows a sketch of equation 15b (as discussed below) for the example of FIG. 10.

It will be noted that FIG. 13 looks very similar to FIG. 11. In fact the result of the differential pressure error is the same. That is, where as the low throat pressure caused a mass flow rate prediction result of $m_h < m_t < m_r$, it can be seen from FIG. 13 that for a DP meter and velocity meter in series it has also caused a density prediction of $\rho_f < \rho_t < \rho_r$. In fact, due to the mathematical relationship $M_r < M_t < M_f$ we find that carrying out the same exercise as was done on equation set 15's response for the six possibilities of a one pressure port having an artificially high or low pressure we find that the results mirror the mass flow rate prediction (and this is not by coincidence).

Let us now discuss how this result can be used to form a diagnostic tool that allows the meters flow computer to monitor its own performance.

If the upstream pressure port has a problem (i.e. the pressure read is higher or lower than the actual pressure) the absolute pressure reading at this port will be incorrect and this error will result in the PVT calculation receiving the incorrect inlet pressure and hence an incorrect density value will be predicted. Meanwhile the DP meters flow computer will cross check the three density predictions from the three differential pressures. The problem at the upstream/inlet pressure tapping means the traditional and permanent pressure loss differential pressures are in error and the recovery differential pressure is unaffected. Therefore these three density predictions do not match. When these three different differential pressure deduced densities are each compared to the PVT calculated density none will match.

If the low pressure/throat pressure port has a problem (i.e. the pressure read is higher or lower than the actual low pressure/throat pressure) the problem at the throat/low pressure tapping means the traditional and the recovery differential pressure will be in error. The permanent pressure loss differential pressures is unaffected. Therefore these three density predictions deduced from the differential pressures do not match. The upstream tapping is working correctly so the PVT density calculation should be correct. Therefore when the three differential pressure reduced density predictions are compared to the PVT density one will match (within the uncertainty limits), i.e. the permanent pressure loss density prediction. If none matched the PVT value we would then know it is the upstream pressure port that has the problem as no other possible scenario for the assumption of one port blocked only out of the three offers the solution of no match for all four density predictions. Therefore here, with the permanent pressure loss density prediction matching the PVT prediction we know that this is therefore the real result and the other two are now known to be false. The corresponding real mass flow rate value is derived from the product of this density prediction with the volume flow rate meter and/or the substitution of this density into the permanent head loss mass flow rate calculation (i.e. equation 12) and not equations A1.18 and A2.13 as they have incorrect respective differential pressures and will therefore give the wrong mass flow prediction.

If the downstream pressure port has a problem (i.e. the pressure read is higher or lower than the actual recovered pressure) the problem at the downstream pressure tapping means the recovery and the permanent pressure loss differential pressures will be in error. The traditional differential pressure is unaffected. Therefore these three density predictions deduced from the differential pressures do not match. The upstream tapping is working correctly so the PVT density calculation should be correct. Therefore when the three differential pressure deduced density predictions are compared to the PVT density one will match (within the uncertainty limits), i.e. the traditional differential pressure density prediction. If none matched the PVT value we would then know it is the upstream pressure port that has the problem as no other possible scenario for the assumption of one port blocked only out of the three offers the solution of no match for all four density predictions. Therefore here, with the traditional differential pressure density prediction matching the PVT prediction we know that this is therefore the real result and the other two are now known to be false. The corresponding real mass flow rate value is derived from the product of this density prediction with the volume flow rate meter and/or the substitution of this density into the traditional differential mass flow rate calculation (i.e. equation A1.18) and not equations A2.13- and 12 as they have incorrect respective differential pressures and will therefore give the wrong mass flow prediction.

So then, if we have a density match (within uncertainties) between the PVT density prediction and one of the three density predictions derived from the combining the velocity flow rate meter prediction with the three read differential pressures in turn we can derive which is correct and therefore what the actual mass flow rate is and where the problem is with regards to the pressure port. However, if there is no match we know that the problem must lie in the upstream port. Therefore the recovery differential pressure is to be used to predict the density and mass flow rate correctly and through these results find the error in the upstream pressure port.

That is for a velocity Flow Meter and Generic DP Meter with the three pressure tappings we have derived the following rules:

Low $P_t$ $m_h < m_t < m_r$ AND $\rho_f < \rho_t < \rho_r$ AND $\rho_{PVT} \neq \rho_f \neq \rho_t \neq \rho_r$ Therefore upstream tapping has the problem and therefore $m_r$ and $\rho_r$ are the correct results.

$\Delta P_t$ and $\Delta P_f$ are in error.

$|\Delta P_{t\,error}| = |\Delta P_{f\,error}| = |\Delta P_{error}|$ $\Delta P_{t_{error}}$ is negative (i.e. reduces the value read from the correct answer).

$\Delta P_{f_{error}}$ is negative (i.e. reduces the value read from the correct answer).

$$\frac{\Delta P_f}{\Delta P_t} < \text{expected answer}, \quad \frac{\Delta P_r}{\Delta P_t} > \text{expected answer}$$

Low $P_t$ $m_h < m_t < m_r$ AND $\rho_f < \rho_t < \rho_r$ AND $\rho_{PVT} \neq \rho_f \neq \rho_t \neq \rho_r$ Therefore throat tapping has the problem and therefore $m_h$ and $\rho_{PVT} = \rho_f$ are the correct results.
$\Delta P_t$ and $\Delta P_r$ are in error.

$|\Delta P_{t\,error}| = |\Delta P_{r_{error}}| = |\Delta P_{error}|$ $\Delta P_{t_{error}}$ is positive (i.e. increases the value read from the correct answer).
$\Delta P_{r_{error}}$ is positive (i.e. increases the value read from the correct answer).

$\dfrac{\Delta P_f}{\Delta P_t} <$ expected answer, $\dfrac{\Delta P_r}{\Delta P_t} >$ expected answer High $P_d$ $m_h < m_t < m_r$ AND $\rho_f < \rho_t < \rho_r$ AND $\rho_{PVT} \neq \rho_f \neq \rho_t \neq \rho_r$ Therefore downstream tapping has the problem and therefore $m_t$ and $\rho_{PVT} = \rho_t$ are the correct results.
$\Delta P_f$ and $\Delta P_r$ are in error.

$|\Delta P_{f_{error}}| = |\Delta P_{r_{error}}| = |\Delta P_{error}|$ $\Delta P_{f_{error}}$ is negative (i.e. decreases the value read from the correct answer).
$\Delta P_{r_{error}}$ is positive (i.e. increases the value read from the correct answer).

$\dfrac{\Delta P_f}{\Delta P_t} <$ expected answer, $\dfrac{\Delta P_r}{\Delta P_t} >$ expected answer High $P_i$ $m_r < m_t < m_h$ AND $\rho_r < \rho_t < \rho_f$ AND $\rho_{PVT} \neq \rho_f \neq \rho_t \neq \rho_r$ Therefore inlet tapping has the problem and therefore $m_r$ and $\rho_r$ are the correct results. $\Delta P_t$ and $\Delta P_f$ are in error.

$|\Delta P_{t\,error}| = |\Delta P_{f_{error}}| = |\Delta P_{error}|$ $\Delta P_{t_{error}}$ is positive (i.e. increases the value read from the correct answer).
$\Delta P_{f_{error}}$ is positive (i.e. increases the value read from the correct answer).

$\dfrac{\Delta P_f}{\Delta P_t} >$ expected answer, $\dfrac{\Delta P_r}{\Delta P_t} <$ expected answer High $P_t$ $m_r < m_t < m_h$ AND $\rho_r < \rho_t < \rho_f$ AND $\rho_{PVT} \neq \rho_f \neq \rho_t \neq \rho_r$ Therefore throat tapping has the problem and therefore $m_h$ and $\rho_{PVT} = \rho_f$ are the correct results.
$\Delta P_t$ and $\Delta P_r$ are in error.

$|\Delta P_{t\,error}| = |\Delta P_{r_{error}}| = |\Delta P_{error}|$ $\Delta P_{t_{error}}$ is negative (i.e. decreases the value read from the correct answer).
$\Delta P_{r_{error}}$ is negative (i.e. decreases the value read from the correct answer).

$\dfrac{\Delta P_f}{\Delta P_t} >$ expected answer, $\dfrac{\Delta P_r}{\Delta P_t} <$ expected answer Low $P_d$ $m_r < m_t < m_h$ AND $\rho_r < \rho_t < \rho_f$ AND $\rho_{PVT} \neq \rho_f \neq \rho_t \neq \rho_r$ Therefore downstream tapping has the problem and therefore $m_t$ and $\rho_{PVT} = \rho_t$ are the correct results.
$\Delta P_f$ and $\Delta P_r$ are in error.

$|\Delta P_{f_{error}}| = |\Delta P_{r_{error}}| = |\Delta P_{error}|$ $\Delta P_{f_{error}}$ is positive (i.e. increases the value read from the correct answer).
$\Delta P_{r_{error}}$ is negative (i.e. reduces the value read from the correct answer).

$\dfrac{\Delta P_f}{\Delta P_t} >$ expected answer, $\dfrac{\Delta P_r}{\Delta P_t} <$ expected answer Theoretically then for the case of a velocity flow meter that is in series with a generic DP meter with a downstream tap or for the case of a hybrid velocity/DP flow meter with a downstream tap the meter will give live mass flow, volume flow and density readings hereby allowing the PVT calculations accuracy to be continually checked.

For the case of the PVT calculation being trusted when the velocity flow meter is giving the correct flow rate and one pressure port gives a wrong reading due to a problem with a tap the diagnostic ability of cross referencing the available information allows the correct mass flow and density readings to be found and through this a statement of what tapping is operating incorrectly and in what way can be produced by the flow computer.

For the case where the PVT density prediction is not equal to the three DP meter density predictions (by use of the three DP's read) but the three DP meter density predictions agree with each other the diagnostic result is to state the PVT calculation is in error (i.e. check fluid property input to the calculation and the temperature reading) or the velocity meter is in error and requires maintenance. That is, if the PVT fluid property input is checked and found correct the velocity meter should be checked. If it is out of calibration due to damage or wear etc. the DP meter can be used to recalibrate it in-situ.

For the cases where there are different PVT density and DP meter density prediction disagreements an unspecified error indicating another malfunction can be declared.

A practical concern of such a method in reality is if the normal operating uncertainties of the flow meter readings are too large to see the differences that theory says are there when there is a pressure tapping problem. The worst case by far is the upstream pressure port problem. The PVT calculation uses the direct absolute pressure not a differential, pressure. For a set pressure error on the upstream pressure tapping the error in the corresponding traditional and permanent pressure loss differential pressures are going to be an order of magnitude higher than the error on the PVT calculation. That is unless the error in the pressure port is substantial compared to the absolute pressure at the inlet the error in the PVT density is going to be small. In fact although theoretically we get for a upstream pressure error the result $\rho_{PVT} \neq \rho_f \neq \rho_t \neq \rho_r$ in reality we are likely to see $\rho_{PVT} = \rho_f \neq \rho_t \neq \rho_r$. This however, should not matter in practical terms as this result still lets us state that the real result is $\rho_r$ and therefore the real mass flow rate is $m_r$.

There are of course a number of different design options. If an ultrasonic meter was used, the vortex shedding bluff body of the volume meter connected in series with it would act to obstruct flow and effectively create a differential pressure, with the remaining pipe giving the other DP meter readings in a manner analagous to the straight pipe example mentioned above.

A worked example to illustrate the proposed diagnostic method will now be discussed. For simplicity, air is used as the flowing medium so as the gas equation can be used (instead of a complex PVT AGA8 calculation for a natural gas).

Appendix 4

A Worked Example Using Realistic Conditions

Let us say we have an air flow of 800 m$^3$/hr (i.e. 0.2222 m$^3$/s) through a 6", schedule 80, 0.55 beta ratio Venturi meter and a 6", schedule 80, vortex meter (for example—it doesn't matter, any velocity flow meter would do) in series. The pressure is 20 Bara and the temperature is 293.15K. Air is assumed to behave like a perfect gas. The Venturi has a downstream pressure tapping. ISO 5167 Part 4 says a Venturi with a machined converging section has a discharge coefficient of 0.995.

This Venturi meter therefore has the following characteristics:

$D=0.14633$ m, $d=0.08048$ m, $A_t=0.00587$ m$^2$,
$E=1.04915$, $C_d=0.995$

The air has the following characteristics:

$R=287$ J/kg K, $Z=1$

For simplicity of the argument assume that the expansibility factor ($\epsilon$) is approx 0.98. (This is an approximation as its more work to calculate that than any other parameter and its second order effect anyway. If it is out by 50% it doesn't make any difference to what we are showing anyway. The same trends would be found by the precise expansibility value.)

The textbook "Flow Measurement Engineering Handbook" 3$^{rd}$ Ed by Richard Miller (McGraw-Hill) states with its FIG. 6.37 for a Venturi with a beta ratio of 0.55 and a 15° exit on the diffuser the permanent pressure loss is 15% of the traditional differential pressure. By evoking equation 14 this also tells us that the recovery pressure is 85% of the traditional differential pressure.

First calculate the actual gas (air) density by using the gas equation:

$$\rho = \frac{P}{ZRT} = \frac{2{,}000{,}000}{1*287*293.15} = 23.77 \text{ kg/m}^3$$

The mass, flow rate is therefore from equation one 5.2826 kg/m$^3$. Now we can calculate the actual traditional differential pressure by using:

$$m = EA_t K\sqrt{2\rho\Delta P_t} \quad (A1.18)$$

$$m = EA_t K^* \sqrt{2\rho\Delta P_r} \quad (A2.13)$$

$$m = AK_{PPL}\sqrt{2\rho\Delta P_f} \quad (12)$$

-continued $$m = EA_t K\sqrt{2\rho\Delta P_t} = EA_t K^*\sqrt{2\rho\Delta P_r} = AK_{PPL}\sqrt{2\rho\Delta P_f} \quad (15)$$

$$m = EA_t \epsilon C_d \sqrt{2\rho\Delta P_t}$$

i.e. $\Delta P_t \frac{1}{2\rho}\left(\frac{m}{EA_t \epsilon C_d}\right)^2 = 21671$ Pa Now calculating the actual recovery differential pressure and actual permanent pressure loss:

$\Delta P_f = 0.15*\Delta P_t = 3251$ Pa $\Delta P_r = 0.85*\Delta P_t = 18420$ Pa This means that the pressure ports will have the following actual pressures:

$P_i = 2{,}000{,}000$ Pa $P_t = 1{,}978{,}329$ Pa $P_d = 1{,}996{,}749$ Pa

Finally to set up our understanding of the Venturi meter we will calculate K* and $K_f$ by use of equations.

$$K^* = \frac{m_{reference}}{EA_t\sqrt{2\rho\Delta P_r}} = 1.0576 \quad (A2.13b)$$

$$K_t = \left(\frac{A}{m_{reference}}\right)^2 (2\rho\Delta P) = 1.566 \quad (12a)$$

$$K_{PPL} = \frac{1}{\sqrt{K_t}} = \frac{m_{reference}}{A\sqrt{2\rho\Delta P_f}} = 0.799 \quad (13)$$

The vortex meter should of course be reading a volume flow rate of 0.2222 m$^3$/s± the meters uncertainty. In this example we shall assume the value of 0.2222 m$^3$/s is known from the vortex meter.

Therefore with normal operation of this system we know the volume flow rate from the vortex meter and the differential pressures from the readings. We know the density from the PVT calculation based on the upstream pressure reading. We know from the DP meter geometry and the DP meter calibration the velocity of approach (E), the throat area ($A_t$) and the coefficients K, K* & $K_{PPL}$. The mass flow is predicted by the product of the PVT calculated density and the vortex meter volume flow rate and/or the use of the PVT calculated density in equation series 15. The volume flow rates and PVT density are checked via equation series 15b and 15c respectively. (Note in normal operation with all systems showing no problem the PVT density with either the velocity meter or and the traditional DP meter equation would usually give the most accurate mass flow rate prediction.)

$$m = EA_t K\sqrt{2\rho\Delta P_t} = EA_t K^*\sqrt{2\rho\Delta P_r} = AK_{PPL}\sqrt{2\rho\Delta P_f} \quad (15)$$

$$Q = EA_t K\sqrt{\frac{2\Delta P_t}{\rho}} = EA_t K^*\sqrt{\frac{2\Delta P_r}{\rho}} = AK_{PPL}\sqrt{\frac{2\Delta P_f}{\rho}} \quad (15b)$$

$$\rho = 2\Delta P_t\left(\frac{EA_t K}{Q}\right)^2 = 2\Delta P_r\left(\frac{EA_t K^*}{Q}\right)^2 = 2\Delta P_f\left(\frac{AK_{PPL}}{Q}\right)^2 \quad (15c)$$

Now, let us introduce a problem to one of the tappings and see what the diagnostic procedure tells us. Let us say that the throat tapping has a leaky connection between the meter thread and the transmitter. It is therefore reading an artificially low throat pressure. Let us say the error is 1000 Pa. That is the throat pressure read is:

$$P_{t,Error}=1,978,329 \text{ Pa}-1000 \text{ Pa}=1,977,329 \text{ Pa}$$

Therefore, the read differential pressures are not all the real values:

$$\Delta P_t=21,671 \text{ Pa}$$

$$\Delta P_r=18,420 \text{ Pa}$$

$$\Delta P_f=3,251 \text{ Pa}$$

But rather:

$$\Delta P_t=22,671 \text{ Pa}$$

$$\Delta P_r=19,420 \text{ Pa}$$

$$\Delta P_f=3,251 \text{ Pa}$$

We as yet don't know if these are the real values or not so we start the diagnostic procedure. Importing these values to equation series 15c a gives the results:

$$\rho_t=24.87 \text{ kg/m}^3$$

$$\rho_r=25.06 \text{ kg/m}^3$$

$$\rho_f=23.77 \text{ kg/m}^3$$

which go along with the known result from the gas equation (or what would be the PVT equation for natural gas) that is $\rho_{PVT}=23.77$ kg/m$^3$.

Importing these values to equation series 15 gives the results:

$$m_t=5.403 \text{ kg/s}$$

$$m_r=5.424 \text{ kg/s}$$

$$m_f=5.283 \text{ kg/s}$$

Importing these values to equation series 15b (where the density values are taken from the PVT calculation) gives the results:

$$Q_t=0.227 \text{ m}^3/\text{s}$$

$$Q_r=0.228 \text{ m}^3/\text{s}$$

$$Q_f=0.222 \text{ m}^3/\text{s}$$

Therefore we have the result:

$$m_h<m_t<m_r \text{ AND } \rho_f<\rho_t<\rho_r \text{ AND } \rho_{PVT}=\rho_f\neq\rho_t\neq\rho_r$$

The rules set up earlier say that in these cases where the PVT density matches either the recovery or permanent pressure loss differential pressure deduced density and does not approximately match the traditional differential pressure deduced density then the problem is not with the upstream tapping. (In this case even with a small throat pressure error of 1000 Pa the "PVT" density calculation and the traditional differential pressure deduced density are different by approximately 4.6% which is already beyond the point where combined uncertainties could produce such a difference.) The rules also say that in the case of the "PVT" density calculation being equal to the permanent pressure loss differential pressure deduced density then this is the correct fluid density (i.e. $\rho_{PVT}=\rho_f$) and therefore the permanent pressure loss mass flow equation gives the correct mass flow rate (i.e. $m_h$). Note that due to the square root of the differential pressures in equation series 15c the density prediction variations are clearer to see in the results than the mass flow prediction variations.

Therefore we now know that the actual mass flow and density has to be:

$$m_{actual}=m_f=5.283 \text{ kg/s and } \rho_{actual}=\rho_f=23.77 \text{ kg/m}^3$$

We know the throat tapping has an error and it has to be a negative error (i.e. the pressure read is less than is really in the throat). Finally, for academic completion (although the above is enough for meter users), the scale of the error can be found by substituting the now known actual mass flow rate and the known actual density into equation series 15.

$$m_{actual}=m_f=EA_tK\sqrt{2\rho_{PVT}\Delta P_t}=EA_tK^*\sqrt{2\rho_{PVT}\Delta P_r}=AK_{PPL}\sqrt{2\rho_{PVT}\Delta P_f} \quad (15)$$

It will be found that the permanent pressure loss $\Delta P_f$ is the same as the read value but the traditional and recovery differential pressures (i.e. $\Delta P_t$ and $\Delta P_r$) will both be found to be 1000 Pa too high indicating that the throat pressure reading is 1000 Pa too low. This diagnostic procedure is now successful and complete.

With that worked example complete different scenarios will now be discussed by use of imported spreadsheets based on the reference spreadsheet below for correct operation with no problems to be diagnosed.

There are several choices involved with producing such a spreadsheet. The choices here were:

To name the traditional differential pressure reading density prediction "Density YCd", the recovery differential pressure reading density prediction "Density Kg*" and the permanent pressure loss differential pressure reading density prediction "Density. Kppl". The volume calculations (i.e "Vol Trad", "Vol Rec" and "Vol PPL" that are the volume flow rate calculations using the traditional, recovery and permanent pressure loss differential pressure volume equations respectively (equation series 15b)) use the correct density estimation as found by the density comparison rule. The mass flow calculations (i.e "Mass Trad", "Mass Rec" and "Mass PPL" that are the mass flow rate calculations using the traditional, recovery and permanent pressure loss differential pressure volume equations respectively (equation series 15)) use the correct density estimation as found by the density comparison rule. The same diagnostic results can be achieved (even if the erroneous results are different values) if we had decided to calculate the mass flow predictions for each of the three differential pressure readings by taking the product of the density values found by equation series 15 and the volume flow rate from the velocity meter. In fact in retrospect that would have been a better method as a training tool as then we would have had negative mass flow rates instead of no answer for the cases where the erroneous density prediction from the permanent pressure loss was negative (see examples A2 and C4).

| 6" sch 80 Venturi beta 0.55, 15 deg diffuser exit | | | | |
|---|---|---|---|---|
| D | 5.761" | 0.14633 m | DPt | 21670.5 Pa |
| beta | 0.55 | | DPr | 18420 Pa |
| d | 3.1686" | 0.08048 m | DPf | 3250.58 Pa |

-continued

| 6" sch 80 Venturi beta 0.55, 15 deg diffuser exit | | | | | |
|---|---|---|---|---|---|
| At | | 0.00509 m^2 | DPr/DPt | 0.85 | |
| A | | 0.01682 m^2 | DPf/DPt | 0.15 | |
| E | | 1.04915 | | | |
| Y | | 0.98 | P1 | 2000000 | Pa |
| Cd | | 0.995 | Pt | 1978329 | Pa |
| | | | Pd | 1996749 | Pa |
| PPL | | 15% of DPt | | | |
| | | | Kg* | 1.058 | |
| P1 | 20 bar | 2000000 Pa | Kppl | 0.799 | |
| T | 293.15 K | | K loss | 1.566 | |
| Z | 1 | | | | |
| R | 287 J/Kg K | | Calc Density YCd | 23.772 | kg/m^3 |
| | | | Calc Density Kg* | 23.772 | kg/m^3 |
| Gas Density | 23.772 kg/m^3 | | Calc Density Kppl | 23.772 | kg/m^3 |
| Q (m^3/hr) | 800 m^3/hr | | Calc Vol Trad | 0.222 | m^3/s |
| Q (m^3/s) | 0.2222 m^3/s | | Calc Vol Rec | 0.222 | m^3/s |
| U | 13.214 m/s | | Calc Vol PPL | 0.222 | m^3/s |
| m (kg/s) | 5.2826 kg/s | | Actual Vol | 0.222 | m^3/s |
| | | | Calc Mass Trad | 5.283 | kg/s |
| | | | Calc Mass Rec | 5.283 | kg/s |
| | | | Calc Mass PPL | 5.283 | kg/s |
| | | | Actual Mass | 5.283 | kg/s |

Before the diagnostic procedure is repeatedly tested for different error prediction scenarios it should be remembered that as stand alone devices the generic DP meter and the standard velocity meter are "dumb" meters (i.e. neither has significant diagnostic abilities). That is they have virtually no diagnostic ability and have no method of checking the validity of the readings and the health of their components. This then offers a different level of control and confidence than has previously been available for relatively cheap standard meter systems.

The diagnostic procedure starts with checking everything is working, that is all inter-comparisons are cross checking as required. This means that the results are showing:

$\rho_{PVT} = \rho_t = \rho_r = \rho_f$ and $m_t = m_r = m_h$ (within system uncertainties)

Here everything is operating as required. The meter output should be the PVT density, and the mass and volume flow rate that this density gives when applied to either the velocity meter or the traditional DP equation as it will typically have the least uncertainty of all the flow rate equations.

The first example of a non conformity is different to the others that follow which will indicate a disagreement between the differential pressure readings. This example shows what happens if there is no differential pressure reading abnormality but the PVT density and velocity meter disagree with the DP meter derived values. That is, the first check will be for:

$\rho_{PVT} \neq \rho_t = \rho_r = \rho_f$ and $m_t = m_r = m_h$ (within system uncertainties)

Here the PVT density calculation does not agree with the three agreeing differential pressure based density predictions. The fact that the differential pressure densities all agree, as do the associated predicted mass flows, as do the values of $$\frac{\Delta P_r}{\Delta P_t} \text{ and } \frac{\Delta P_f}{\Delta P_t}$$

(in this case 0.85 and 0.15 respectively) clearly indicates that the DP meter ports are all reading correctly. There are two possibilities for such a result. The differential pressure predicted densities are independent of the PVT calculation and do not require any fluid component information. As the DP meter is expected to be working properly due to the $\rho_t = \rho_r = \rho_f$ and $m_t = m_r = m_h$ (within system uncertainties) result this then indicates two possibilities. First the fluid component input to the flow computer is incorrect and this is causing the PVT calculation to misjudge the true density of the fluid which is $\rho_t = \rho_r = \rho_f$. This then will require this information to be reviewed and updated. Or, secondly the volume flow meter is malfunctioning. The first possibility should be assumed initially. If after the updated fluid property information is fed to the flow computer and the output does not correct itself then the conclusion from this is the volume meter is malfunctioning and the system has produced a flag to the user that the meter needs maintenance and the system is currently useable only as a classic "dumb" DP meter with the usual unchecked density input from the PVT calculation.

The following diagnostic spreadsheets are for various potential non-conformities. A standard font means a correct known set value or a correctly calculated value, while a bold italicised font means an incorrect inputted or calculated value.

The first spreadsheet below shows the effect of the volume flow rate being incorrectly estimated as 700 m³/hr instead of the correct value of 800 m³/hr. All three differential pressure related density predictions agree but it is not the value stated by the PVT calculation. This and the fact that $$\frac{\Delta P_r}{\Delta P_t} \text{ and } \frac{\Delta P_f}{\Delta P_t}$$

are the correct size and correspondingly the flow rate outputs match each other indicates the differential pressure readings and therefore the upstream pressure reading are all in order. The first assumption would be that the PVT density prediction is wrong. However, if it were found that a check on the PVT prediction shows no errors then the only possibility left is the volume flow rate prediction is wrong and the velocity meter is malfunctioning and the fact that it needs maintenance is discovered by the diagnostic procedure. Furthermore as the upstream pressure, differential pressures and the PVT calculations are known to be okay the meter continues to operate as a standard "dumb" DP meter with the resulting volume flow rate from the PVT density prediction and DP volume flow rate equation indicating the size of the volume flow meters error. (If there has been damage to the velocity meter—e.g. an upstream bluff body that has taken the brunt of some impact then as long as there are no non-linear effects an in-situ recalibration to find the new volume flow meter K-factor could be done using the checked DP meter as the reference to start up the diagnostic abilities of the full system again—until such time as proper maintenance could be carried out.

In the spreadsheet we see $\rho_{PVT} \neq \rho_t = \rho_r = \rho_f$, $m_t = m_r = m_h$ and correct values of $$\frac{\Delta P_r}{\Delta P_t} \text{ and } \frac{\Delta P_f}{\Delta P_t}$$

(all within system uncertainties). The mass flow predictions are correct because it was assumed until proven otherwise the PVT density (the primary density measurement is correct). After checking the PVT calculation in this case it would be found that it is correct. Hence the problem is diagnosed to be with the velocity meter.

| | | | | | | |
|---|---|---|---|---|---|---|
| | | 6" sch 80 Venturi beta 0.55, 15 deg diffuser exit with error on velocity meter output. DP meter volume & mass flow rate output uses PVT density prediction. | | | | |
| D | 5.761" | 0.146329 m | | DPt | 21670.5 | Pa |
| beta | 0.55 | | | DPr | 18420 | Pa |
| d | 3.1686" | 0.080481 m | | DPf | 3250.58 | Pa |
| At | | 0.005087 m^2 | | DPr/DPt | 0.85 | |
| A | | 0.016817 m^2 | | DPf/DPt | 0.15 | |
| E | | 1.049153 | | | | |
| Y | | 0.98 | | P1 | 2000000 | Pa |
| Cd | | 0.995 | | Pt | 1978329 | Pa |
| | | | | Pd | 1996749 | Pa |
| PPL | | 15% of DPt | | | | |
| | | | | Kg* | 1.058 | |
| P1 | 20 bar | 2000000 Pa | | Kppl | 0.799 | |
| T | 293.15 K | | | K loss | 1.566 | |
| Z | 1 | | | | | |
| R | 287 J/Kg K | | Calc | Density YCd | *31.049* | kg/m^3 |
| | | | Calc | Density Kg* | *31.049* | kg/m^3 |
| Gas Density | 23.772 kg/m^3 | | Calc | Density Kppl | *31.049* | kg/m^3 |
| Q (m^3/hr) | *700* m^3/hr | | Calc | Vol Trad | *0.222* | m^3/s |
| Q (m^3/hr) | *0.1944* m^3/s | | Calc | Vol Rec | *0.222* | m^3/s |
| U | *11.562* m/s | | Calc | Vol PPL | *0.222* | m^3/s |
| m (kg/s) | *4.6223* kg/s | | Actual | Vol | 0.222 | m^3/s |
| | | | Calc | Mass Trad | *5.283* | kg/s |
| | | | Calc | Mass Rec | *5.283* | kg/s |
| | | | Calc | Mass PPL | *5.283* | kg/s |
| | | | Actual | Mass | 5.283 | kg/s |

The following is a series of spreadsheets where this set flow condition through this set meter was repeatedly given an error in one of the three tappings. That is the six different possibilities of a high or low pressure at one of the pressure ports only. For each possibility the size of the pressure error is increased from small to large (even where the actual read values would not make physical sense—i.e. the erroneous pressure is higher at the downstream pressure port than the inlet etc). The method works at all times. It works better at larger errors as would be expected. In some instances the erroneous DP's can be negative leading to no solutions for flow rate calculated by the DP meter equations due to the density predictions that get square rooted being negative. Such results of course make it easier to spot the correct values.

Inlet/Upstream Pressure Problems. Three selected errors.
A1) An Inlet Pressure Error of −1000 Pa.

| | | | | | |
|---|---|---|---|---|---|
| | | 6" sch 80 Venturi beta 0.55, 15 deg diffuser | | | |
| D | 5.761" | 0.146329 m | DPt | *20670.5* | Pa |
| beta | 0.55 | | DPr | 18420 | Pa |
| d | 3.1686" | 0.080481 m | DPf | *2250.58* | Pa |
| At | | 0.005087 m^2 | DPr/DPt | *0.89112* | |
| A | | 0.016817 m^2 | DPf/DPt | *0.10888* | |

-continued

| 6" sch 80 Venturi beta 0.55, 15 deg diffuser | | | | | | |
|---|---|---|---|---|---|---|
| E | | 1.049153 | | | | |
| Y | | 0.98 | | P1 | *1999000* | Pa |
| Cd | | 0.995 | | Pt | 1978329 | Pa |
| | | | | Pd | 1996749 | Pa |
| PPL | | 15% of DPt | | | | |
| | | | | Kg* | 1.058 | |
| P1 | 20 | bar | 2000000 Pa | Kppl | 0.799 | |
| T | 293.15 | K | | K loss | 1.566 | |
| Z | 1 | | | | | |
| R | 287 | J/Kg K | | Calc | Density YCd | *22.675* kg/m^3 |
| Gas Density | 23.772 | kg/m^3 | (actual) | Calc | Density Kg* | 23.772 kg/m^3 |
| Gas Density | *23.760* | kg/m^3 | (PVT) | Calc | Density Kppl | *16.459* kg/m^3 |
| Q (m^3/hr) | 800 | m^3/hr | | Calc | Vol Trad | *0.217* m^3/s |
| Q (m^3/s) | 0.2222 | m^3/s | | Calc | Vol Rec | 0.222 m^3/s |
| U | 13.214 | m/s | | Calc | Vol PPL | *0.185* m^3/s |
| m (kg/s) | *5.2799* | kg/s | | Actual | Vol | 0.222 |
| P1 leak | 19.99 | | 1999000 Pa | Calc | Mass Trad | *5.039* kg/s |
| DP error | *0.01* | bar | 1000 Pa | Calc | Mass Rec | 5.283 kg/s |
| | | | | Calc | Mass PPL | *3.657* kg/s |
| | | | | Actual | Mass | 5.283 kg/s |

Here we see that none of the density predictions match each other and we have $\rho_{PVT} \approx \rho_r \neq \rho_t \neq \rho_f$. The rules state then that $\rho_r$ is the correct density and also that $m_r$ is the correct mass flow rate. This is in fact seen to be correct on both counts. Note on the left column we see the error has caused the PVT density to have a small error and this error has been taken through to the uncorrected mass flow rate prediction (on the lower left column). In real flows the uncertainty of the instrument readings will mask such a small difference.

Note that if the DP meter was a stand alone device the problem with the inlet pressure tap may never have been noticed and the error in the traditional DP meter equation is 0.244 kg/s. In natural gas flows or steam for district heating after hours and days this is the equivalent a very large sum of money. The rest of the examples show similar situations.

A2) An Inlet Pressure Error of −5000 Pa.

| 6" sch 80 Venturi beta 0.55, 15 deg diffuser exit | | | | | | |
|---|---|---|---|---|---|---|
| D | 5.761" | | 0.146329 m | DPt | *16670.5* | Pa |
| beta | 0.55 | | | DPr | 18420 | Pa |
| d | 3.1686" | | 0.080481 m | DPf | *-1749.4* | Pa |
| At | | | 0.005087 m^2 | DPr/DPt | *1.10494* | |
| A | | | 0.016817 m^2 | DPf/DPt | *-0.1049* | |
| E | | 1.049153 | | | | |
| Y | | 0.98 say | | P1 | *1995000* | Pa |
| Cd | | 0.995 | | Pt | 1978329 | Pa |
| | | | | Pd | 1996749 | Pa |
| PPL | | 15% of DPt | | | | |
| | | | | Kg* | 1.058 | |
| P1 | 20 | bar | 2000000 Pa | Kppl | 0.799 | |
| T | 293.15 | K | | K loss | 1.566 | |
| Z | 1 | | | | | |
| R | 287 | J/Kg K | | Calc | Density YCd | *18.287* kg/m^3 |
| Gas Density | 23.772 | kg/m^3 | | Calc | Density Kg* | 23.772 kg/m^3 |
| Gas Density | *23.712* | kg/m^3 | | Calc | Density Kppl | *-12.794* kg/m^3 |
| Q (m^3/hr) | 800 | m^3/hr | | Calc | Vol Trad | *0.195* m^3/s |
| Q (m^3/s) | 0.2222 | m^3/s | | Calc | Vol Rec | 0.222 m^3/s |
| U | 13.214 | m/s | | Calc | Vol PPL | *#NUM!* m^3/s |
| m (kg/s) | *5.2694* | kg/s | | Actual | | |
| P1 leak | *19.95* | | *1995000 Pa* | Calc | Mass Trad | *4.064* kg/s |
| DP error | *0.05* | bar | 5000 Pa | Calc | Mass Rec | 5.283 kg/s |
| | | | | Calc | Mass PPL | *-2.843* kg/s |
| | | | | Actual | Mass | 5.283 kg/s |

Here we see for a greater error in the upstream tapping that again none of the density predictions match each other and we have $\rho_{PVT} \approx \rho_r \neq \rho_t \neq \rho_f$. It is interesting to note that there is now a recorded increase in pressure across the upstream to downstream ports which is of course not physically possible. This is a further option for diagnostic systems to utilize. The rules state then that $\rho_r$ is the correct density and also that $m_r$ is the correct mass flow rate. This is in fact seen to be correct on both counts. Note the negative permanent pressure loss differential pressure means a negative density (again impossible) and no solution for the volume or mass flow rate using the differential pressure equation and a reverse flow indication if using the Vortex meter and density prediction combination. A similar result is discussed in more detail in example C4. Note again on the left column we see the error has caused the PVT density to have a small error and this error has been taken through to the uncorrected mass flow rate prediction. In real flows the uncertainty of the instrument readings will mask such a small difference. As the size of the read upstream pressure continues to reduce from the real value the diagnostics show in an increasingly clear way the correct values from the incorrect values.

A3) An Inlet Pressure Error of +1000 Pa.

| 6" sch 80 Venturi beta 0.55, 15 deg diffuser exit | | | | | | |
|---|---|---|---|---|---|---|
| D | 5.761" | 0.146329 | m | | DPt | 22670.5 Pa |
| beta | 0.55 | | | | DPr | 18420 Pa |
| d | 3.1686" | 0.080481 | m | | DPf | 4250.58 Pa |
| At | | 0.005087 | m^2 | | DPr/DPt | 0.81251 |
| A | | 0.016817 | m^2 | | DPf/DPt | 0.18749 |
| E | | 1.049153 | | | | |
| Y | | 0.98 | | | P1 | 2001000 Pa |
| Cd | | 0.995 | | | Pt | 1999996 Pa |
| | | | | | Pd | 1996749 Pa |
| PPL | | 15% of DPt | | | | |
| | | | | | Kg* | 1.058 |
| P1 | 20 bar | 2000000 Pa | | | Kppl | 0.799 |
| T | 293.15 K | | | | K loss | 1.566 |
| Z | 1 | | | | | |
| R | 287 J/Kg K | | | Calc | Density YCd | 24.869 kg/m^3 |
| Gas Density | 23.772 kg/m^3 | (actual) | | Calc | Density Kg* | 23.772 kg/m^3 |
| Gas Density | 23.783 kg/m^3 | (PVT) | | Calc | Density Kppl | 31.085 kg/m^3 |
| Q (m^3/hr) | 800 m^3/hr | | | Calc | Vol Trad | 0.227 m^3/s |
| Q (m^3/s) | 0.2222 m^3/s | | | Calc | Vol Rec | 0.222 m^3/s |
| U | 13.214 m/s | | | Calc | Vol PPL | 0.254 m^3/s |
| m (kg/s) | 5.2852 kg/s | | | Actual | Vol | 0.222 m^3/s |
| P1 leak | 20.01 | 2001000 Pa | | Calc | Mass Trad | 5.526 kg/s |
| DP error | -0.01 bar | -1000 Pa | | Calc | Mass Rec | 5.283 kg/s |
| | | | | Calc | Mass PPL | 6.908 kg/s |
| | | | | Actual | Mass | 5.283 kg/s |

Here we see that none of the density predictions match each other and we have $\rho_{PVT} \approx \rho_r \neq \rho_t \neq \rho_f$. Actually the positive error makes the differences clearer to see.

The rules state then that $\rho_r$ is the correct density and also that $m_r$ is the correct mass flow rate. This is in fact seen to be correct on both counts. Note on the left column we see the error has caused the PVT density to have a small error and this error has been taken through to the uncorrected mass flow rate prediction. In real flows the uncertainty of the instrument readings will mask such a small difference.

A4) An Inlet Pressure Error of +5000 Pa.

| 6" sch 80 Venturi beta 0.55, 15 deg diffuser exit | | | | | | |
|---|---|---|---|---|---|---|
| D | 5.761" | 0.146329 | m | | DPt | 26670.5 Pa |
| beta | 0.55 | | | | DPr | 18420 Pa |
| d | 3.1686" | 0.080481 | m | | DPf | 8250.58 Pa |
| At | | 0.005087 | m^2 | | DPr/DPt | 0.69065 |
| A | | 0.016817 | m^2 | | DPf/DPt | 0.30935 |
| E | | 1.049153 | | | | |
| Y | | 0.98 say | | | P1 | 2005000 Pa |
| Cd | | 0.995 | | | Pt | 1999996 Pa |
| | | | | | Pd | 1996749 Pa |
| PPL | | 15% of DPt | | | | |
| | | | | | Kg* | 1.05764 |
| P1 | 20 bar | 2000000 Pa | | | Kf | 0.79904 |
| T | 293.15 K | | | | K loss | 1.56626 |
| Z | 1 | | | | | |
| R | 287 J/Kg K | | | | Density YCd | 22.481 kg/m^3 |
| Gas Density | 23.772 kg/m^3 | | | | Density Kg* | 23.772 kg/m^3 |
| Gas Density | 23.831 kg/m^3 | | | | Density Kf | 31.085 kg/m^3 |
| Q (m^3/hr) | 800 m^3/hr | | | Calc | Vol Trad | 0.216 m^3/s |
| Q (m^3/s) | 0.2222 m^3/s | | | Calc | Vol Rec | 0.22222 m^3/s |
| U | 13.214 m/s | | | Calc | Vol PPL | 0.254 m^3/s |
| m (kg/s) | 5.2958 kg/s | | | Actual | Vol | 0.2222 m^3/s |
| P1 leak | 20.05 | 2005000 Pa | | Calc | Mass Trad | 5.283 kg/s |
| DP error | -0.05 bar | -5000 Pa | | Calc | Mass Rec | 5.28258 kg/s |
| | | | | Calc | Mass PPL | 5.137 kg/s |
| | | | | Actual | Mass | 5.2826 kg/s |

Here we see that none of the density predictions match each other and we have $\rho_{PVT} \approx \rho_r \neq \rho_t \neq \rho_f$. The rules state then that $\rho_r$ is the correct density and also that $m_r$ is the correct mass flow rate. This is in fact seen to be correct on both counts. Note on the left column we see the error has caused the PVT density to have a small error and this error has been taken through to the uncorrected mass flow rate prediction. The upstream pressure port having a pressure error directly leads to an error in the PVT density calculation. This error leads to the only approximation in the rules as written above i.e. in particular $\rho_{PVT} \approx \rho_r \neq \rho_t \neq \rho_f$. The other rules give precise statements, i.e. no approximation sign. This could lead to concerns that the approximate method for the case of the upstream pressure tapping problem could lead to mistakes in the diagnostics. However, it is seen from the examples A1 and A3 that at low pressure errors at the upstream tapping the density predictions of the PVT and recovery differential pressure method are very close (probably within the uncertainty of the two methods) and the other two density values are not likely to cause confusion to which is larger than the other even with uncertainty of the system accounted for. This is more evident as the upstream pressure error gets larger in examples A2 and A4.

B1) A Throat Pressure Error of −1000 Pa.

| 6" sch 80 Venturi beta 0.55, 15 deg diffuser exit | | | | | | |
|---|---|---|---|---|---|---|
| D | 5.761" | 0.146329 | m | | DPt | *22670.55* Pa |
| beta | 0.55 | | | D | Pr | *19419.97* Pa |
| d | 3.1686" | 0.080481 | m | | DPf | 3250.582 Pa |
| At | | 0.005087 | m^2 | | DPr/DPt | *0.856617* |
| A | | 0.016817 | m^2 | | DPf/DPt | *0.143383* |
| E | | 1.049153 | | | | |
| Y (approx) | | 0.98 | | | P1 | 2000000 Pa |
| Cd | | 0.995 | | | Pt | *1977329* Pa |
| | | | | | Pd | 1996749 Pa |
| PPL | 15% of DPt | | | | | |
| | | | | | Kg* | 1.058 |
| P1 | 20 bar | 2000000 | Pa | | Kppl | 0.799 |
| T | 293.15 K | | | | K loss | 1.566 |
| Z | 1 | | | | | |
| R | 287 J/Kg K | | | Calc | Density YCd | *24.869* kg/m^3 |
| Gas Density | 23.772 kg/m^3 | (actual) | | Calc | Density Kg* | *25.062* kg/m^3 |
| | | | | Calc | Density Kppl | 23.772 kg/m^3 |
| Q (m^3/hr) | 800 m^3/hr | | | Calc | Vol Trad | *0.227* m^3/s |
| Q (m^3/s) | 0.2222 m^3/s | | | Calc | Vol Rec | *0.228* m^3/s |
| U | 13.214 m/s | | | Calc | Vol PPL | 0.222 m^3/s |
| m (kg/s) | 5.2826 kg/s | | | Actual | Vol | 0.222 m^3/s |
| | | | | Calc | Mass Trad | *5.403* kg/s |
| DP error | *0.01* bar | 1000 | Pa | Calc | Mass Rec | *5.424* kg/s |
| | | | | Calc | Mass PPL | 5.283 kg/s |
| | | | | Actual | Mass | 5.283 kg/s |

Here the pressure error at the throat (i.e. the port is reading 1000 Pa too low) gives the result of $m_h < m_t < m_r$ AND $\rho_f < \rho_t < \rho_r$ AND $\rho_{PVT} = \rho_f \neq \rho_t \neq \rho_r$. Therefore the rules dictate that the throat tapping has the problem and therefore $m_h$ and $\rho_{PVT} = \rho_f$ are the correct results. This is the correct diagnostic result.

B2) A Throat Pressure Error of −5000 Pa.

| 6" sch 80 Venturi beta 0.55, 15 deg diffuser exit | | | | | | |
|---|---|---|---|---|---|---|
| D | 5.761" | 0.14633 | m | | DPt | *26670.5* Pa |
| beta | 0.55 | | | | DPr | *23420* Pa |
| d | 3.1686" | 0.08048 | m | | DPf | 3250.58 Pa |
| At | | 0.00509 | m^2 | | DPr/DPt | *0.87812* |
| A | | 0.01682 | m^2 | | DPf/DPt | *0.12188* |
| E | | 1.04915 | | | | |
| Y (approx) | | 0.98 | | | P1 | 2000000 Pa |
| Cd | | 0.995 | | | Pt | *1973329* Pa |
| | | | | | Pd | 1996749 Pa |
| PPL | 15% of DPt | | | | | |
| | | | | | Kg* | 1.058 |
| P1 | 20 bar | 2000000 | Pa | | Kppl | 0.799 |
| T | 293.15 K | | | | K loss | 1.566 |
| Z | 1 | | | | | |
| R | 287 J/Kg K | | | Calc | Density YCd | *29.256* kg/m^3 |
| Gas Density | 23.772 kg/m^3 | | | Calc | Density Kg* | *30.224* kg/m^3 |
| | | | | Calc | Density Kppl | 23.772 kg/m^3 |
| Q (m^3/hr) | 800 m^3/hr | | | Calc | Vol Trad | *0.247* m^3/s |
| Q (m^3/s) | 0.2222 m^3/s | | | Calc | Vol Rec | *0.251* m^3/s |
| U | 13.214 m/s | | | Calc | Vol PPL | 0.222 m^3/s |
| m (kg/s) | 5.2826 kg/s | | | Actual | Vol | 0.222 m^3/s |
| | | | | Calc | Mass Trad | *5.860* kg/s |
| DP error | *0.05* bar | 5000 | Pa | Calc | Mass Rec | *5.957* kg/s |
| | | | | Calc | Mass PPL | 5.283 kg/s |
| | | | | Actual | Mass | 5.283 kg/s |

Here the pressure error at the throat (i.e. the port is reading 5000 Pa too, low) gives the result of $m_h<m_t<m_r$ AND $\rho_f<\rho_t<\rho_r$ AND $\rho_{PVT}=\rho_f\neq\rho_t\neq\rho_r$. Therefore the rules dictate that the throat tapping has the problem and therefore $m_h$ and $\rho_{PVT}=\rho_f$ are the correct results. This is the correct diagnostic result.

B3) A Throat Pressure Error of +1000 Pa.

| 6" sch 80 Venturi beta 0.55, 15 deg diffuser exit | | | | | | |
|---|---|---|---|---|---|---|
| D | 5.761" | 0.146329 | m | | DPt | *20670.55* Pa |
| beta | 0.55 | | | | DPr | *17419.97* Pa |
| d | 3.1686" | 0.080481 | m | | DPf | 3250.582 Pa |
| At | | 0.005087 | m^2 | | DPr/DPt | *0.842743* |
| A | | 0.016817 | m^2 | | DPf/DPt | *0.157257* |
| E | | 1.049153 | | | | |
| Y (approx) | | 0.98 | | | P1 | 2000000 Pa |
| Cd | | 0.995 | | | Pt | *1979329* Pa |
| | | | | | Pd | 1996749 Pa |
| PPL | 15% of DPt | | | | | |
| | | | | | Kg* | 1.057644 |
| P1 | 20 bar | 2000000 Pa | | | Kppl | 0.799 |
| T | 293.15 K | | | | K loss | 1.566 |
| Z | 1 | | | | | |
| R | 287 J/Kg K | | | Calc | Density YCd | *22.675* kg/m^3 |
| Gas Density | 23.772 kg/m^3 | | | Calc | Density Kg* | *22.481* kg/m^3 |
| | | | | Calc | Density Kppl | 23.772 kg/m^3 |
| Q (m^3/hr) | 800 m^3/hr | | | Calc | Vol Trad | *0.217* m^3/s |
| Q (m^3/s) | 0.2222 m^3/s | | | Calc | Vol Rec | *0.216* m^3/s |
| U | 13.214 m/s | | | Calc | Vol PPL | 0.222 m^3/s |
| m (kg/s) | 5.2826 kg/s | | | Actual | Vol | 0.222 m^3/s |
| | | | | Calc | Mass Trad | *5.159* kg/s |
| DP error | *0.01* bar | *1000* | *Pa* | Calc | Mass Rec | *5.137* kg/s |
| | | | | Calc | Mass PPL | 5.283 kg/s |
| | | | | Actual | Mass | 5.283 kg/s |

Here the pressure error the throat (i.e. the port is reading 1000 Pa too high) gives the result of $m_r<m_t<m_h$ AND $\rho_r<\rho_t<\rho_f$ AND $\rho_{PVT}=\rho_f\neq\rho_t\neq\rho_r$. Therefore the rules say the throat tapping has the problem and therefore $m_h$ and $\rho_{PVT}=\rho_f$ are the correct results. The difference in densities between the PVT and permanent pressure loss density calculation correct results and the nearest incorrect result is approximately −4.6% for this small pressure reading error at the throat. It should be expected that this is significantly above the density uncertainty of a PVT calculation.

B4) A Throat Pressure Error of +5000 Pa.

| 6" sch 80 Venturi beta 0.55, 15 deg diffuser exit | | | | | | |
|---|---|---|---|---|---|---|
| D | 5.761" | 0.14633 | m | | DPt | *16670.5* Pa |
| beta | 0.55 | | | | DPr | *13420* Pa |
| d | 3.1686" | 0.08048 | m | | DPf | 3250.58 Pa |
| At | | 0.00509 | m^2 | | DPr/DPt | *0.80501* |
| A | | 0.01682 | m^2 | | DPf/DPt | *0.19499* |
| E | | 1.04915 | | | | |
| Y (approx) | | 0.98 | | | P1 | 2000000 Pa |
| Cd | | 0.995 | | | Pt | *1983329* Pa |
| | | | | | Pd | 1996749 Pa |
| PPL | 15% of DPt | | | | | |
| | | | | | Kg* | 1.058 |
| P1 | 20 bar | 2000000 Pa | | | Kppl | 0.799 |
| T | 293.15 K | | | | K loss | 1.566 |
| Z | 1 | | | | | |
| R | 287 J/Kg K | | | Calc | Density YCd | *18.287* kg/m^3 |
| Gas Density | 23.772 kg/m^3 | | | Calc | Density Kg* | *17.319* kg/m^3 |
| | | | | Calc | Density Kppl | 23.772 kg/m^3 |
| Q (m^3/hr) | 800 m^3/hr | | | Calc | Vol Trad | *0.195* m^3/s |
| Q (m^3/s) | 0.2222 m^3/s | | | Calc | Vol Rec | *0.190* m^3/s |
| U | 13.214 m/s | | | Calc | Vol PPL | 0.222 m^3/s |
| m (kg/s) | 5.2826 kg/s | | | Actual | Vol | 0.222 m^3/s |
| | | | | Calc | Mass Trad | *4.633* kg/s |
| DP error | *0.05* bar | *5000* | *Pa* | Calc | Mass Rec | *4.509* kg/s |
| | | | | Calc | Mass PPL | 5.283 kg/s |
| | | | | Actual | Mass | 5.283 kg/s |

Here the pressure error at the throat (i.e. the port is reading 1000 Pa too high) gives the result of $m_r<m_t<m_h$ AND $\rho_r<\rho_t<\rho_f$ AND $\rho_{PVT}=\rho_f\neq\rho_t\neq\rho_r$. Therefore the rules say throat tapping has the problem and therefore $m_h$ and $\rho_{PVT}=\rho_f$ are the correct results. Notice that the larger the error the clearer the differences between the results and the more obvious the true result is.

C1) A Downstream Pressure Error of −1000 Pa.

| 6" sch 80 Venturi beta 0.55, 15 deg diffuser exit | | | | | |
|---|---|---|---|---|---|
| D | 5.761" | 0.146329 m | | DPt | 21670.55 Pa |
| beta | 0.55 | | | DPr | *17419.97* Pa |
| d | 3.1686" | 0.080481 m | | DPf | *4250.582* Pa |
| At | | 0.005087 m^2 | | DPr/DPt | *0.803854* |
| A | | 0.016817 m^2 | | DPf/DPt | *0.196146* |
| E | | 1.049153 | | | |
| Y | | 0.98 | | P1 | 2000000 Pa |
| Cd | | 0.995 | | Pt | 1978329 Pa |
| | | | | Pd | *1995749* Pa |
| PPL | | 15% of DPt | | | |
| | | | | Kg* | 1.06 |
| P1 | 20 bar | 2000000 Pa | | Kppl | 0.80 |
| T | 293.15 K | | | K loss | 1.57 |
| Z | 1 | | | | |
| R | 287 J/Kg K | | Calc | Density YCd | 23.772 kg/m^3 |
| Gas Density | 23.772 kg/m^3 | | Calc | Density Kg* | *22.481* kg/m^3 |
| | | | Calc | Density Kppl | *31.085* kg/m^3 |
| Q (m^3/hr) | 800 m^3/hr | | Calc | Vol Trad | 0.222 m^3/s |
| Q (m^3/s) | 0.2222 m^3/s | | Calc | Vol Rec | *0.216* m^3/s |
| U | 13.214 m/s | | Calc | Vol PPL | *0.254* m^3/s |
| m (kg/s) | 5.2826 kg/s | | Actual | Vol | 0.222 m^3/s |
| | | | Calc | Mass Trad | *5.283* kg/s |
| DP error | *0.01* bar | *1000 Pa* | Calc | Mass Rec | *5.137* kg/s |
| | | | Calc | Mass PPL | 6.041 kg/s |
| | | | Actual | Mass | 5.283 kg/s |

Here the pressure error at the downstream port (i.e. the port is reading 1000 Pa too low) gives the result of $m_r<m_t<m_h$ AND $\rho_r<\rho_t<\rho_f$ AND $\rho_{PVT}=\rho_t\neq\rho_f\neq\rho_r$.

Therefore the rules tell us that the downstream tapping has the problem and therefore $m_t$ and $\rho_{PVT}=\rho_t$ are the correct results. This is what is seen here. Note that even for this small pressure error at the downstream port the percentage difference of the actual density to the nearest incorrect prediction is in the order of 5% so this should be visible even with the system uncertainties.

C2) A Downstream Pressure Error of −5000 Pa.

| 6" sch 80 Venturi beta 0.55, 15 deg diffuser exit | | | | | |
|---|---|---|---|---|---|
| D | 5.761" | 0.14633 m | | DPt | 21670.55 Pa |
| beta | 0.55 | | | DPr | *13419.97* Pa |
| d | 3.1686" | 0.08048 m | | DPf | *8250.582* Pa |
| At | | 0.00509 m^2 | | DPr/DPt | *0.619272* |
| A | | 0.01682 m^2 | | DPf/DPt | *0.380728* |
| E | | 1.04915 | | | |
| Y | | 0.98 | | P1 | 2000000 Pa |
| Cd | | 0.995 | | Pt | 1978329 Pa |
| | | | | Pd | *1991749* Pa |
| PPL | | 15% of DPt | | | |
| | | | | Kg* | 1.06 |
| P1 | 20 bar | 2000000 Pa | | Kppl | 0.80 |
| T | 293.15 K | | | K loss | 1.57 |
| Z | 1 | | | | |
| R | 287 J/Kg K | | Calc | Density YCd | 23.77 kg/m^3 |
| Gas Density | 23.772 kg/m^3 | | Calc | Density Kg* | *17.32* kg/m^3 |
| | | | Calc | Density Kppl | *60.34* kg/m^3 |
| Q (m^3/hr) | 800 m^3/hr | | Calc | Vol Trad | 0.22 m^3/s |
| Q (m^3/s) | 0.2222 m^3/s | | Calc | Vol Rec | *0.19* m^3/s |
| U | 13.214 m/s | | Calc | Vol PPL | *0.35* m^3/s |
| m (kg/s) | 5.2826 kg/s | | Actual | Vol | 0.22 m^3/s |
| | | | Calc | Mass Trad | *6.908* kg/s |
| DP error | *0.05* bar | *5000 Pa* | Calc | Mass Rec | *4.51* kg/s |
| | | | Calc | Mass PPL | 8.42 kg/s |
| | | | Actual | Mass | 5.28 kg/s |

Here the pressure error at the downstream port (i.e. the port is reading 5000 Pa too low) gives the result of $m_r < m_t < m_h$ AND $\rho_r < \rho_t < \rho_f$ AND $\rho_{PVT} = \rho_t \neq \rho_f \neq \rho_r$.

Therefore the rules tell us that the downstream tapping has the problem and therefore $m_r$ and $\rho_{PVT} = \rho_t$ are the correct results. This is what is seen here. Note for this larger downstream pressure error how large the differences in the density predictions are becoming.

C3) A Downstream Pressure Error of +1000 Pa.

| 6" sch 80 Venturi beta 0.55, 15 deg diffuser exit | | | | | | |
|---|---|---|---|---|---|---|
| D | 5.761" | 0.146329 | m | | DPt | 21670.55 Pa |
| beta | 0.55 | | | | DPr | *19419.97* Pa |
| d | 3.1686" | 0.080481 | m | | DPf | *2250.582* Pa |
| At | | 0.005087 | m^2 | | DPr/DPt | *0.896146* |
| A | | 0.016817 | m^2 | | DPf/DPt | *0.103854* |
| E | | 1.049153 | | | | |
| Y | | 0.98 | | | P1 | 2000000 Pa |
| Cd | | 0.995 | | | Pt | 1978329 Pa |
| | | | | | Pd | *1997749* Pa |
| PPL | | 15% of DPt | | | | |
| | | | | | Kg* | 1.058 |
| P1 | 20 bar | 2000000 | Pa | | Kppl | 0.799 |
| T | 293.15 K | | | | K loss | 1.566 |
| Z | 1 | | | | | |
| R | 287 J/Kg K | | | Calc | Density YCd | 23.772 kg/m^3 |
| Gas Density | 23.772 kg/m^3 | | | Calc | Density Kg* | *25.062* kg/m^3 |
| | | | | Calc | Density Kppl | *16.459* kg/m^3 |
| Q (m^3/hr) | 800 m^3/hr | | | Calc | Vol Trad | 0.222 m^3/s |
| Q (m^3/s) | 0.2222 m^3/s | | | Calc | Vol Rec | *0.228* m^3/s |
| U | 13.214 m/s | | | Calc | Vol PPL | *0.185* m^3/s |
| m (kg/s) | 5.2826 kg/s | | | Actual | Vol | 0.222 m^3/s |
| | | | | Calc | Mass Trad | 5.283 |
| DP error | *-0.01* bar | *-1000* | Pa | Calc | Mass Rec | *5.424* |
| | | | | Calc | Mass PPL | 4.396 |
| | | | | Actual | Mass | 5.283 |

Here the pressure error at the downstream port (i.e. the port is reading 1000 Pa too high) gives the result of $m_h < m_t < m_r$ AND $\rho_f < \rho_t < \rho_r$ AND $\rho_{PVT} = \rho_t \neq \rho_f \neq \rho_r$. The rules state in this case the downstream tapping has the problem and therefore $m_t$ and $\rho_{PVT} = \rho_t$ are the correct results. This is seen to be true here.

C4) A Downstream Pressure Error of +5000 Pa.

Here the pressure error at the downstream port (i.e. the port is reading 5000 Pa too high) gives the result of $m_h < m_t < m_r$ AND $\rho_f < \rho_t < \rho_r$ AND $\rho_{PVT} = \rho_t \neq \rho_f \neq \rho_r$. Well almost. The negative value of the permanent pressure loss differential pressure has caused the permanent pressure loss differential pressure density prediction to be also negative. Both these results are impossible. The negative density has caused the volume flow equation of the DP meters permanent pressure loss equation to give no answer. This in terms of diagnostics is a declaration in its own right that the problem is not at least with the throat tapping. Note that if we were to simply accept the permanent pressure loss differential pressure density prediction negative value and find the mass flow by taking the product of this density value and the Volume meter we get a negative mass

| 6" sch 80 Venturi beta 0.55, 15 deg diffuser exit | | | | | | |
|---|---|---|---|---|---|---|
| D | 5.761" | 0.14633 | m | | DPt | 21670.55 Pa |
| beta | 0.55 | | | | DPr | *23419.97* Pa |
| d | 3.1686" | 0.08048 | m | | DPf | *-1749.42* Pa |
| At | | 0.00509 | m^2 | | DPr/DPt | *1.080728* |
| A | | 0.01682 | m^2 | | DPf/DPt | *-0.08073* |
| E | | 1.04915 | | | | |
| Y | | 0.98 | | | P1 | 2000000 Pa |
| Cd | | 0.995 | | | Pt | 1978329 Pa |
| | | | | | Pd | *2001749* Pa |
| PPL | | 15% of DPt | | | | |
| | | | | | Kg* | 1.058 |
| P1 | 20 bar | 2000000 | Pa | | Kppl | 0.799 |
| T | 293.15 K | | | | K loss | 1.566 |
| Z | 1 | | | | | |
| R | 287 J/Kg K | | | Calc | Density YCd | 23.772 kg/m^3 |
| Gas Density | 23.772 kg/m^3 | | | Calc | Density Kg* | *30.224* kg/m^3 |
| | | | | Calc | Density Kppl | *-12.794* kg/m^3 |
| Q (m^3/hr) | 800 m^3/hr | | | Calc | Vol Trad | 0.222 m^3/s |
| Q (m^3/s) | 0.2222 m^3/s | | | Calc | Vol Rec | *0.251* m^3/s |
| U | 13.214 m/s | | | Calc | Vol PPL | *#NUM!* m^3/s |
| m (kg/s) | 5.2826 kg/s | | | Actual | Vol | 0.222 m^3/s |
| | | | | Calc | Mass Trad | 5.283 kg/s |
| DP error | *-0.05* bar | *-5000* | Pa | Calc | Mass Rec | *5.957* kg/s |
| | | | | Calc | Mass PPL | *#NUM!* kg/s |
| | | | | Actual | Mass | 5.283 kg/s | flow rate prediction and here $m_h<m_t<m_r$ stands as required. Therefore for $m_h<m_t<m_r$ AND $\rho_f<\rho_t<\rho_r$ AND $\rho_{PVT}=\rho_t\neq\rho_f\neq\rho_r$, the rules state in this case the downstream tapping has the problem and therefore $m_t$ and $\rho_{PVT}=\rho_t$ are the correct results. This is seen to be true here.

Finally it should be noted that this diagnostic discussion has been based on the premise that all that can go wrong is with the fluid component property input to the PVT calculation, the volume flow rate meter reading or one of the three tappings reads an artificially low or high pressure. The last assumption is limiting. However, it has genuine use in industry as typical reasons for DP meter pressure tap errors are:

One tap is leaking due to a poorly installed DP transmitter or damage sustained in operation.

Hydrates or ice are forming inside the pipe line and they begin to block the impulse lines (i.e. connections from pipe coupling to DP transmitter). They do not form uniformly and therefore one will block first as it is highly unlikely they will all become blocked at the very same time. This diagnostic system then gives some advanced warning of the problem and gives time to remedy the situation before the meter fails completely as the other ports block up.

The same scenario will happen with scale (chemical deposits on the wall of the pipe). Again one port will block first.

A meter operator may accidentally leave one or all manifold valve closed (i.e. the port is blocked) after maintenance.

There will be cases of course where two ports are in error. The system can not (as far as the author as yet understands) do much to analyse this scenario. Currently, if the combinations of readings do not make sense then this is a very likely reason. For example:

$$m_t < m_h < m_r \text{ or } \rho_t < \rho_h < \rho_r \text{ or: } \frac{\Delta P_r}{\Delta P_t} + \frac{\Delta P_f}{\Delta P_t} \neq 1 \quad (14b)$$

There is no listed reason for these type of errors. However, clearly something is wrong so such diagnostic results should trigger a general "unspecified failure of meter" warning in the control room of what ever process the meter is part of.

Various improvements and modifications can be incorporated to the above without departing from the scope of the invention.

APPENDICES

Appendix One

Traditional DP Meter Equation Derivation

Let us consider the Venturi meter as our generic DP meter. The same arguments equally stand for all other DP meters (e.g. Orifice Plate, V-Cone, Venturi-Nozzle, Nozzle, Wedge, Segmental Orifice Plate etc. etc.). Figure A1.1 shows a sketch of a Venturi meter with three DP's read. The Venturi meter is chosen as it is the original DP meter design. The flow is left to right in this sketch. In Fig. A1.1 "P" denotes local pressure, "A" denotes local cross section area, $\rho$ denotes local fluid density and "U" indicates local average flow velocity. The inlet conditions are denoted with subscript "i". The Venturi meter throat (i.e. the minimum cross section area) conditions are denoted by the subscript "t". The recovered conditions are denoted by the subscript "r". The total head loss (i.e. permanent pressure loss) is denoted by "f" (for "friction" as this is less unwieldy than "PPL").

Flow through any DP meter must obey the conservation of mass and energy between any two points in the flow. The conservation of mass states that mass can not be created or destroyed and thus for steady flow where the quantity of mass in a control volume is not changing the mass flowing into the control volume must be equal to the mass flow flowing out of the control volume. For the normal meter condition of no leaks the mass flow into the inlet cross sectional area must equal the mass flow out of the outlet cross sectional area. The law of the conservation of energy states that the energy flowing into the control volume must be equal to the energy flowing out of the control volume. It is not just normal but unavoidable that some energy is lost through mechanisms like friction, heat loss, noise, vibration etc. However, the assumption of no energy loss is made for initial development of the traditional DP meter flow equation and a correction is added at the end for the real life energy losses. This same assumption was made by the author while developing the expansion meter flow equation during the PhD research. Traditionally the upstream (inlet) pressure is read along with the temperature to allow a PVT calculation. (The temperature is usually taken downstream as a thermocouple at the inlet would disturb the inlet flow and hence affect the meters performance. A correction using the Joules-Thompson coefficient is needed to correct the error caused by the non-ideal location of the thermocouple.)

The mass flow of a fluid flowing in a pipe across any cross sectional area is:

$$m=\rho AU=\rho Q \quad (A1.1)$$

Where m=dm/dt, i.e. the mass flow rate, $\rho$ is the fluid density, A is the cross sectional area, U is the average flow velocity at the cross sectional area and Q is the volume flow rate (at the flow conditions) where $$Q=AU \quad (A1.1b)$$

Therefore from the conservation of mass for steady flow between the inlet and the throat we have:

$$m=\rho_i A_i U_i=\rho_t A_t U_t \quad (A1.2)$$

The conservation of energy (often called "Bernoulli's theorem") can, for horizontal flow and the theoretical case of no energy loss be written as in equation A1.3. (These methods being discussed work in vertical installations but the description of the technology is easier to do by ignoring the potential energy term.)

$$\frac{P_i}{\rho_i} + \frac{U_i^2}{2} = \frac{P_t}{\rho_t} + \frac{U_t^2}{2} \quad (A1.3)$$

Equations A1.2 and A1.3 will now be re-arranged to give an expression for the mass flow rate through the meter for the case where the fluid is incompressible. (This assumption that the flow does not change density as the pressure changes through the meter is valid for liquid flows as liquid has a negligible change of density over large pressure fluctuations but is not valid for the case of gas flows where pressure changes significantly affect gas density. The correction required due to this assumption when considering gas flows will be discussed later along with the correction for the incorrect assumption of no energy losses.)

Equation A1.2 gives:

$$\frac{A_i}{A_t} = \frac{U_t}{U_i} \quad (A1.4)$$

For incompressible flow Equation A1.3 gives:

$$\frac{P_i - P_t}{\rho} = \frac{1}{2}(U_t^2 - U_i^2) = \frac{U_t^2}{2}\left(1 - \left(\frac{U_i}{U_t}\right)^2\right) \quad (A1.5)$$

Substituting Equation A1.4 into Equation A1.5 gives:

$$\frac{P_i - P_t}{\rho} = \frac{1}{2}(U_t^2 - U_i^2) = \frac{U_t^2}{2}\left(1 - \left(\frac{A_t}{A_i}\right)^2\right) \quad (A1.6)$$

By definition the pressure difference between the inlet and the throat of a DP meter is called the differential pressure, i.e.:

$$\Delta P_t = P_i - P_t \quad (A1.7)$$

Therefore Equation A1.6 can be re-arranged:

$$\frac{2\Delta P_t}{\rho} = U_t^2\left(1 - \left(\frac{A_t}{A_i}\right)^2\right) \quad (A1.6a)$$

Or:

$$U_t = \sqrt{\frac{2\Delta P_t}{\rho\left(1 - \left(\frac{A_t}{A_i}\right)^2\right)}} \quad (A1.6b)$$

By definition β (called the "beta ratio") is defined as:

$$\beta = \sqrt{\frac{A_t}{A_i}} \quad (A1.8)$$

Therefore Equation A1.6b can be written as:

$$U_t = \sqrt{\frac{2\Delta P_t}{\rho(1 - \beta^4)}} \quad (A1.6c)$$

Substituting Equation A1.6c into Equation A1.2 gives:

$$m = \rho A_t U_t = \rho A_t \sqrt{\frac{2\Delta P_t}{\rho(1 - \beta^4)}} \quad (A1.9)$$

By definition:

$$E = \frac{1}{\sqrt{1 - \beta^4}} \quad (A1.10)$$

Where E is called "the velocity of approach". Therefore Equation A1.9 can be written as:

$$m = EA_t\sqrt{2\rho\Delta P_t} \quad (A1.11)$$

Equation A1.11 is the theoretical mass flow equation for the generic differential pressure meter. It will predict the mass flow if there is no energy loss during the flow through the meter and as long as there is no fluid density change (and the density is known as an input to the equation). In reality all flows through all DP meter types have energy losses, density needs to be found externally to this type of meter system and all gas flows have a change in fluid density due to the differential pressure created by the primary element. (The "primary element" is a term used to describe whatever geometric shape is used in the design to create the DP. A Venturi meter primary element is a conical converging section, small diameter tube and a diffuser combination.) Corrections for these considerations are now discussed.

The Discharge Coefficient

Energy losses are unavoidable. The majority of the energy loss through DP meter primary elements is caused by flow separation and the resulting dissipation of kinetic energy (although other losses do occur). The particular shape of a DP meters primary element is the main dictator of the amount of energy that is lost by the flow. In order to correct for this a correction factor called a "discharge coefficient" is introduced into Equation A1.11 This discharge coefficient ($C_d$) is defined as:

$$C_d = \frac{m_{actual}}{m_{theoretical}} \quad (A1.12)$$

Where $m_{actual}$ is the mass flow actually flowing and $m_{theoretical}$ is the mass flow predicted by use of Equation A1.11. Note that the actual mass flow is never known precisely and that in real applications the discharge coefficient for any DP meter is found by experiment using a trusted reference meters reading (of stated low uncertainty) as the "actual" mass flow. Therefore, for incompressible flows (i.e. liquid flows) the generic DP meter flow equation is:

$$m_{actual} = C_d m_{theoretical} = EA_t C_d \sqrt{2\rho\Delta P_t} \quad (A1.13)$$

For liquid flows this is the actual industrial equation used. However, if the flow is compressible (i.e. gas flow) Equation A1.13 is inaccurate as the density is not constant through out the meter and therefore a correction factor commonly known as the expansibility factor is required.

The Expansibility Factor

For gas flows another correction factor is needed to Equation A1.13 to achieve optimum performance in predicting the mass flow rate. Some DP meter designs have experimentally found expansion factors (denoted as "ε" in Europe and "Y" in the US) and others use theoretical expansion factors. By theory they are, regardless of the primary element being discussed, a function (say function "$f$") of inlet pressure ($P_i$), the meters beta ratio (β), the differential pressure ($\Delta P_t$) and the gases isentropic exponent (κ). That is: $\epsilon = f(P_i, \beta, \Delta P_t, \kappa)$.

In general the expansibility correction on the theoretical Equation A1.11 is much smaller than the discharge coefficient correction. The final generic DP meter calibration is therefore as follows:

$$m = EA_t \epsilon C_d \sqrt{2\rho\Delta P_t} \quad (A1.14)$$

Calibration

For the well known DP meter designs of the Orifice, Nozzle, Venturi Nozzle and Venturi meters (none of which are patented devices) there is so much publicly known data obtained from decades of testing that for precise geometries the discharge coefficient can be read off a table and a test (usually called a meter "calibration") is not needed. However, for flow conditions out with the published conditions and for non-standard DP meter geometries calibration is required for all meters before use if optimum performance is to be achieved.

It should be noted that for many Differential Pressure meter designs the discharge coefficient is not constant. It is known to be a function of the pipe flows Reynolds number (Re). For applications where the "turn down" (i.e. the flow rate range) is small an average discharge coefficient is usually sufficient but for larger turn downs the effect of the Reynolds number relationship with discharge coefficient often needs to be accounted for.

Note: Reynolds number is defined as the ratio of the inertia to the viscous forces. That is:

$$Re = \frac{\rho UD}{\mu} = \frac{4m}{\pi \mu D} \quad (A1.15)$$

Where $\mu$ is the viscosity of the fluid. Calibration consists of measuring the differential pressure created at points along the turndown range and for each point predicting the discharge coefficient at that particular Reynolds number by using the equation:

$$C_d = \frac{m_{reference}}{EA_t \varepsilon \sqrt{2\rho \Delta P_t}} \quad (A1.14a)$$

Plotting the results allows an equation to be fitted as in Fig A4.

Figure 4:
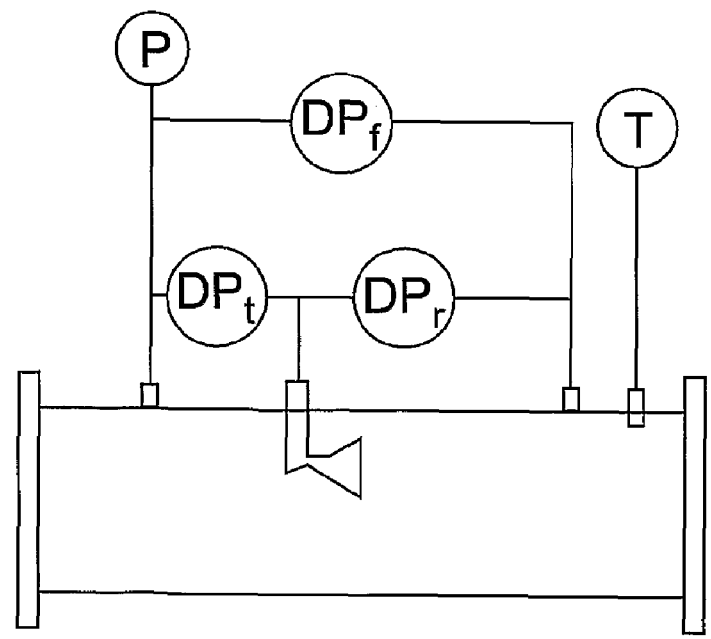
FIG. 4 shows a sketch of an alternative meter arrangement.

In FIG. 4 the data is shown fitted with a linear line. The line has a positive gradient. This is an arbitrary example. Calibration results for DP meters can have a negative gradient and there is no restriction to the form of the data fitting equation. More complicated functions can often give more accurate results but care has to be taken not to over fit the data set. Once the calibration is complete for an approximate mass flow rate prediction an average or mid point constant Cd value can be used with Equation A1.14 and the mass flow rate directly calculated, or, for a more accurate calculation method the fitted discharge coefficient equation can be substituted into Equation A1.14. As the discharge coefficient is a function of the Reynolds number which in turn is a function of the mass flow rate—i.e. the parameter that we are trying to find (see Equation A1.15)—the solution now has to come from an iteration procedure. That is we have:

$$m_{actual} = EA_t \varepsilon C_d \sqrt{2\rho \Delta P_t} \quad (A1.14)$$

Substituting in $$C_d = f(Re) = f\left(\frac{4m}{\pi \mu D}\right)$$

gives:

$$m = EA_t * f\left(\frac{4m}{\pi \mu D}\right) * \sqrt{2\rho \Delta P_t} \quad (A1.16)$$

Or:

$$m - EA_t * f\left(\frac{4m}{\pi \mu D}\right) * \sqrt{2\rho \Delta P_t} = 0 \quad (A1.16a)$$

It is common practice to start the iteration using the theoretical Equation A1.11 to assure a relatively small number of iterations as the theoretical equation will give an initial approximation of the mass flow rate which is of the correct order of magnitude.

$$m = EA_t \sqrt{2\rho \Delta P_t} \quad (A1.11)$$

Finally note that some DP meters on the market do not have expansibility factors published and the effects of the energy loss and density change of a gas through the primary element is grouped together by a factor commonly called the flow coefficient, usually denoted by K. That is the flow coefficient is the product of the discharge coefficient and the expansion factor (Equation A1.17).

$$K = \Delta C_d \quad (A1.17)$$

For case of DP meters with no known expansibility factor usually the calibration is carried out for K vs. Re. (Note that for liquid flows that are in practical terms incompressible the expansion factor is approximately unity and the flow coefficient and discharge coefficient are one and the same thing.) For some DP meters the final mass flow equation being iterated is therefore:

$$m = EA_t K \sqrt{2\rho \Delta P_t} \quad (A1.18)$$

Where K is some experimentally derived function g(Re). Substituting in $$K = g(Re) = g\left(\frac{4m}{\pi \mu D}\right)$$

gives:

$$m = EA_t * g\left(\frac{4m}{\pi \mu D}\right) * \sqrt{2\rho \Delta P_t} \quad (A1.18a)$$

Or:

$$m - EA_t * g\left(\frac{4m}{\pi \mu D}\right) * \sqrt{2\rho \Delta P_t} = 0 \quad (A1.18b)$$

Again the iteration start point is commonly suggested to be the theoretical equation result from equation A1.11.

$$m = EA_t \sqrt{2\rho \Delta P_t} \quad (A1.11)$$

Comments on Traditional Generic Differential Pressure Meter Technologies

All DP meter designs have energy losses and therefore all DP meters have discharge coefficients that are not unity. For comparison an Orifice Plate meter has a discharge coefficient in the order of 0.6. A cone type DP meter has a discharge coefficient in the order of 0.8. A Venturi meter has a discharge coefficient in the order of 0.99.

Note that by theory the discharge coefficient can not be greater than unity. Fig. A5 shows a sketch of the theoretical no loss pressure path a flow would take through a DP meter (i.e. when all change in pressure is due to momentum pressure drop) and a typical realistic pressure path a flow would take through a DP meter (i.e. when the change in pressure is due to a combination of momentum and friction/energy loss pressure drop).

In Fig. A5 one line shows the theoretical path of the local pressure through a DP meter if no energy is lost. In this case the difference of pressure locally is only due to energy changing form from pressure energy to momentum energy and back again as the flow passes the primary element. The precise path is different for different DP meter geometries but the principle of full pressure recovery will always hold for the case of no energy losses.

This principle is shown by another line returning to the inlet pressure after recovery downstream of the meter. The black line indicates what actually happens in all real flows through any DP meter design as energy losses are unavoidable. That is, as losses are inevitable the pressure never returns to the inlet pressure. The phrase "full" pressure recovery for real flows is misleading. Full recovery does not mean that the full DP created by the primary element has been recovered downstream of the meter. It means that the recoverable DP (always less than the total DP) has been fully recovered. In Fig. A5 the theoretical DP for no losses is denoted by $DP_{theory}$ (i.e. $\Delta P_{theory}$). Note that the recovery of $\Delta P_{theory}$ is the same as the differential pressure created at the minimum cross sectional area/throat (i.e. pressure returns to the inlet pressure downstream of the meter).

The DP created at the "throat" (i.e. minimum cross sectional area of primary element) is denoted by $DP_t$ (i.e. $\Delta P_t$): Note that $\Delta P_t > \Delta P_{theory}$ as the real flow has an extra energy loss pressure drop which the no energy loss theoretical flow does not have. The pressure recovery of the actual maximum differential pressure ($\Delta P_t$) is denoted in Fig. A5 as $DP_r$ (i.e. $\Delta P_r$). The permanently lost pressure due to all loss phenomena is denoted as $DP_f$ (i.e. $\Delta P_f$). This is sometimes called the total head loss or permanent pressure loss. Note, that it is a requirement of the physical law that energy can not be created or destroyed that the sum of the recovered and lost DP's must equal the total DP created at the meters throat. That is:

$$\Delta P_t = +\Delta P_r + \Delta P_f \qquad (A1.19)$$

Note from Fig. A5 that due to the effect of friction (and other energy loss phenomena) the upstream to throat DP (i.e. $\Delta P_t$) being read is always greater than the theoretical DP if the DP was due to a momentum change alone. Hence $\Delta P_t > \Delta P_{theory}$ is always the case. So, with the discharge coefficient being the factor to correct for the fact there are energy losses and the read DP is actually $\Delta P_t$ and not $\Delta P_{theory}$ the discharge coefficient needs to be always less than unity ($C_d < 1$) to correct for the fact that $\Delta P_t > \Delta P_{theory}$. If the discharge coefficient was unity it would indicate no losses. If the discharge coefficient is greater than unity it would indicate that $\Delta P_t < \Delta P_{theory}$ which means that energy must have been created which is not possible. (There are cases of Venturi meter calibrations giving $C_d > 1$ but this is known to be caused by some of the assumptions being invalid. For example tap imperfections causing static pressure measurement errors. When calibrated a Venturi meter with $C_d > 1$ still operates correctly.)

Appendix Two

The PhD Single Phase DP Meter Method Using the Recovery Pressure

The fact that the recovery pressure is not of great interest to most engineers has meant that it is largely ignored. For dry gas flow metering the single $\Delta P_t$ is all that is needed to find the one unknown, i.e. the single mass flow rates. However, there are other differential pressures available to be measured and utilizing them allows diagnostic abilities. Chapter 7 of the PhD Thesis described a method of using the recovery differential pressure of any DP meter ($\Delta P_r$) to predict a single phase gas flow rate instead of the traditional $\Delta P_t$ reading (for a known fluid density). The PhD is the only publicly available document discussing this physical principle I know of. (It is important to note here that the PhD Venturi data showed for a Venturi DP meter a downstream tapping at one pipe diameter behind the Venturi meter diffuser exit. ISO 5167 Part 4 suggests at least six diameters are needed to assure full recovery of the pressure has taken place. The PhD data was therefore not ideal. However, the recovery differential pressure metering concept still worked very well. This then, is proof that although it is better to situate the downstream pressure tapping at or further downstream than the pressure recover location if this is not achieved the total head loss and recovery meter equations can still be used successfully if the meter is calibrated for that pressure tapping location set.) The following is an explanation of the recovery or "expansion" meter single phase metering concept.

The description of the development of the traditional DP meter generic equation uses the two physical laws of the conservation of mass and energy. It should be noted here as the fundamental theory of the expansion meter concept is that these two laws are independent of whether a change in area of the flow is from a larger to a smaller area (i.e. traditional primary element DP meter design where the area is restricted meaning the flow accelerates and the pressure decreases) or from a smaller to larger area (i.e. the PhD expansion meter concept where the area is expanded meaning the flow decelerates and the pressure increases).

Figure 19:
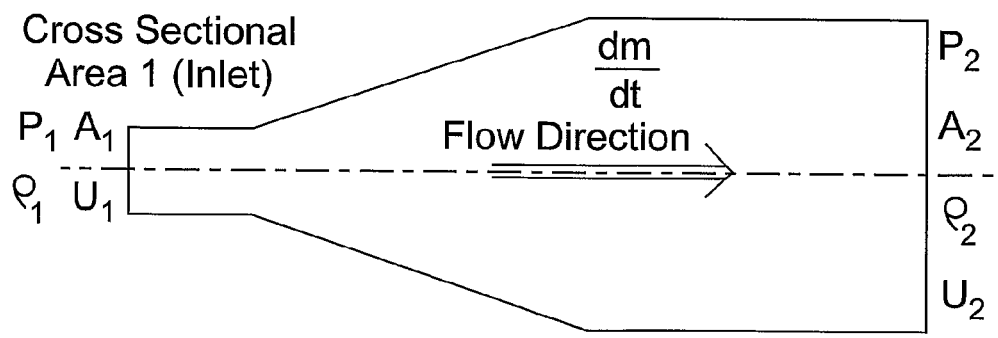
FIG. 19 shows sketch of expansion meter control volume.

FIG. 19 shows a sketch of a Control Volume with the flow being expanded to a larger area than the inlet area.

The same laws of conservation of mass and energy can be applied across the cross sections denoted 1 and 2 in FIG. 19 and a similar mass flow equation can be derived. This is now done. The mass flow of a fluid flowing in a pipe across any cross sectional area is:

$$m = \rho A U = \rho Q \qquad (A2.1)$$

Where $$m = \frac{dm}{dt},$$

i.e. the mass flow rate, $\rho$ is the fluid density, A is the cross sectional area, U is the average flow velocity at the cross sectional area and Q is the volume flow rate (at the flow conditions) where Q=AU.

Therefore from the conservation of mass for steady flow between the inlet and the throat we have:

$$m = \rho_1 A_1 U_1 = \rho_2 A_2 U_2 \qquad (A2.2)$$

The conservation of energy (often called "Bernoulli's theorem") can, for the theoretical case of no energy loss be written as in equation A2.3 (for horizontal flow).

$$\frac{P_1}{\rho_1} + \frac{U_1^2}{2} = \frac{P_2}{\rho_2} + \frac{U_2^2}{2} \qquad (A2.3)$$

Equations A2.2 and A2.3 will now be re-arranged to give an expression for the mass flow rate through the expansion meter for the case where the fluid is incompressible. (This assumption that the flow does not change density as the pressure changes through the meter is as valid for the expansion meter as it is for the traditional meter for the case of liquid flows. For gases it is as invalid for the expansion factor as it is for the traditional meter. However, note that where as the traditional meter constricts the flow making it accelerate and dropping the static pressure thereby reducing the gas density in this expansion case the opposite situation occurs. That is, the flow expands and therefore decelerates causing a static pressure rise and a corresponding increase in gas density. It would be more appropriate to call the factor accounting for this in the flow equation a compressibility factor instead of an expansion factor—although this terminology runs the risk of causing confusion with, the gases super compressibility factor "Z" in PVT calculations.) Equation A2.2 gives:

$$\frac{A_1}{A_2} = \frac{U_2}{U_1} \quad (A2.4)$$

For incompressible flow Equation A2.3 gives:

$$\frac{P_2 - P_1}{\rho} = \frac{1}{2}(U_1^2 - U_2^2) = \frac{U_1^2}{2}\left(1 - \left(\frac{U_2}{U_1}\right)^2\right) \quad (A2.5)$$

Substituting Equation A2.4 into Equation A2.5 gives:

$$\frac{P_2 - P_1}{\rho} = \frac{U_1^2}{2}\left(1 - \left(\frac{A_1}{A_2}\right)^2\right). \quad (A2.5a)$$

If we define the pressure difference between the inlet and the expanded cross sectional area of an expansion DP meter as:

$$\Delta P_r = P_2 - P_1 \quad (A2.6)$$

Equation A2.5a can be re-arranged to give:

$$\frac{2\Delta P_r}{\rho} = U_1^2\left(1 - \left(\frac{A_1}{A_2}\right)^2\right). \quad (A2.5b)$$

Or:

$$U_1 = \sqrt{\frac{2\Delta P_r}{\rho\left(1 - \left(\frac{A_1}{A_2}\right)^2\right)}} \quad (A2.5c)$$

$\beta_e$ (let us call it the "expansion beta ratio") is defined as:

$$\beta_e = \sqrt{\frac{A_1}{A_2}} \quad (A2.7)$$

Therefore Equation A2.5c can be written as:

$$U_1 = \sqrt{\frac{2\Delta P_r}{\rho(1 - \beta_e^4)}} \quad (A2.5d)$$

Substituting Equation A2.5d into Equation A2.1 gives:

$$m = \rho A_1 U_1 = \rho A_1 \sqrt{\frac{2\Delta P_r}{\rho(1 - \beta_e^4)}} \quad (A2.8)$$

By definition let:

$$E_r = \frac{1}{\sqrt{1 - \beta_e^4}} \quad (A2.9)$$

Where $E_r$ can be called "the velocity of departure". Therefore Equation A2.8 can be written as:

$$m = E_r A_1 \sqrt{2\rho\Delta P_r} \quad (A2.10)$$

Equation A2.10 is the theoretical mass flow equation for a generic differential pressure meter based on expanding a flow. It will predict the mass flow if there is no energy loss during the flow through the meter and as long as there is no fluid density change. (It will be noticed that for the case of no energy losses it is in fact exactly the same as the traditional DP meter Equation A1.11 if a thought experiment of imagining the no loss flow to flow in the reverse direction is carried out.) In reality all flows through all DP meter types have energy losses and all gas flows have a change in fluid density due to the differential pressure created by the primary element. Corrections for these considerations are now discussed.

The Expansion Coefficient

As with traditional DP meter designs energy losses are unavoidable in the expansion type DP meter. In fact due to fluid mechanic phenomena of turbulent mixing in adverse pressure gradients more energy losses can be expected in an expansion meter than for an equivalent area ratio of a traditional DP meter. The majority of the energy loss through DP meter primary elements is caused by flow separation and the resulting dissipation of kinetic energy (although other losses do occur). For expansion DP meter designs just like the traditional meter designs the particular shape of a DP meters primary element dictates the energy that is lost by the flow. In order to correct for this a correction factor called an "expansion coefficient" is introduced into Equation A2.10. This expansion coefficient ($C_d^*$) is defined as:

$$C_d^* = \frac{m_{actual}}{m_{theoretical}} \quad (A2.11)$$

Where $m_{actual}$ is the mass flow actually flowing and $m_{theoretical}$ is the mass flow predicted by use of Equation A2.10. Note that the actual mass flow is never known precisely and that in real applications an expansion coefficient for any expansion DP meter would be required to be found by experiment using a trusted reference meter reading with a known uncertainty as the "actual" mass flow. Therefore, for incompressible flows (i.e. liquid flows) the generic DP meter flow equation is:

$$m_{actual} = C_d^* m_{theoretical} = E_r A_1 C_d^* \sqrt{2\rho\Delta P_r} \quad (A2.12)$$

For liquid flows this is the actual industrial equation that would be used (if the method was in fact used which it is not!). However, if the flow is compressible (i.e. gas flow) Equation A2.12 is inaccurate as the density is not constant and therefore a correction factor equivalent to the traditional DP meters expansibility factor is required (due to gas compression as it flows through the expanding area caused by the primary element and the flow velocity decreases and the local static pressure rises.)

The Compressibility Factor

For gas flows another correction factor is needed to Equation A2.12 to achieve optimum performance in predicting the mass flow rate. As the density does not remain constant but increases through the expansion section (and further downstream of the exit of the primary element as the pressure continues to rise until a new equilibrium is achieved by the flow) some correction is required. Such a correction factor would be based on the same principle as the expansion factor for traditional DP meter designs. Therefore let us define this factor as the compressibility factor and denote it by the symbol $\epsilon^*$. By theory for a given primary element design the compressibility factor would be, regardless of the primary element a function (say function "h") of inlet pressure ($P_1$), the differential pressure ($\Delta P_r$), the expansion beta ratio $\beta_e$ and the gases isentropic exponent ($\kappa$). That is: $\epsilon^* = h(P_i, \Delta P_i, \kappa)$ In general the compressibility correction on the theoretical Equation A2.10 is much less than the expansion coefficient correction. The final generic DP meter calibration would be therefore as follows:

$$m = E_r A_1 \epsilon^* C^*_d \sqrt{2\rho \Delta P_r} \qquad (A2.13)$$

Calibration

Note that it was stated earlier of traditional DP meter designs that for the well known traditional DP meter designs of the Orifice, Nozzle, Venturi Nozzle and Venturi meters (none of which are patented devices) there is so much publicly known data obtained from decades of testing that for precise geometries the discharge coefficient can be read off a table and a test (usually called a meter "calibration") is not needed. However, for flow conditions out with the published conditions and for non-standard geometries calibration is required for all meters before use if optimum performance (i.e. the use of the most accurate discharge coefficient) is to be achieved. As the expansion meter concept has no published data (except for my PhD) expansion coefficients are unknown for any expansion DP meter design. Furthermore, there are no compressibility factors ($\epsilon^*$) available. Therefore, such a meter needs to be calibrated. This could be done by utilizing the concept of the "flow coefficient" where for traditional DP meters the flow coefficient is the product of the expansibility factor and the discharge coefficient. Here then, an expansion flow coefficient (let us denote it as $K^*$) can be defined as the product of the compressibility factor and the expansion coefficient. That is:

$$K^* = \epsilon^* C^*_d \qquad (A.2.14)$$

Note that for liquid flows the compressibility factor is effectively unity and the expansion flow coefficient is in that case equivalent to the expansion coefficient. The expansion flow meter mass equation is now therefore expressed as so:

$$m = E_r A_1 K^* \sqrt{2\rho \Delta P_r} \qquad (A2.13a)$$

There is no reason to assume that the expansion coefficient is constant when it is known the flow coefficient of a traditional DP meter is not. Therefore, as with the traditional meter the expansion meter could be calibrated across the required turn down by calculating expansion flow coefficients at set meter inlet Reynolds numbers:

$$K^* = \frac{m_{reference}}{E_r A_1 \sqrt{2\rho \Delta P_r}} \qquad (A2.13b)$$

Figure 20:
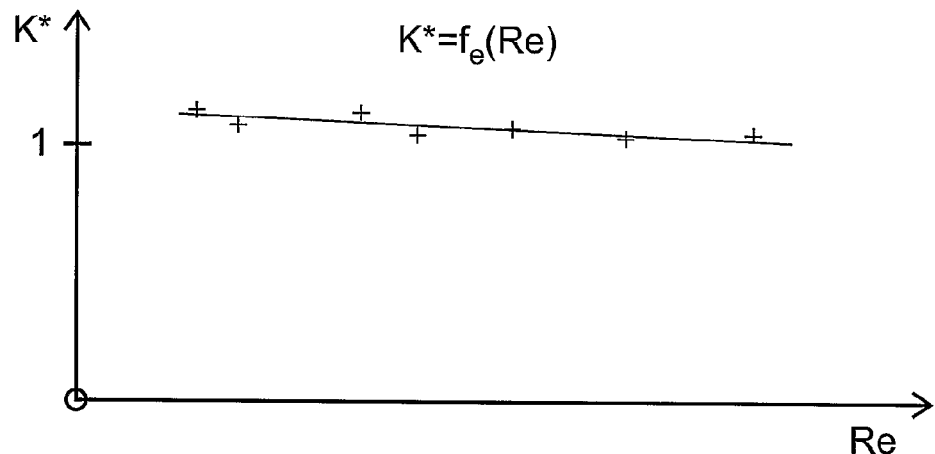
FIG. 20 shows a sketch of an expansion DP meter calibration.

Plotting the results allows an equation to be fitted as in FIG. 20.

In FIG. 20 the calibration is shown with a linear fit on the data and the gradient is slightly negative. It should be noted that this is an arbitrary choice and the gradient for individual meter designs could have either a positive or negative gradient. Also a more complex function could give more accurate gas flow predictions but care would have to be taken not to over fit the data.

Therefore, for an approximate mass flow rate prediction an average or mid point constant $K^*$ value can be used with Equation A2.13a and the mass flow rate directly calculated, or, for a more accurate calculation method the fitted expansion flow coefficient equation (denoted as $f_e$ here) can be substituted into Equation A2.13a. As the flow expansion coefficient is a function of the Reynolds number which in turn is a function of the mass flow rate—i.e. the parameter that we are trying to find the solution for now has to come from an iteration procedure. That is we have:

$$m = E_r A_1 K^* \sqrt{2\rho \Delta P_r} \qquad (A2.13a)$$

Substituting in $$K^* = f_e(Re) = f_e\left(\frac{4m}{\pi \mu D}\right)$$

gives:

$$m = E_r A_1 * f_e\left(\frac{4m}{\pi \mu D}\right) * \sqrt{2\rho \Delta P_t} \qquad (A2.13c)$$

Or:

$$m - E_r A_1 * f_e\left(\frac{4m}{\pi \mu D}\right) * \sqrt{2\rho \Delta P_t} = 0 \qquad (A2.13d)$$

It would be practicable to start the iteration using the theoretical Equation A2.10 to assure a relatively small number of iterations as the theoretical equation will give an initial approximation of the mass flow rate which is of the correct order of magnitude.

$$m = E_r A_1 \sqrt{2\rho \Delta P_r} \qquad (A2.10)$$

The Practical Use for the Expansion Meter Concept

Traditionally the expansion meter has never been developed. There is no stated reason why but the author strongly suspects the reason is that with the traditional DP meter being used satisfactorily there was no need to change the design unless the change offered practical advantages. An expansion meter traditionally does not. It would take up more width than a traditional DP meter. The extra width is required to expand the flow from the pipe area. It is a fact of fluid mechanics that it takes longer for a given flow to increase static pressure in an expansion (where there is an adverse pressure gradient) than it does to reduce static pressure in a restriction (where there is a favourable pressure gradient). Hence, space can be a problem with using an expansion meter. Also a bigger meter means more material (increasing manufacturing cost) and increased weight (leading to a more expensive and a more difficult installation). To seal the expansion meter concepts inferior status to the traditional DP meter in industry it is also likely to have a greater uncertainty. The adverse pressure gradient can cause flow separation and even if separation does not occur the uncontrolled expansion means turbulent mixing of the flow and DP's being measured can have greater natural scatter than in the traditional DP meter case.

Figure 22:
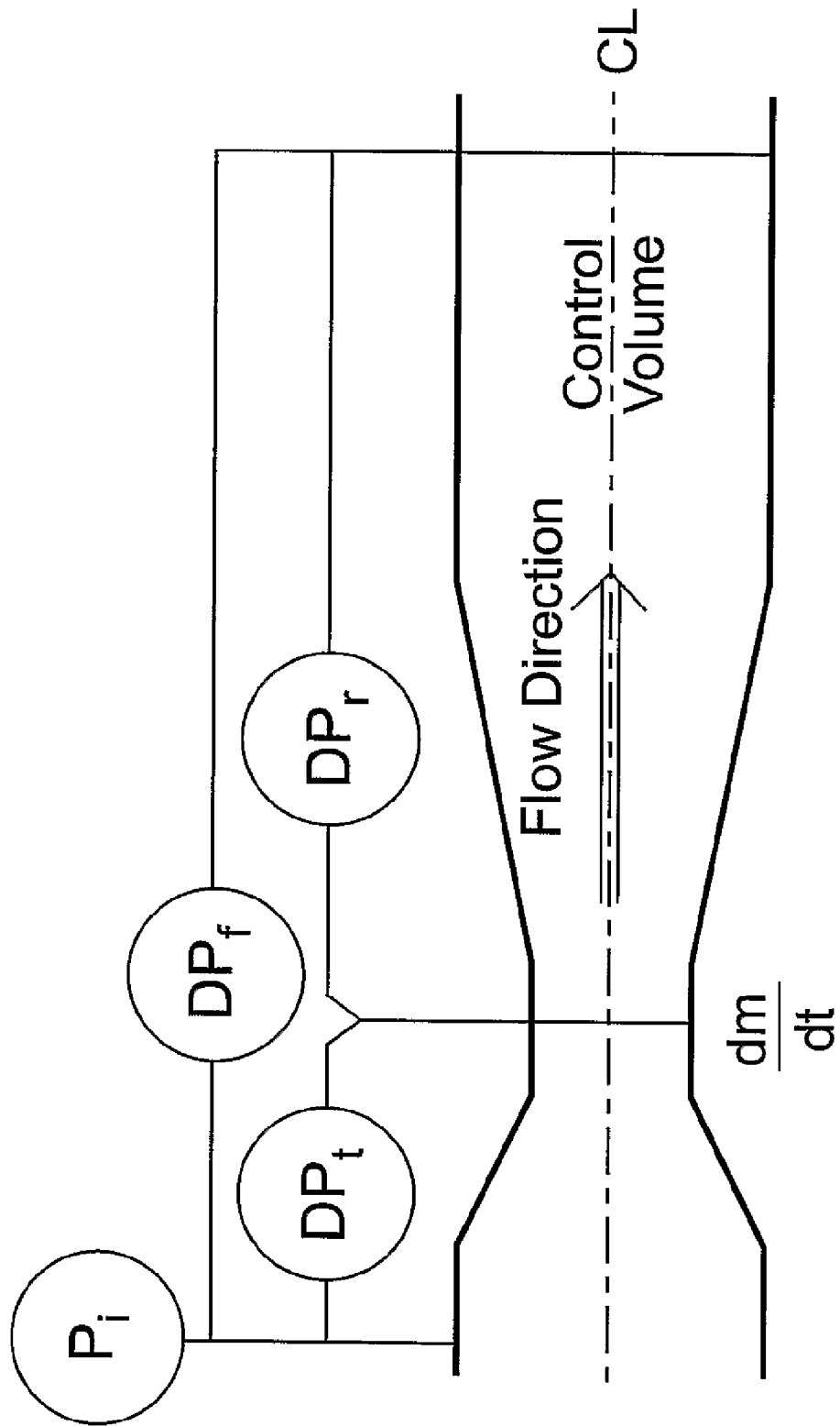
FIG. 22 shows the venturi "expansion meter" highlighted by use of the relevant control volume.
Figure 23:
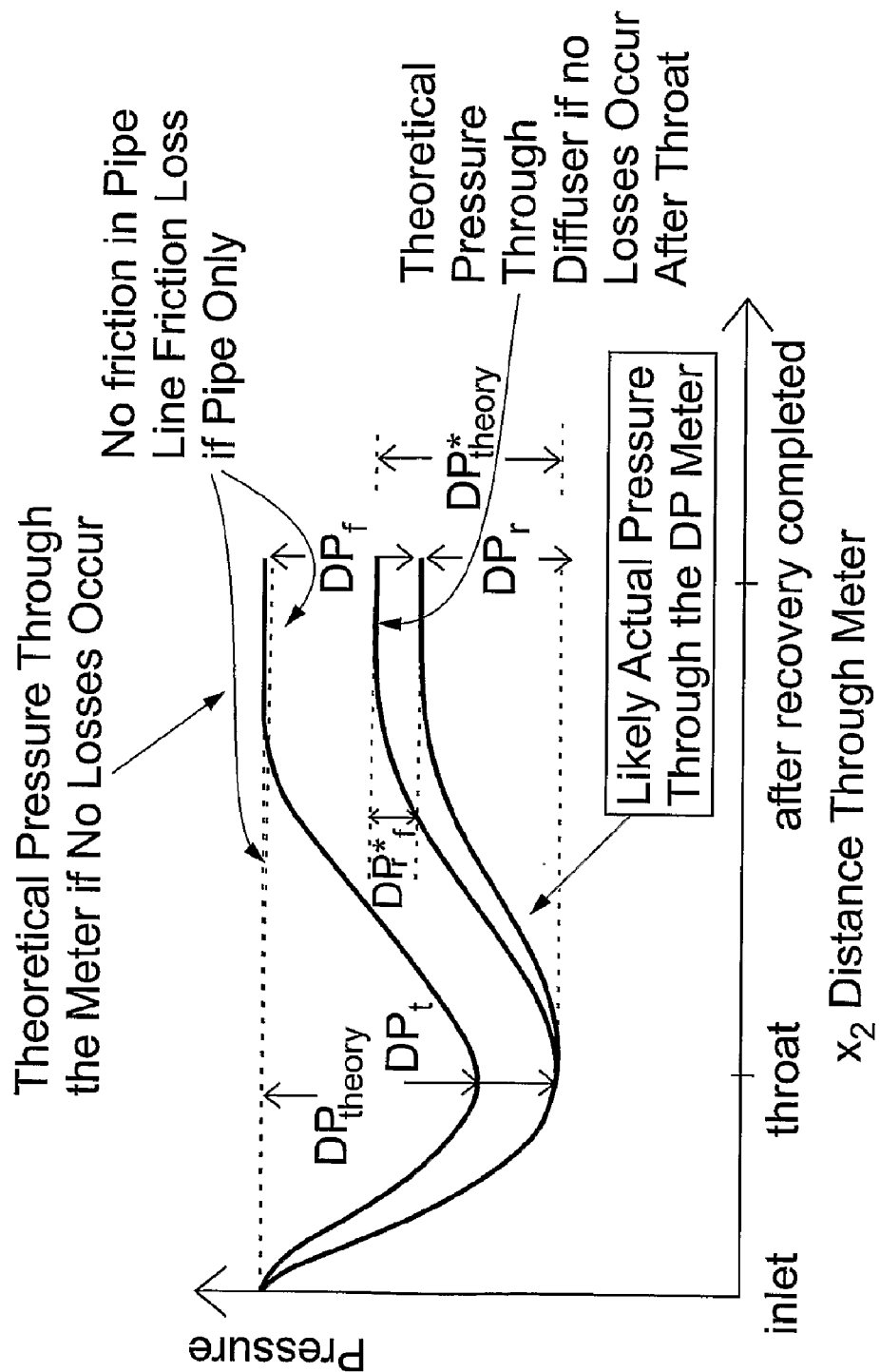
FIG. 23 shows the theoretical no loss and a typical realistic pressure path a flow would take through a diffuser section of a DP meter

However, now with the requirement for single phase meter diagnostics the expansion meter has a useful purpose. Note hat the throat to downstream of a DP meter is effectively an expansion meter. Therefore the "inlet" to the expansion meter could be considered to be the traditional DP meters minimum cross sectional area (or "throat") and the outlet is the outlet of the DP meter. FIG. 22 shows the concept using a sketch of a Venturi meter with the Expansion meter highlighted by the relevant control volume. (The concept holds for all generic DP meters.)

Here, Equation A2.13a can be applied. The only difference from the general discussion given earlier is that the minimum cross sectional area is now the expansion meter inlet (i.e. not the upstream pipe work). This means the inlet density will be that of the throat and not that which is used at the traditional meters inlet ($P_i$). The density at the traditional meter inlet could be used for simplicity as long as this was incorporated into the expansion meter calibration (i.e. the inlet density used in the derivation of $K^*$ during the calibration procedure). Note that in this case when comparing the definitions of the general expansion meter with the concept of using downstream section of a generic DP meter as an expansion meter we can say from equation A2.7:

$$\beta_e = \sqrt{\frac{A_1}{A_2}} = \sqrt{\frac{A_t}{A}} = \beta \tag{A2.7a}$$

And therefore equation A2.9 can be re-written:

$$E_r = \frac{1}{\sqrt{1-\beta_e^4}} = \frac{1}{\sqrt{1-\beta^4}} = E \tag{A2.9a}$$

Also note that when incorporating an expansion meter into a Venturi meter body the above derivations inlet area $A_1$ becomes the inlet to the expansion meter of a DP meter, i.e. the throat area, $A_t$. Finally the differential pressure across the expansion meter imbedded in a DP meter body is the recovery DP, $\Delta P_r$.

So finally we have:

$$m = EA_t K^* \sqrt{2\rho \Delta P_r} \tag{A2.15}$$

Or:

$$m - EA_t * f_e\left(\frac{4m}{\pi\mu D}\right) * \sqrt{2\rho \Delta P_r} = 0 \tag{A2.15a}$$

where the function $f_e$ is based on the expansion flow coefficient being calculated using the traditional DP meters inlet gas density.

Figure 21:
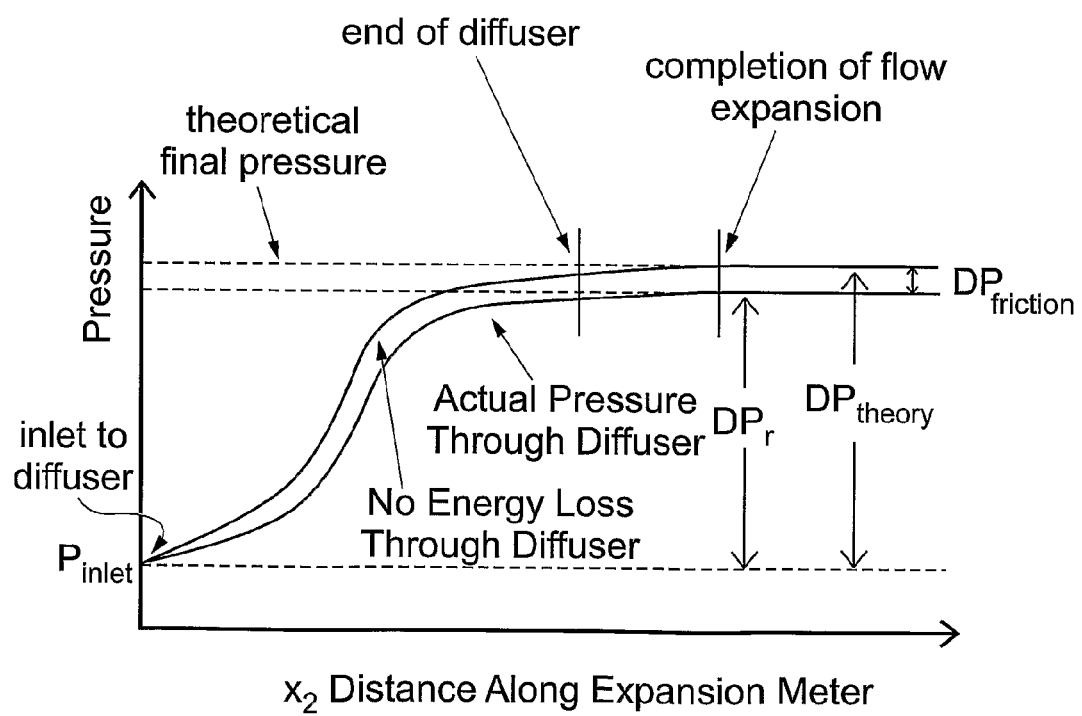
FIG. 21 shows a pressure path through an expansion meter.

FIG. 21 shows a sketch of the pressure through the diffuser. At the throat the pressure is at a minimum and down stream of this pressure begins to recover. The recovery is of course less in reality than when no losses are assumed.

In FIG. 21 the differential pressure denoted by $DP^*_{r\,theory}$ indicates the total recoverable pressure if no losses occurred after the throat. (Note it does not return to the meters inlet pressure as we are not saying there were no losses in the inlet to throat area.) $DP^*_{r\,f}$ is the actual friction loss resulting in flow between the throat and the downstream tapping. $DP_r$ is the actual read recovery DP.

APPENDIX 3

A New Densitometer, Volume and Mass Flow Meter Produced by Installing Velocity Meters in Series with DP Meters Currently the only large scale mass meter available to industry that gives a mass flow rate and a density estimation (and hence a volumetric flow rate) without pressure volume and temperature (i.e. PVT) calculations being required is the Coriolis meter. This meter design is limited to approximately 10" diameter meters. The Coriolis meter is a relatively expensive, large volume and heavy flow meter. Another mass meter design that had no upper size limitations, was relatively small compared to any given pipe line size, relatively inexpensive and was reliable would be well received by industry.

Vortex meters, Positive Displacement (PD) meters, Ultrasonic meters and Turbine meters all are examples of volume flow rate meters (sometimes termed "velocity" meters). That is they are not dependent on density. They give no mass flow or density output. These meter designs directly estimate the volume flow rate of the fluid regardless of the fluid density. With the exception of the PD meter these mentioned volume meters are sometimes described as velocity meters as they give the average velocity of the fluid which in turn can be expressed as a volume flow rate as the cross sectional area of the pipe is known. (The PD meter measures the volume flow rate directly.)

Differential Pressure (DP) Meters are not mass or volume flow meters. These meters do not predict either of these parameters unless the density is known from an external source, i.e. usually PVT calculations. That is the mass or volume flow rate can be calculated by a DP meter only if the density is already known. Another way of expressing this statement is the DP meter gives the volume flow rate as a function of the fluid density.

If any velocity meter (i.e. volume flow meter) is placed in series with a DP meter then the DP meter equation still gives the volume flow rate as a function of the fluid density and as the volume flow meter is stating the volume flow rate the only unknown in the DP meter volume flow rate equation is the density which can therefore be solved. Traditionally, it is not seen as good practice to have any pipe disturbance (including a second intrusive meter) close to a standard DP meter as this could adversely affect the DP meters performance. Use of an Ultrasonic meter would not disturb the velocity profile into the DP meter and would therefore be a reasonable choice of volume flow rate meter. However Ultrasonic meters can be relatively expensive. If the DP meter was calibrated with a disturbance (in this case an intrusive velocity meter) the effect of the presence of the volume flow meter would be accounted for in the discharge coefficient and it should therefore not matter unless the resulting DP meter discharge coefficient was found to be highly non-linear with Reynolds number. From reported performances the Vortex meter appears to be a good economic choice velocity meter for such a venture as Ultrasonic and Turbine meters although capable of giving an accurate volume flow rate reading are considerably more expensive and turbines especially are delicate devices compared to vortex meters and the vortex meter has better reported residence to flow profile disturbances. The vortex meter is generally less accurate than the ultrasonic and turbine meters but this is not seen as a significant problem as it is not seen as inaccurate and the rival Coriolis meters mass flow is advertised as typical 0.5% and density is advertised in the direct terms of ±mass/volume instead of percentage but independent users claim the gas density uncertainty to be in the order of 2%. From reported performances the cone type DP meter appears to be suitable DP meter as it is reported by API 22.2 to be virtually immune to upstream disturbances (in this case a Vortex meters bluff body). However, as previously stated if another type DP meter was used and it had been calibrated with the volume meter in series then as long as there is no highly non-linear result then the advantage of the cone type DP meter is diminished for straight run applications at least.

As an example the vortex meter and DP meter combination will be discussed here. The theory of a vortex meter will be derived and then the calculation of density, volume flow rate and mass flow rate will be discussed. This is an example of one meter combination. Other volume flow rate/DP meter combinations are just as valid.

Vortex Meter and DP Meter Combination

When exposed to a free stream a suitable bluff body will shed vortices in a cyclic fashion that form a von Karman vortex street downstream of the bluff body. Experiments have shown (although theory is lacking) that the frequency of shedding is directly proportional to the average velocity. The Strouhal number (St) is defined as:

$$St = \frac{fd}{V} \quad (A3.1)$$

where: St is the Stouhal number, f is the shedding frequency, d is the bluff body width (typically, it can be defined other ways) and $\bar{V}$ is the average fluid velocity.

It is a constant over a large turn down (for non-insertion vortex meters at least). For larger turn downs the Strouhal number may be a function of the Reynolds number. If the Strouhal number (St) is found by calibration then by reading the frequency of vortex shedding (f) and knowing the bluff body width (d) the average velocity (V) can be found. Let:

$$\bar{V} = \frac{fd}{St} = \frac{f}{C} \quad (A3.2)$$

where C is a constant if St is a constant.

Volume flow rate Q is calculated by:

$$Q = A\bar{V} = A\frac{f}{C} = \frac{f}{K} \quad (A3.2)$$

Where A is the cross sectional area of the meter inlet and K is the meter factor and is found by calibration.

Note:

$$K = \frac{St}{Ad} \quad (A3.3)$$

So the Vortex Meter Equation is:

$$Q = \frac{f}{K} \quad (A3.4)$$

DP Meter volume flow rate equation:

$$m_{actual} = EA_t \varepsilon C_d \sqrt{2\rho\Delta P_t} \quad (A1.14)$$

And as:

$$m = \rho AU = \rho Q \quad (A1.1)$$

We can say:

$$Q_{actual} = EA_t \varepsilon C_d \sqrt{\frac{2\Delta P_t}{\rho}} \quad (A1.12b)$$

Note that with out density the volume flow rate can not be derived from the DP meter equation A14b. Now substituting in the Vortex meter volume flow rate into equation A1.14b the DP meter volume equation becomes:

$$\frac{f}{K} = EA_t \varepsilon C_d \sqrt{\frac{2\Delta P}{\rho}} \quad (A3.5)$$

Note that if $C_d$ and K are constant (a reasonable approximation) then this equation has one unknown, i.e. density. This can be separated out:

$$\rho = (EA_t Y C_d)^2 \left(\frac{K}{f}\right)^2 (2\Delta P) \quad (A3.5a)$$

If $C_d = g(Re)$ then as:

$$Re = \frac{4m}{\pi\mu D} = \frac{4\rho Q}{\pi\mu D} = \frac{4\rho f}{\pi\mu D K} \quad (A3.6)$$

We have to iterate on density for the following equation:

$$\rho - \left\{\left(EA_t Y \left\{g\left\{\frac{4\rho f}{\pi\mu D K}\right\}\right\}\right)^2 \left(\frac{K}{f}\right)^2 (2\Delta P)\right\} = 0 \quad (A3.5b)$$

Once the density is found we can get the mass flow:

$$m = EA_t Y C_d \sqrt{2\rho\Delta P} = \rho\frac{f}{K} \quad (A3.7)$$

The example above is given for vortex meters but there is no reason why the same procedure can not be repeated for any volume flow meter in series with any DP meter. That is in general terms:

Any volume flow meter reading can be substituted into any DP meter volume equation:

$$Q_{Volume\ Meter} = EA_t \varepsilon C_d \sqrt{\frac{2\Delta P}{\rho}} \quad (A3.8)$$

Therefore:

$$\rho = (EA_t \varepsilon C_d)^2 \left(\frac{1}{Q_{Volume\ Meter}}\right)^2 (2\Delta P) \quad (A3.8a)$$

$$m = EA_t \varepsilon C_d \sqrt{2\rho\Delta P} = \rho Q_{Volume\ Meter} \quad (A3.9)$$

For the case of using a stand alone DP meter and a stand alone volume flow rate meter a source of error is the distance between the meters. The further apart they are the more head loss there is between them and the more resulting density drop in the case of a gas flow where density reduces directly proportional to pressure. One possible way around this is to bolt the two stand alone volume flow and DP meters directly to each other and calibrate them accordingly or to consider a hybrid meter where a volume flow meter design is incorporated into a DP meter. Examples are the support strut for a cone type DP meter could be made into a bluff body so that it is a vortex meter within a DP meter. On the same theme the thermocouple probe downstream of any DP meter could be made into a thermocouple/insertion vortex meter. A different approach to the same idea would be to place an ultrasonic meter in the throat of a Venturi meter. This could be a full ultrasonic design (i.e. with inset ultrasonic ports integral to the meter body) or a clamp on ultrasonic meter.

The use of this system is envisaged to be either a replacement of the PVT density prediction system or to monitor (i.e. supply diagnostics regarding) the PVT calculation. The trouble with PVT calculations in the natural gas production industry is they rely on data that comes from periodic samples of the fluid being analysed (usually by a gas chromatograph in the case of natural gas production wells—although this invention is not aimed at any one particular industry) and there is no true real time density measurement as if the fluid composition changes it is not discovered that the fluid density prediction is wrong and hence the meters mass flow rate prediction is wrong until the next sample is taken and analysed. Therefore a real time monitor that gives up to date predictions of density could be very valuable to industry.

The invention claimed is:

1. A method of metering flow through a fluid conduit, which comprises a fluid obstruction, comprising the steps of:
    measuring at least two differential pressures taken between at least three different conduit positions;
    wherein the at least two differential pressures are selected from:
        a total head loss differential pressure taken between a position upstream of the fluid obstruction and a position downstream of the fluid obstruction;
        a traditional differential pressure taken between the position upstream of the fluid obstruction and an intermediate position between the upstream and downstream positions; and
        a recovery differential pressure taken between the intermediate position and the downstream position;
    calculating a fluid flow rate using one of the differential pressure measurements, and monitoring the accuracy of this fluid flow rate calculation by examining the relationship between the measured differential pressures.

2. The method of claim 1 where all three of the traditional differential pressure, recovery differential pressure and total head loss differential pressure are individually measured.

3. The method of claim 1 where the traditional differential pressure and the total head loss differential pressure are measured and the recovery differential pressure is calculated by taking the difference of these two measured differential pressures.

4. The method of claim 1 where the traditional differential pressure and the recovery differential pressure are measured and the head loss differential pressure is calculated by taking the difference of these two measured differential pressures.

5. The method of claim 1 where the recovery differential pressure and the total head loss differential pressure are measured and the traditional differential pressure is calculated by taking the sum of these two measured differential pressures.

6. The method of claim 1, comprising the steps of:
    calculating respective fluid flow rate predictions based on each of the obtained total head loss differential pressure, traditional differential pressure and recovery differential pressure;
    comparing the fluid flow rate predictions; and
    determining that the flow meter has malfunctioned if any two or more of the fluid flow rate predictions are not equal to within a predetermined uncertainty.

7. The method of claim 6, comprising generating an alarm or warning signal if the meter is determined to have malfunctioned.

8. The method of claim 6, further comprising the step of analyzing the calculated flow rates to asses the validity of the traditional differential pressure, the recovered differential pressure and total head loss differential pressure readings: comprising of if two flow rate predictions are equal to within a predetermined uncertainty and the third flow rate prediction is not equal to the other flow rate predictions to within a predetermined uncertainty, then the differential pressure reading used in the third flow rate prediction is indicated as erroneous.

9. The method of claim 6, further comprising the step of, once a flow meter malfunction is identified, analyzing the fluid flow rates to assess the cause.

10. The method of claim 9, wherein said analysis comprises determining that:
    if the flow rate calculated from the total head loss differential pressure is less than the flow rate calculated by the traditional differential pressure which is less than the flow rate calculated from the recovery differential pressure;
    then the possible cause of error is identified as being either that the pressure reading taken at the upstream position is artificially low, the pressure reading taken at the intermediate position is artificially low, or the pressure reading taken at the downstream position is artificially high; and
    if the flow rate calculated from the recovery differential pressure is less than the flow rate calculated from the traditional differential pressure which is less than the flow rate calculated by the total head loss differential pressure;
    then the possible cause of error is identified as being either that the pressure reading taken at the upstream position is artificially high, the pressure reading taken at the intermediate position is artificially high, or the pressure reading taken at the downstream position is artificially low.

11. The method of claim 1, wherein the fluid flow rate is a volume flow rate.

12. The method of claim 1, wherein the fluid flow rate is a mass flow rate.

13. The method of claim 1, comprising the steps of:
    measuring at least two of the traditional differential pressure, the recovery differential pressure and the total head loss differential pressure;
    calculating a fluid flow rate using one of the differential pressure measurements;
    calculating a ratio of the total head loss differential pressure and traditional differential pressure, or calculating a ratio of the recovery differential pressure and traditional differential pressure, or calculating a ratio of the recovery differential pressure and total head loss differential pressure; and monitoring the accuracy of the calculated flow rate by checking that these DP ratios agree with known DP ratios of a correctly operating DP flow meter to within a predetermined uncertainty.

14. The method of claim 13, comprising generating an alarm or warning signal if a differential pressure ratio has indicated a meter malfunction.

15. The method of claim 13, further comprising the step of, once a meter system malfunction is identified, analyzing the three differential pressure ratios to assess the source of the malfunction.

16. The method of claim 1, comprising the steps of:
measuring a volume flow rate flowing down the conduit;
combining the measured volume flow rate with each of the differential pressures to calculate a respective density for each differential pressure reading;
comparing the respective calculated densities with a known density value; and
determining that the meter has malfunctioned if any two or more of the densities are not equal to within a predetermined uncertainty.

17. The method of claim 16, comprising generating an alarm or warning signal if the meter is determined to have malfunctioned.

18. The method of claim 1, wherein the fluid flow is single phase or homogenous two-phase gas flow or liquid flow.

19. The method of claim 16, wherein the known density is obtained from a PVT (equation of state) calculation.

20. The method of claim 16 wherein, if each calculated density reading is not equal to all of the other densities to within a predetermined uncertainty, it is determined that the density reading and flow rate calculated from the recovery differential pressure are correct.

21. The method of claim 20, wherein a pressure tapping at the position upstream of the fluid obstruction is identified as being defective.

22. The method of claim 16 wherein, if the density reading calculated from the total head loss differential pressure matches the known density and the other two densities from the other two said differential pressure do not match the known density, it is determined that the density reading and flow rate calculated from the total head loss differential pressure are correct and the density reading and flow rate calculated from the other two said differential pressures are incorrect.

23. The method of claim 22 wherein the pressure tapping at the intermediate position is identified as being defective.

24. The method of claim 16 wherein, if the density reading calculated from the traditional differential pressure matches the known density and the other two densities from the other two said differential pressure do not match the known density, it is determined that the density reading and flow rate calculated from the traditional differential pressure are correct and the density reading and flow rate calculated from the other two said differential pressures are incorrect.

25. The method of claim 24 wherein the pressure tapping at the downstream position is identified as being defective.

26. The method of claim 1, wherein the fluid obstruction comprises a flow meter.

27. The method of claim 26, wherein the fluid obstruction comprises a volume flow meter or a component part thereof.

28. The method of claim 26, wherein the flow meter is a differential pressure flow meter, or the primary element thereof.

29. The method of claim 1, wherein said step of monitoring the accuracy of a fluid flow rate comprises producing mass and volume flow rate function redundancy by determining the flow rate through said fluid obstruction by use of the traditional differential pressure, determining the flow rate through said fluid obstruction by use of the recovery differential pressure and determining the flow rate through the said fluid obstruction by use of the total head loss differential pressure.

30. The method of claim 1, comprising performing a calibration step to calculate a permanent pressure loss coefficient by using a test flow of known mass flow rate.

31. The method of claim 30, wherein, in the case where permanent pressure loss coefficient is dependent on the Reynolds number, a fit to the curve of the variation with Reynolds number is performed as part of the calibration.

32. The method of claim 1, comprising performing a calibration step to calculate each differential pressure ratio by using a test flow of know mass flow rate.

33. The method of claim 32, wherein, in the case where each differential pressure ratio is dependent on the Reynolds number, a fit to the curve of the variation with Reynolds number is performed as part of the calibration.

34. The method of claim 2, comprising diagnosing the correctness of the differential pressure measurements through said fluid obstruction and determining a differential pressure measurement error if the sum of the measured recovery differential pressure and measured total head loss differential pressure does not equate to the traditional differential pressure, to within a pre-determined uncertainty.

35. A flow metering apparatus comprising:
a fluid conduit comprising fluid obstruction;
a first pressure tapping at an upstream end of the fluid conduit;
a second pressure tapping at a downstream end of the fluid conduit;
an intermediate pressure tapping between the first and second pressure tappings;
at least two DP transmitters arranged for reading the differential pressures between at least the three different conduit positions;
wherein the at least two DP transmitters are selected from DP transmitters arranged to measure:
a total head loss differential pressure taken between the first pressure tapping and the second pressure tapping;
a traditional differential pressure taken between the first pressure tapping and the intermediate pressure tapping; and
a recovery differential pressure taken between the intermediate pressure tapping and the second pressure tapping; and:
a calculator for calculating a fluid flow rate using one of the differential pressure measurements, and monitoring the accuracy of this fluid flow rate calculation by examining the relationship between the measured differential pressures.

36. The apparatus of claim 35 comprising a pressure measurement apparatus for individually measuring all three of the traditional differential pressure, recovery differential pressure and total head loss differential pressure.

37. The apparatus of claim 35 comprising a pressure measurement apparatus for measuring the traditional differential pressure and the total head loss differential pressure, and a calculator for calculating the recovery differential pressure by taking the difference of these two measured differential pressures.

38. The apparatus of claim 35 comprising a pressure measurement apparatus for measuring the traditional differential pressure and the recovery differential pressure, and a calculator for calculating the head loss differential pressure by taking the difference of these two measured differential pressures.

39. The apparatus of claim 35 comprising a pressure measurement apparatus for measuring the recovery differential pressure and the total head loss differential pressure, and a calculator for calculating the traditional differential pressure by taking the sum of these two measured differential pressures.

40. The apparatus of claim 35, wherein the calculator is arranged for:
   calculating the respective fluid flow rates based on each of the obtained total head loss differential pressure, traditional differential pressure and recovery differential pressure;
   comparing the fluid flow rate predictions; and
   determining that the flow meter has malfunctioned if any two or more of the fluid flow rate predictions are not equal to within a predetermined uncertainty.

41. The apparatus of claim 40, comprising an alarm configured to generate an alarm or warning signal if the meter is determined to have malfunctioned.

42. The apparatus of claim 36, wherein the calculator is arranged for analyzing the calculated flow rates to asses the validity of the traditional differential pressure, the recovered differential pressure and total head loss differential pressure readings: comprising if two flow rate predictions are equal to within a predetermined uncertainty and the third flow rate prediction is not equal to the other flow rate predictions to within a predetermined uncertainty, then the differential pressure reading used in the third flow rate prediction is indicated as erroneous.

43. The apparatus of claim 40, wherein the calculator is arranged for analyzing the fluid flow rates to assess the cause, once a flow meter malfunction is identified.

44. The apparatus of claim 43, wherein said analysis comprises determining that:
   if the flow rate calculated from the total head loss differential pressure is less than the flow rate calculated by the traditional differential pressure which is less than the flow rate calculated from the recovery differential pressure;
   then the possible cause of error is identified as being either that the pressure reading taken at the upstream position is artificially low, the pressure reading taken at the intermediate position is artificially low, or the pressure reading taken at the downstream position is artificially high; and
   if the flow rate calculated from the recovery differential pressure is less than the flow rate calculated from the traditional differential pressure which is less than the flow rate calculated by the total head loss differential pressure;
   then the possible cause of error is identified as being either that the pressure reading taken at the upstream position is artificially high, the pressure reading taken at the intermediate position is artificially high, or the pressure reading taken at the downstream position is artificially low.

45. The apparatus of claim 35, wherein the fluid flow rate is a volume flow rate.

46. The apparatus of claim 35, wherein the fluid flow rate is a mass flow rate.

47. The apparatus of claim 35, wherein the calculator is arranged for performing the steps of:
   measuring at least two of the traditional differential pressure, the recovery differential pressure and the total head loss differential pressure;
   calculating a fluid flow rate using one of the differential pressure measurements;
   calculating a ratio of the total head loss differential pressure and traditional differential pressure, or calculating a ratio of the recovery differential pressure and traditional differential pressure, or calculating a ratio of the recovery differential pressure and total head loss differential pressure; and
   monitoring the accuracy of the calculated flow rate by checking that these DP ratios agree with known DP ratios of a correctly operating DP flow meter to within a predetermined uncertainty.

48. The apparatus of claim 47, comprising an alarm configured to generate an alarm or warning signal if a differential pressure ratio has indicated a meter malfunction.

49. The apparatus of claim 47, wherein the calculator is arranged for analyzing the three differential pressure ratios to assess the source of the malfunction, once a meter system malfunction is identified.

50. The apparatus of claim 35, comprising metering apparatus for:
   measuring a volume flow rate flowing down the conduit; and a calculator for:
   combining the measured volume flow rate with each of the differential pressures to calculate a respective density for each differential pressure reading;
   comparing the respective calculated densities with a known density value; and
   determining that the meter has malfunctioned if any two or more of the densities are not equal to within a predetermined uncertainty.

51. The apparatus of claim 50, comprising an alarm configured to generate an alarm or warning signal if the meter is determined to have malfunctioned.

52. The apparatus of claim 35, wherein the fluid flow is single phase or homogenous two-phase gas flow or liquid flow.

53. The apparatus of claim 50, wherein the known density is obtained from a PVT (equation of state) calculation.

54. The apparatus of claim 50 wherein, if each calculated density reading is not equal to all of the other densities to within a predetermined uncertainty, it is determined that the density reading and flow rate calculated from the recovery differential pressure are correct.

55. The apparatus of claim 54, wherein a pressure tapping at the position upstream of the fluid obstruction is identified as being defective.

56. The apparatus of claim 51 wherein, if the density reading calculated from the total head loss differential pressure matches the known density and the other two densities from the other two said differential pressure do not match the known density, it is determined that the density reading and flow rate calculated from the total head loss differential pressure are correct and the density reading and flow rate calculated from the other two said differential pressures are incorrect.

57. The apparatus of claim 56 wherein the pressure tapping at the intermediate position is identified as being defective.

58. The apparatus of claim 51 wherein, if the density reading calculated from the traditional differential pressure matches the known density and the other two densities from the other two said differential pressure do not match the known density, it is determined that the density reading and flow rate calculated from the traditional differential pressure are correct and the density reading and flow rate calculated from the other two said differential pressures are incorrect.

59. The apparatus of claim 58 wherein the pressure tapping at the downstream position is identified as being defective.

60. The apparatus of claim 35, wherein the fluid obstruction comprises a flow meter.

61. The apparatus of claim 60, wherein the fluid obstruction comprises a volume flow meter or a component part thereof.

62. The apparatus of claim 60, wherein the flow meter is a differential pressure flow meter, or the primary element thereof.

63. The apparatus of claim 35, wherein said calculator is arranged for monitoring the accuracy of a fluid flow rate by producing mass and volume flow rate function redundancy by determining the flow rate through said fluid obstruction by use of the traditional differential pressure, determining the flow rate through said fluid obstruction by use of the recovery differential pressure and determining the flow rate through the said fluid obstruction by use of the total head loss differential pressure.

64. The apparatus of claim 35, comprising a calibrator for performing a calibration step to calculate a permanent pressure loss coefficient by using a test flow of know mass flow rate.

65. The apparatus of claim 64, wherein, in the case where permanent pressure loss coefficient is dependent on the Reynolds number, a fit to the curve of the variation with Reynolds number is performed as part of the calibration.

66. The apparatus of claim 35, comprising a calibrator for performing a calibration step to calculate each differential pressure ratio by using a test flow of know mass flow rate.

67. The apparatus of claim 66, wherein, in the case where each differential pressure ratio is dependent on the Reynolds number, a fit to the curve of the variation with Reynolds number is performed as part of the calibration.

68. The apparatus of claim 36, wherein the calculator is arranged for diagnosing the correctness of the differential pressure measurements through said fluid obstruction and determining a differential pressure measurement error if the sum of the measured recovery differential pressure and measured total head loss differential pressure does not equate to the traditional differential pressure, to within a pre-determined uncertainty.

69. A non-transitory computer readable medium comprising the calculator of claim 35.

70. The non-transitory computer readable medium of claim 69 wherein the calculator is encoded on a computer readable medium.

* * * * *